(12) United States Patent
Smith et al.

(10) Patent No.: US 10,231,048 B2
(45) Date of Patent: *Mar. 12, 2019

(54) ERGONOMIC EARPIECE WITH ATTACHMENT MOUNT

(71) Applicant: SureFire, LLC, Fountain Valley, CA (US)

(72) Inventors: Richard C. Smith, Costa Mesa, CA (US); Diann Y. Smith, Costa Mesa, CA (US); Alfredo Soria, Corona, CA (US)

(73) Assignee: SureFire, LLC, Fountain Valley, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/713,187

(22) Filed: Sep. 22, 2017

(65) Prior Publication Data

US 2018/0014111 A1 Jan. 11, 2018

Related U.S. Application Data

(63) Continuation-in-part of application No. 15/418,503, filed on Jan. 27, 2017, which is a continuation of
(Continued)

(51) Int. Cl.
*H04R 1/10* (2006.01)
*H04M 1/05* (2006.01)
(Continued)

(52) U.S. Cl.
CPC ............ *H04R 1/1066* (2013.01); *H04M 1/05* (2013.01); *H04R 1/105* (2013.01); *H04R 1/1008* (2013.01);
(Continued)

(58) Field of Classification Search
CPC combination set(s) only.
See application file for complete search history.

(56) References Cited

U.S. PATENT DOCUMENTS

| 1,614,987 A | 1/1927 | Bernhard et al. |
| 1,668,890 A | 5/1928 | Curran et al. |

(Continued)

FOREIGN PATENT DOCUMENTS

GB 2 085 694 A 4/1982

OTHER PUBLICATIONS

Howard Leight; "Detachable Earplugs"; http://howardleight.com/products/products1.asp?id=4;Oct. 17, 2005;1 page.

(Continued)

*Primary Examiner* — Amir H Etesam
(74) *Attorney, Agent, or Firm* — Haynes and Boone, LLP

(57) ABSTRACT

Various techniques are provided to implement and use an earpiece having an attachment mount. In one example, an earpiece includes an arcuate rib having a lobe disposed on an upper end thereof and configured to engage with a crus of a helix and an antihelix of a user's ear. The earpiece also includes a mount extending from the arcuate rib and comprising a snap clip configured to engage and position an audio device in contact with the user's ear. Other implementations and related methods are also provided.

20 Claims, 49 Drawing Sheets

Related U.S. Application Data application No. 15/061,766, filed on Mar. 4, 2016, now Pat. No. 9,560,436, which is a continuation of application No. 14/106,650, filed on Dec. 13, 2013, now abandoned, which is a continuation of application No. 13/198,254, filed on Aug. 4, 2011, now Pat. No. 8,625,834, which is a continuation-in-part of application No. 12/852,179, filed on Aug. 6, 2010, now Pat. No. 8,879,769, which is a continuation of application No. 11/236,969, filed on Sep. 27, 2005, now Pat. No. 7,778,435, said application No. 13/198,254 is a continuation-in-part of application No. 11/411,314, filed on Apr. 26, 2006, now abandoned, which is a continuation-in-part of application No. 11/247,105, filed on Oct. 11, 2005, now abandoned, said application No. 13/198,254 is a continuation-in-part of application No. 11/872,324, filed on Oct. 15, 2007, now abandoned, which is a continuation-in-part of application No. 11/411,314, filed on Apr. 26, 2006, now abandoned, which is a continuation-in-part of application No. 11/247,105, filed on Oct. 11, 2005, now abandoned, said application No. 13/198,254 is a continuation-in-part of application No. 11/869,517, filed on Oct. 9, 2007, now abandoned, which is a continuation-in-part of application No. 11/411,314, filed on Apr. 26, 2006, now abandoned, which is a continuation-in-part of application No. 11/247,105, filed on Oct. 11, 2005, now abandoned, said application No. 13/198,254 is a continuation-in-part of application No. 11/868,720, filed on Oct. 8, 2007, now abandoned, which is a continuation-in-part of application No. 11/411,314, filed on Apr. 26, 2006, now abandoned, which is a continuation-in-part of application No. 11/247,105, filed on Oct. 11, 2005, now abandoned, said application No. 13/198,254 is a continuation-in-part of application No. 11/696,987, filed on Apr. 5, 2007, now abandoned, which is a continuation-in-part of application No. 11/618,344, filed on Dec. 29, 2006, now abandoned, and a continuation-in-part of application No. 11/411,314, filed on Apr. 26, 2006, now abandoned.

(60) Provisional application No. 60/613,742, filed on Sep. 27, 2004.

(51) Int. Cl.
    H04M 1/60       (2006.01)
    H04R 25/00      (2006.01)

(52) U.S. Cl.
    CPC ......... H04R 1/1058 (2013.01); *H04M 1/6058* (2013.01); *H04R 1/1016* (2013.01); *H04R 25/656* (2013.01); *H04R 2201/107* (2013.01); *Y10T 29/49005* (2015.01)

(56) References Cited

U.S. PATENT DOCUMENTS

| | | |
|---|---|---|
| 1,753,817 A | 4/1930 | Aber |
| 1,893,474 A | 1/1933 | Lieber |
| 2,325,590 A | 8/1943 | Carlisle et al. |
| D141,071 S | 5/1945 | Hechler |
| 2,377,739 A | 6/1945 | Wyckoff |
| 2,391,924 A | 1/1946 | Rutter et al. |
| 2,535,258 A | 12/1950 | Bland |
| 2,549,629 A | 4/1951 | Nelson |
| 2,670,737 A | 3/1954 | Cantor |
| D176,810 S | 1/1956 | Norris |
| 2,763,334 A | 9/1956 | Starkey |
| 2,787,670 A | 4/1957 | Rownland |
| 2,804,932 A | 9/1957 | Bedard |
| 2,939,923 A | 6/1960 | Henderson |
| 2,959,645 A | 11/1960 | Ladd |
| 3,041,856 A | 7/1962 | Neal |
| 3,226,501 A | 12/1965 | Seserman |
| 3,368,644 A | 2/1968 | Henderson |
| 3,547,219 A | 12/1970 | Brothos |
| 3,614,344 A | 10/1971 | Gorike |
| 3,676,611 A | 7/1972 | Stephens |
| 3,787,643 A | 1/1974 | Nielsen |
| D237,090 S | 10/1975 | Yanagawa |
| 4,020,297 A | 4/1977 | Brodie |
| 4,069,400 A | 1/1978 | Johanson et al. |
| 4,138,598 A | 2/1979 | Cech |
| 4,160,449 A | 7/1979 | Wade |
| 4,311,206 A | 1/1982 | Johnson |
| 4,349,083 A | 9/1982 | Bennett |
| D266,590 S | 10/1982 | Bennett |
| D272,904 S | 3/1984 | Kawano |
| 4,443,668 A | 4/1984 | Warren |
| 4,471,496 A | 9/1984 | Gardner et al. |
| 4,585,089 A | 4/1986 | Topholm |
| 4,588,868 A | 5/1986 | Bertagna et al. |
| 4,720,857 A | 1/1988 | Burris et al. |
| 4,724,922 A | 2/1988 | Kalayjian |
| 4,864,610 A | 9/1989 | Stevens |
| 4,870,688 A | 9/1989 | Voroba et al. |
| 4,878,560 A | 11/1989 | Scott |
| 4,965,838 A | 10/1990 | Kamon et al. |
| 4,977,976 A | 12/1990 | Major |
| 5,048,092 A | 9/1991 | Yamagashi et al. |
| 5,110,161 A | 5/1992 | Bartholomew |
| 5,118,909 A | 6/1992 | Husting |
| 5,146,051 A | 9/1992 | Hermann |
| 5,201,007 A | 4/1993 | Ward et al. |
| 5,298,692 A | 3/1994 | Ikeda et al. |
| 5,333,622 A | 8/1994 | Casali et al. |
| D350,961 S | 9/1994 | Nakamura |
| 5,345,509 A | 9/1994 | Hofer et al. |
| 5,412,736 A | 5/1995 | Keliiliki |
| 5,449,865 A | 9/1995 | Desnick et al. |
| 5,654,530 A | 8/1997 | Sauer et al. |
| 5,655,026 A | 8/1997 | Peters et al. |
| 5,659,156 A | 8/1997 | Mauney et al. |
| D383,757 S | 9/1997 | Dobrusskin et al. |
| 5,677,964 A | 10/1997 | Sun |
| D388,093 S | 12/1997 | Frengley |
| 5,757,932 A | 5/1998 | Lindemann et al. |
| 5,757,944 A | 5/1998 | Jensen et al. |
| 5,881,159 A | 3/1999 | Aceti et al. |
| 5,917,918 A | 6/1999 | Callahan |
| 5,923,522 A | 7/1999 | Sajna |
| 5,949,896 A | 9/1999 | Nageno et al. |
| 6,035,961 A | 3/2000 | Sun |
| 6,070,693 A | 6/2000 | Hamery |
| 6,101,260 A | 8/2000 | Jensen et al. |
| 6,122,388 A | 9/2000 | Feldman |
| 6,153,840 A | 11/2000 | Dreher |
| 6,181,254 B1 | 1/2001 | Vogele |
| D449,295 S | 10/2001 | Smith et al. |
| 6,332,345 B1 | 12/2001 | Huang |
| 6,386,314 B1 | 5/2002 | Sheehan et al. |
| 6,411,722 B1 | 6/2002 | Wolf |
| 6,427,018 B1 | 7/2002 | Keliiliki |
| 6,466,681 B1 | 10/2002 | Siska et al. |
| 6,484,726 B1 | 11/2002 | Remer et al. |
| D469,755 S | 2/2003 | Hlas et al. |
| D470,122 S | 2/2003 | Hlas et al. |
| D470,123 S | 2/2003 | Hlas et al. |
| 6,513,621 B1 | 2/2003 | Deslauriers et al. |
| D471,537 S | 3/2003 | Ham |
| 6,584,306 B2 | 6/2003 | Mirabelli |
| D478,991 S | 8/2003 | Dyer et al. |
| 6,681,022 B1 | 1/2004 | Puthuff et al. |
| 6,690,807 B1 | 2/2004 | Meyer |
| 6,695,093 B1 | 2/2004 | Falco |
| 6,704,429 B2 | 3/2004 | Lin |

(56) References Cited

U.S. PATENT DOCUMENTS

| | | |
|---|---|---|
| 6,741,719 B1 | 5/2004 | Orten |
| 6,810,987 B1 | 11/2004 | DeKalb |
| 6,879,697 B2 | 4/2005 | Tøpholm |
| 7,010,275 B2 | 3/2006 | Davies |
| 7,027,608 B2 | 4/2006 | Fretz et al. |
| D523,845 S | 6/2006 | Smith et al. |
| 7,110,799 B1 | 9/2006 | Willins et al. |
| 7,127,078 B2 | 10/2006 | Mann et al. |
| D532,110 S | 11/2006 | Bailey et al. |
| 7,139,404 B2 | 11/2006 | Feeley et al. |
| 7,281,815 B1 | 10/2007 | Gustafson et al. |
| D563,945 S | 3/2008 | Johns et al. |
| D565,024 S | 3/2008 | Kim et al. |
| D566,104 S | 4/2008 | Suzuki |
| 7,394,910 B2 | 7/2008 | Smith et al. |
| D575,772 S | 8/2008 | Schultz et al. |
| D576,610 S | 9/2008 | Johnson |
| D585,429 S | 1/2009 | Dean |
| D585,881 S | 2/2009 | Nam et al. |
| D593,075 S | 5/2009 | Williams et al. |
| 7,536,008 B2 * | 5/2009 | Howes .............. H04R 1/083 379/433.01 |
| D601,134 S | 9/2009 | Elabidi et al. |
| D618,218 S | 6/2010 | Burgett et al. |
| D618,219 S | 6/2010 | Burgett et al. |
| D621,817 S | 8/2010 | Brickstad |
| D622,265 S | 8/2010 | Rye |
| D622,704 S | 8/2010 | Fahrendorff et al. |
| D622,705 S | 8/2010 | Fahrendorff et al. |
| 7,778,435 B2 | 8/2010 | Smith et al. |
| D630,621 S | 1/2011 | Pedersen |
| D638,398 S | 5/2011 | Morison |
| 7,949,127 B2 | 5/2011 | Pedersen et al. |
| D640,670 S | 6/2011 | Rye |
| D641,008 S | 7/2011 | Lee et al. |
| D641,737 S | 7/2011 | Krauss et al. |
| D645,458 S | 9/2011 | Silvestri et al. |
| D647,514 S | 10/2011 | Wikel et al. |
| 8,054,985 B2 | 11/2011 | Doty |
| 8,111,864 B2 | 2/2012 | Oliveira et al. |
| D655,693 S | 3/2012 | Silvestri et al. |
| D664,124 S | 7/2012 | Smith et al. |
| 8,249,287 B2 * | 8/2012 | Silvestri .............. H04R 1/1016 381/380 |
| 8,311,253 B2 | 11/2012 | Silvestri et al. |
| D673,262 S | 12/2012 | Omura et al. |
| D687,021 S | 7/2013 | Yuen |
| D694,220 S | 11/2013 | Lee et al. |
| 8,611,969 B2 | 12/2013 | Smith et al. |
| 8,625,834 B2 | 1/2014 | Smith et al. |
| 8,666,085 B2 | 3/2014 | Donaldson et al. |
| D710,333 S | 8/2014 | Davies et al. |
| D710,335 S | 8/2014 | Yang |
| D714,260 S | 9/2014 | Han |
| D716,770 S | 11/2014 | Bonahoom et al. |
| 8,879,769 B2 | 11/2014 | Smith et al. |
| 8,897,480 B2 | 11/2014 | Tan et al. |
| D720,730 S | 1/2015 | Smith et al. |
| D721,354 S | 1/2015 | Thompson et al. |
| 8,965,030 B2 | 2/2015 | Aase |
| D727,301 S | 4/2015 | Smith et al. |
| 9,042,947 B2 | 5/2015 | Smith et al. |
| D732,008 S | 6/2015 | Akana et al. |
| D735,180 S | 7/2015 | Smith et al. |
| D742,362 S | 11/2015 | Bonahoom et al. |
| D744,456 S | 12/2015 | Pedersen |
| D753,098 S | 4/2016 | Smith et al. |
| D755,158 S | 5/2016 | Lee et al. |
| D759,633 S | 6/2016 | Gondo |
| 9,479,856 B2 | 10/2016 | Smith et al. |
| 9,560,436 B2 | 1/2017 | Smith et al. |
| D779,461 S | 2/2017 | Smith et al. |
| D818,458 S | 5/2018 | Lee et al. |
| D828,825 S | 9/2018 | Samrelius |
| 2001/0014618 A1 | 8/2001 | Martin et al. |
| 2002/0005317 A1 | 1/2002 | Ohashi et al. |
| 2002/0080990 A1 | 6/2002 | Lin |
| 2002/0096391 A1 | 7/2002 | Smith et al. |
| 2002/0172386 A1 | 11/2002 | Bayer |
| 2002/0181729 A1 | 12/2002 | Smith |
| 2002/0186858 A1 | 12/2002 | Masuda et al. |
| 2003/0008688 A1 | 1/2003 | Fujino et al. |
| 2003/0091210 A1 | 5/2003 | Baskerville |
| 2003/0174853 A1 | 9/2003 | Howes |
| 2004/0137963 A1 | 7/2004 | Barras et al. |
| 2004/0165742 A1 | 8/2004 | Shennib et al. |
| 2004/0165743 A1 | 8/2004 | Bayer |
| 2005/0008180 A1 | 1/2005 | Smith et al. |
| 2005/0018838 A1 | 1/2005 | Meunier et al. |
| 2005/0031146 A1 | 2/2005 | Baskerville |
| 2005/0064915 A1 | 3/2005 | Lair |
| 2005/0111686 A1 | 5/2005 | Bayer |
| 2005/0143140 A1 | 6/2005 | Sanders et al. |
| 2005/0147269 A1 | 7/2005 | Oliveira et al. |
| 2006/0035687 A1 | 2/2006 | Wong et al. |
| 2006/0050917 A1 | 3/2006 | Skillcorn et al. |
| 2006/0133636 A1 | 6/2006 | Harvey et al. |
| 2006/0148425 A1 | 7/2006 | Carlson |
| 2007/0281725 A1 | 12/2007 | Hyatt |
| 2008/0026699 A1 | 1/2008 | Smith |
| 2008/0214223 A1 | 9/2008 | Klein |
| 2008/0240485 A1 | 10/2008 | Dyer et al. |
| 2012/0064845 A1 | 3/2012 | Smith et al. |
| 2014/0119589 A1 | 5/2014 | Wyzisk et al. |
| 2016/0073186 A1 | 3/2016 | Searl et al. |
| 2017/0238079 A1 | 8/2017 | Smith et al. |
| 2017/0238083 A1 | 8/2017 | Smith et al. |

OTHER PUBLICATIONS

Howard Leight; Banded Earplugs; http://howardleight.com/products/products1.asp?id=5; Oct. 17, 2005; 1 page.

Howard Leight; "Features for Every Worker", http://howardheight.com/products/products1.asp?id=2; Oct. 17, 2005; 2 pages.

newagesafty.com; "Hearing Protection, 3 Foam Earplugs"; http://newagesafty.com/proddetail.php?prod=Ear1;Oct. 17, 2005;1 page.

3M Safety Products, 4130, INCONEL, Titanium, http://65.61.148.23/category_s/45.htm; Oct. 17, 2005; 2 pages.

3M "Banded Hearing Protector", http://multimedia.mmm.com/mws/mediawebserver/dyn?BBBBBBkiuNQBWeCBB . . . , Oct. 17, 2005; 1 page.

3M United States; "3MTM Corded Expandable Ear Plugs 8658ES", http://products3.3m.com/catalog/us/em001/home_leisure/-/node_GS259KWRFRgs/root_ . . . ;Oct. 17, 2005;1 page.

3M "Reusable Earplugs", http://www.google.com/#hl=en&tbo=d&sclient=psy-ab&q=3M+Hearing+Protection++product+information+sheet&oq=3M+Hearing+Protection++product+information+sheet&gs_l=serp.3..33i2112.350.2952.1.3010.25.22.0.1.1.0.281.3696.0j15j6.21.0.les%3B..0.0...1c.1.ppZvHanNH6l&pbx=1&bav=on.2,or.r_gc.r_pw.r_qf.&fp=e91a4d48e51ce469&bpcl=38625945&biw=1680&bih=955; Oct. 17, 2012; 1 page.

3M "Corded Reusable Earplugs", http://www.google.com/#hl=en&tbo=d&sclient=psy-ab&q=3M+Hearing+Protection++product+information÷sheet&oq=3M+Hearing+Protection++product+information+sheet&gs_l=serp.3..33i2112.350.2952.1.3010.25.22.0.1.1.0.281.3696.0j15j6.21.0.les%3B..0.0...1c.1.ppZvHanNH6l&pbx=1&bav=on.2,or.r_gc.r_pw.r_qf.&fp=e91a4d48e51ce469&bpcl=38625945&biw=1680&bih=955; Oct. 17, 2005; 1 page.

3M "Corded Reusable Earplugs with Case", http://www.google.com/#hl=en&tbo=d&sclient=psy-ab&q=3M+Hearing+Protection++product+information+sheet&oq=3M+Hearing+Protection++product+information+sheet&gs_l=serp.3..33i2112.350.2952.1.3010.25.22.0.1.1.0.281.3696.0j15j6.21.0.les%3B..0.0...1c.1.ppZvHanNH6l&pbx=1&bav=on.2,or.r_gc.r_pw.r_qf.&fp=e91a4d48e51ce469&bpc1=38625945&biw=1680&bih=955; Oct. 17, 2005; 1 page.

Howard Leight; "Features for Every Worker, Hearing Safety Tools for the Most Demand Environments"; hthtp://howardleight.com/products/products.asp; Oct. 17, 2005; 1 page.

Howard Leight; "Single-Use Earplugs"; http://howardleight.com/products/products1.asp?id=2; Oct. 17, 2005; page.

(56) References Cited

OTHER PUBLICATIONS

Howard Leight; "Multiple-Use Earplugs"; http://howardleight.com/products/products1.asp?id=1; Oct. 17, 2005; 1 page.
E-A-R Hearing Protection Products; "E-A-R® TaperFit® 2, Regular Size, Uncorded Bag"; Mar. 6, 2006; 1 page.
E-A-R Earplugs; Products Info/Free Samples/Quotes;http://www.e-a-r.com/e-a-r.com/prod_lit.cfm; Oct. 17, 2005;1 page.
E-A-R; E-A-R® Express® Pod Plugs with Blue Grips, 321-2100;http://www.e-a-r.com/e-a-r.com/pushin_detail.cfm?prod_family=Pod%20Plug%20Exp&ind_prod_num=321-2100001; Oct. 17, 2005; 1 page.
E-A-R® Push-Ins TM Earplugs; New E-A-R Push-Ins, No Roll, No Touch, No Problem; www.earpushins.com;Oct. 17, 2005;1 page.
E-A-R®; New E-A-R Push-Ins, No Roll Down Earplugs; www.earpushins.com;Oct. 17, 2005;1 page.
E-A-R Hearing Protection Products; E-A-R® UltraFit® Plugs with Carring Case 340-4001;http://www.e-a-r.com/e-a-r.com/premold_detail.cfm?prod_family=UltraFit&ind_prod_num=340-4001001;Oct. 17, 2005; 1 page.
E-A-R®; New the Improves UltraFit Costs Even Less Protects Even More; www.ultrafitoffer.com;Oct. 17, 2005;1 page.
E-A-R ; "New E-A-R® UltraFit EarPlugs"; Oct. 17, 2005; www.ultrafitoffer.com; 1 page.
E-A-R Hearing Protection Products; "Professional Musician E-A-R® Plugs aka, HI-1 410-3019"; http://www.e-a-r.com/e-a-r.com/premold_detail.cfm?prod_family=Hi-Fi&ind_prod_num=410-301900110/17/2005;10/17/2005;1 page.
Blasts tm Disposable E-A-R® Plugs; http://209.000.67.149/aosafety.com/shooters/products/ear_02.htm; Oct. 17, 2005; 1 page.
Indoor/Outdoor Range E-A-R® Plugs; HTTP://209.200.67.149/aosafety.com/shooters/products/ear_03.HTM.; Oct. 17, 2005; 1 page.
Otto Communications Advertisement, "Stick it in Your Ear", Law Enforcement Technology, Jul. 1998, p. 55.
Otto Communications Advertisement/Brochure Insert, "Which Communication Product Isn't Offered by Otto?," 1 page, Carpentersville, IL.
Otto Communications Product Brochure, 5 pages, "Your Specialist in Two-Way Radio Accessories".

* cited by examiner

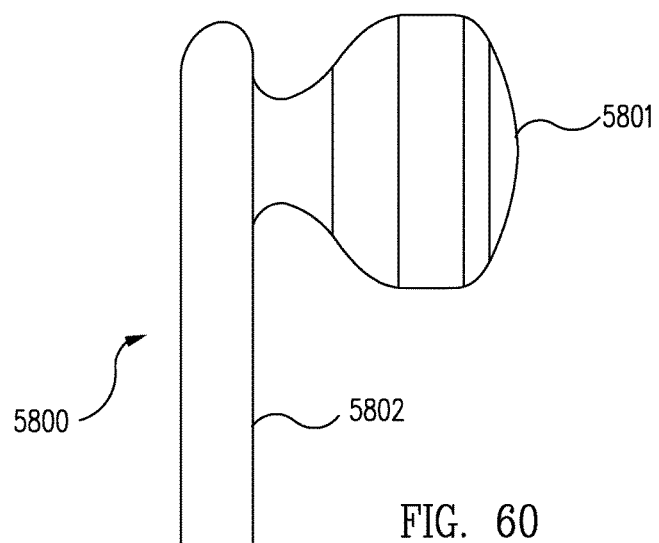
FIG. 60
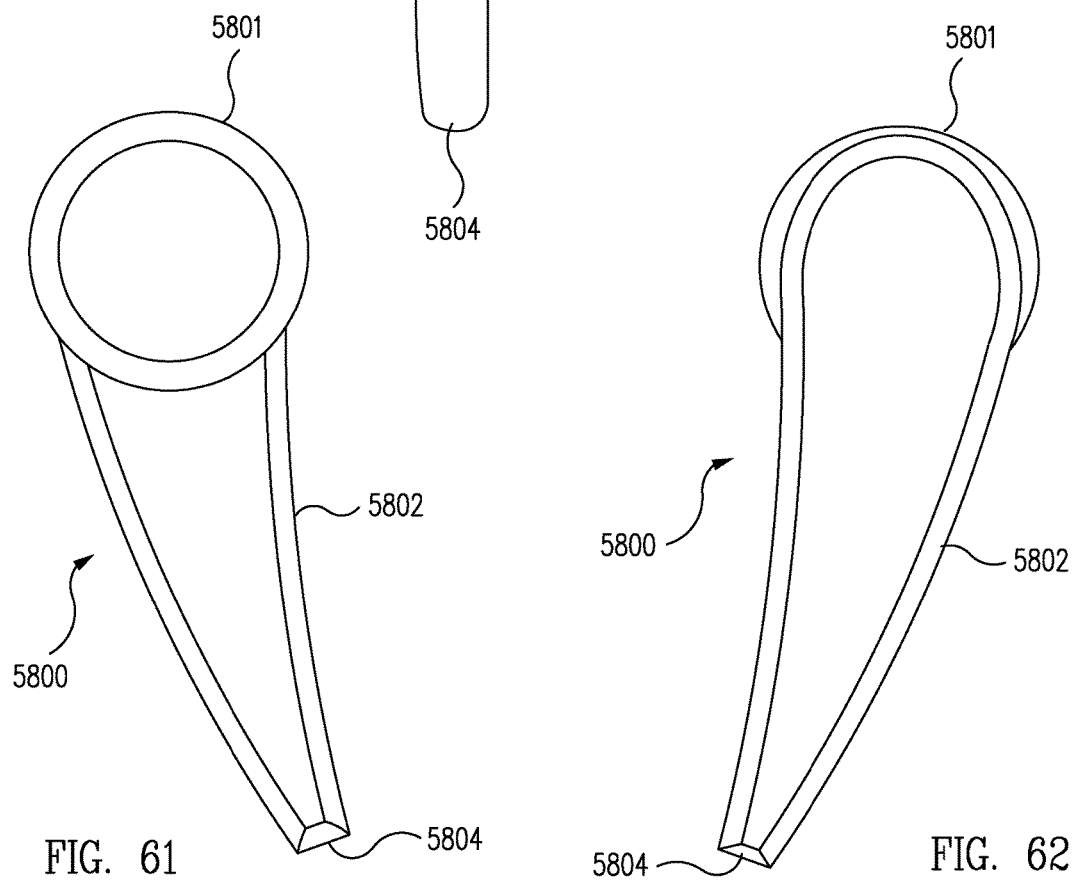
FIG. 61
FIG. 62

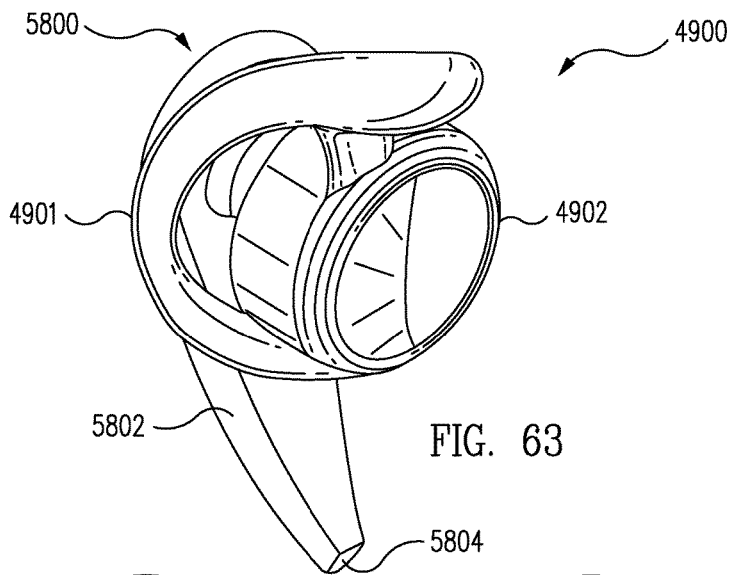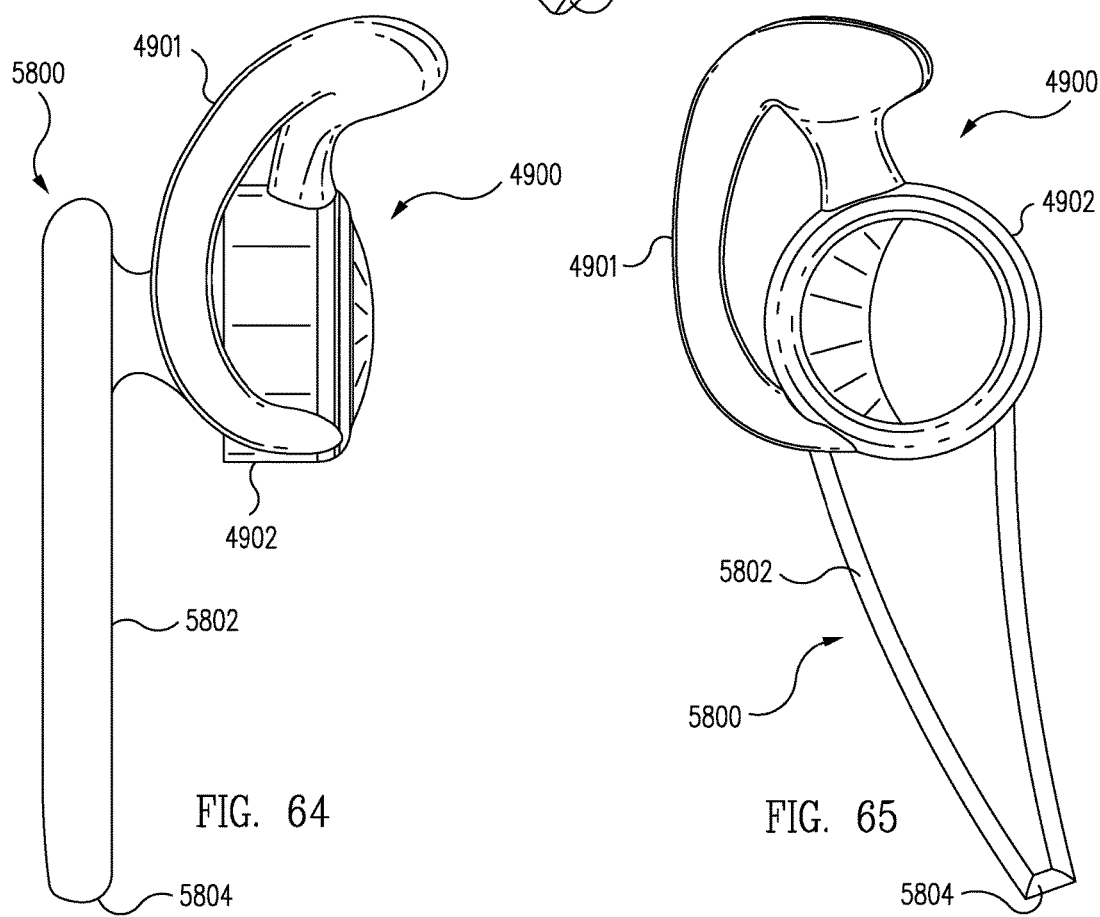
FIG. 63
FIG. 64
FIG. 65

ERGONOMIC EARPIECE WITH ATTACHMENT MOUNT

CROSS-REFERENCE TO RELATED APPLICATIONS

This patent application is a continuation-in-part of U.S. patent application Ser. No. 15/418,503 filed on Jan. 27, 2017, which is a continuation of U.S. patent application Ser. No. 15/061,766 filed on Mar. 4, 2016, which is a continuation of U.S. patent application Ser. No. 14/106,650 filed on Dec. 13, 2013, which is a continuation of U.S. patent application Ser. No. 13/198,254 filed on Aug. 4, 2011.

U.S. patent application Ser. No. 13/198,254 is a continuation-in-part of U.S. patent application Ser. No. 12/852,179 filed on Aug. 6, 2010, which is a continuation of U.S. patent application Ser. No. 11/236,969 filed on Sep. 27, 2005, which claims the benefit of U.S. Provisional Patent Application No. 60/613,742 filed on Sep. 27, 2004.

U.S. patent application Ser. No. 13/198,254 is a continuation-in-part of U.S. patent application Ser. No. 11/411,314 filed on Apr. 26, 2006, which is a continuation-in-part of U.S. patent application Ser. No. 11/247,105 filed on Oct. 11, 2005.

U.S. patent application Ser. No. 13/198,254 is a continuation-in-part of U.S. patent application Ser. No. 11/872,324 filed on Oct. 15, 2007, which is a continuation-in-part of U.S. patent application Ser. No. 11/411,314 filed on Apr. 26, 2006, which is a continuation-in-part of U.S. patent application Ser. No. 11/247,105 filed on Oct. 11, 2005.

U.S. patent application Ser. No. 13/198,254 is a continuation-in-part of U.S. patent application Ser. No. 11/869,517 filed on Oct. 9, 2007, which is a continuation-in-part of U.S. patent application Ser. No. 11/411,314 filed on Apr. 26, 2006, which is a continuation-in-part of U.S. patent application Ser. No. 11/247,105 filed on Oct. 11, 2005.

U.S. patent application Ser. No. 13/198,254 is a continuation-in-part of U.S. patent application Ser. No. 11/868,720 filed on Oct. 8, 2007, which is a continuation-in-part of U.S. patent application Ser. No. 11/411,314 filed on Apr. 26, 2006, which is a continuation-in-part of U.S. patent application Ser. No. 11/247,105 filed on Oct. 11, 2005.

U.S. patent application Ser. No. 13/198,254 is a continuation-in-part of U.S. patent application Ser. No. 11/696,987 filed on Apr. 5, 2007. U.S. patent application Ser. No. 11/696,987 is a continuation-in-part of U.S. patent application Ser. No. 11/618,344 filed on Dec. 29, 2006, and is a continuation-in-part of U.S. patent application Ser. No. 11/411,314 filed on Apr. 26, 2006.

The entire contents of all of the above-mentioned patent applications are hereby expressly incorporated by reference in their entirety.

BACKGROUND

Technical Field

The present invention relates generally to earpieces such as those used by security, law enforcement, and military personnel to facilitate listening to two-way radios, and those used by consumers in headsets for used with mobile phones, music devices, and other devices. The present invention relates more particularly to an ergonomic earpiece and attachments for the ergonomic earpiece.

Related Art

Earpieces for use by security, law enforcement, and military personnel are well known. Such earpieces fit into the concha bowl of the ear and facilitate listening to two-way radios and the like. Contemporary earpieces typically comprise a generally arcuate rib connected to a generally vertical rib so as to define a D shape. A top lobe is formed at the top, near where the generally arcuate rib and the generally vertical rib intersect. Similarly, a bottom lobe is formed at the bottom, near where the generally arcuate rib and the generally vertical rib intersect.

In many instances, when the generally arcuate rib is too large for the concha, the generally arcuate rib bends and forces the lower lobe against the ear. The lower lobe can rub the ear, causing pain and sometimes even tissue damage and/or infection. Such contemporary earpieces also suffer from various disadvantages regarding their effectiveness and their ability to fit a wide range of ear sizes and configurations. For example, contemporary earpieces are not as effective as desired with respect to delivering desired sounds to the eardrum while preventing other sounds (ambient sounds such as noise) from reaching the eardrum.

In addition, many existing earpieces provide limited flexibility in the manner in which they can accommodate various attachments. For example, certain existing earpieces may adopt a one-size-fits-all approach in which an attachment to the earpiece provides little or no adjustment in the way that the attachment is positioned relative to the user's ear. Such configurations can lead to improper fitment of attachments, user discomfort, or even compromised user safety. Accordingly, there is a need to provide improved ways of securing attachments to earpieces.

In view of the foregoing, it is desirable to provide an earpiece and attachments for the earpiece that enhance its fit while providing a secure engagement with the user's ear. It is also desirable to provide an earpiece and attachments for the earpiece that enhance the ability of the earpiece to deliver desired sounds to the eardrum while preventing other sounds from reaching the eardrum.

SUMMARY

According to an embodiment, an earpiece substantially lacking a lower lobe is disclosed. The earpiece can have a smooth bend instead of the lower lobe of contemporary earpieces. That is, the lower lobe can be either completely or partially absent. In this manner, disadvantages associated with the lower lobe can be mitigated, while still providing an earpiece that functions as desired.

According to an embodiment, the earpiece can have a generally arcuate rib having upper and lower ends. A lobe can be formed at the upper end of the rib, while no lobe is formed at the lower end of the rib. An extension can extend from the earpiece some distance into the user's ear canal.

According to an embodiment, a method can comprise providing an earpiece generally comprising a generally arcuate rib having upper and lower ends. A lobe can be formed at the upper end of the rib, while no lobe is formed at the lower end of the rib. The method can further comprise attaching an extension to the earpiece such that the extension protrudes from the earpiece and extends into the user's ear canal.

According to an embodiment, a method can comprise placing an earpiece in the concha of a user's ear. The earpiece can comprise a generally arcuate rib having upper and lower ends, with a lobe formed at the upper end of the rib. No lobe is formed at the lower end of the rib. The method can further comprise placing an extension attached to the earpiece into the user's ear canal.

According to an embodiment, an earpiece can comprise an arcuate rib having a lobe disposed on an upper end thereof and configured to engage with a crus of a helix and an antihelix of a user's ear; and a mount extending from the arcuate rib and comprising a snap clip configured to engage and position an audio device in contact with the user's ear.

According to an embodiment, a method can comprise engaging an earpiece with an audio device, wherein the earpiece comprises: an arcuate rib having a lobe disposed on an upper end thereof, and a mount extending from the arcuate rib and comprising a snap clip configured to engage the audio device; engaging the lobe of the arcuate rib with a crus of a helix and an antihelix of a user's ear; and positioning, by the mount, the audio device in contact with the user's ear.

One or more embodiments of an earpiece can enhance comfort during use by eliminating or substantially reducing the lower lobe. Thus, a potential source of discomfort, irritation, pain, tissue damage, and even infection is mitigated. The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 60 is a left side elevational view of the example attachment of FIG. 58, according to an embodiment;

FIG. 61 is a front plan view of the example attachment of FIG. 58, according to an embodiment;

FIG. 62 is a rear plan view of the example attachment of FIG. 58, according to an embodiment;

FIG. 63 is a front-left-bottom perspective view of the earpiece of FIG. 49 along with a portion of a front-left-top perspective view of the example attachment of FIG. 58 coupled thereto, according to an embodiment;

FIG. 64 is a bottom side elevational view of the earpiece of FIG. 49 along with a portion of a left side elevational view of the example attachment of FIG. 58 coupled thereto, according to an embodiment;

FIG. 65 is a front plan view of the earpiece of FIG. 49 along with a portion of front plan view of the example attachment of FIG. 58 coupled thereto, according to an embodiment;

Embodiments of the present invention and their advantages are best understood by referring to the detailed description that follows. It should be appreciated that like reference numerals are used to identify like elements illustrated in one or more of the figures.

DETAILED DESCRIPTION

The discomfort associated with wearing contemporary earpieces can be a substantial disadvantage. Not only can the discomfort be a motivation for removing the earpiece, but it can be a dangerous distraction. Because of the discomfort, a wearer may consciously or unconsciously manipulate the earpiece in an attempt to relieve the discomfort that it causes. In doing this, the wearer can be distracted. As those skilled in the art will appreciate, such a distraction can be very dangerous to security, law enforcement, and military personnel. Many times, it is important that such people give their full attention to their environment, since their lives may very well depend upon their ability to do so. Any distraction can have severe consequences.

For example, if an earpiece is used that is too large for the ear, then the generally arcuate rib can collapse as the oversized earpiece is forced into the ear. When the generally arcuate rib collapses, then the lower lobe can torque, twist, bend or otherwise move or deform in a manner that can cause discomfort, pain, and/or tissue damage, particularly with prolonged usage. It is desirable to provide an earpiece that does not rub the ear, even when the generally arcuate rib bends substantially because the generally arcuate rib is too large for the ear.

Furthermore, contemporary earpieces can be ineffective at providing a secure fit within the user's ear and at providing desired sounds to the eardrum. Contemporary earpieces can also be ineffective at reducing the level of undesired sound before it reaches the eardrum.

Methods and systems are described herein for providing earpieces that better fit the user's ear, are more comfortable, better provide desired sounds to the eardrum, and better prevent undesired sounds from reaching the eardrum. Embodiments of various earpieces are discussed herein with reference to the figures. In one embodiment, an earpiece can be configured to be captured by protrusions of the concha. For example, the earpiece can be configured to be captured at least partially by the antihelix of the ear and/or other anatomical structures of the ear that are proximate or within the concha bowl. In this manner, the earpiece is held securely in place during use.

In the present disclosure, various earpieces and other features are described and set forth with regard to several embodiments. It is contemplated that features of the disclosed embodiments may be combined in any manner as may be desired for various applications and implementations.

Figure 1:
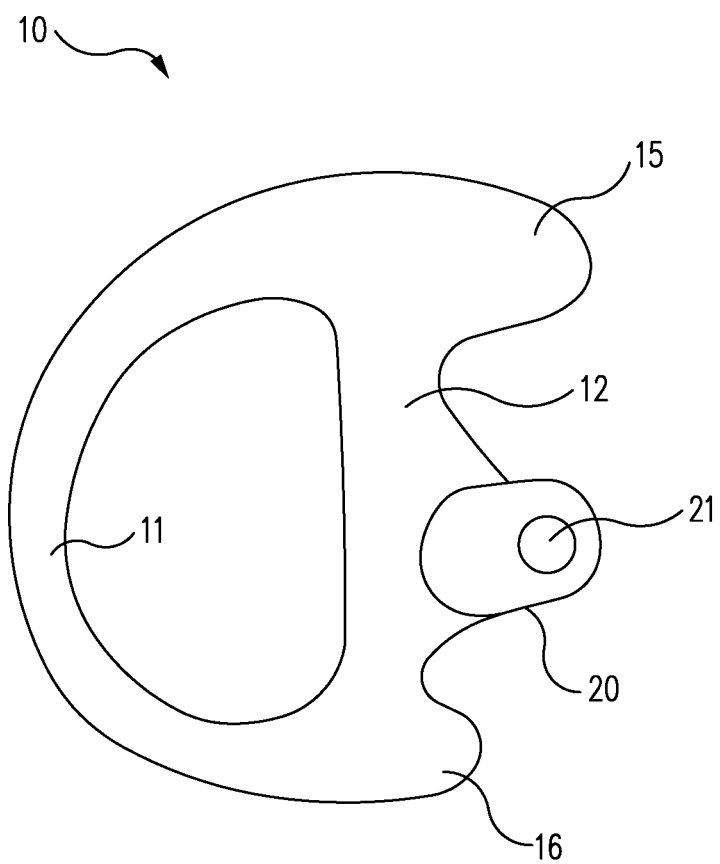
FIG. 1 is a side view of the inboard (toward the head) side of a contemporary left earpiece having a lower lobe (the opposite or outboard side being substantially the same as the inboard side, but lacking the protrusion that goes into the ear), according to an embodiment.

Referring now to FIG. 1, a contemporary earpiece 10 comprises a generally arcuate rib 11 and a generally vertical rib 12. An upper lobe 15 (e.g., also referred to as a top lobe) is formed at the top, near where the generally arcuate rib 11 and the generally vertical rib 12 intersect. Similarly, a lower lobe 16 (e.g., also referred to as a bottom lobe) is formed at the bottom, typically near where the generally arcuate rib 11 and the generally vertical rib 12 intersect. This lower lobe 16 is captured between the tragus 505 and the antitragus 504, while the top lobe is captured by the crus 506 of the helix 507 and the antihelix 510 (see FIG. 42). A protrusion 20 (also referred to as a stem) extends away from the generally vertical rib 12 and is configured to enter the ear canal 509 (see FIG. 42). A bore 21 formed in the protrusion 20 transmits sound to a point proximate the eardrum. Acoustic tubing attaches to the contemporary earpiece 10 such that a generally contiguous sound channel is formed by the acoustic tubing and bore 21.

As mentioned above, in many instances, the generally arcuate rib 11 can be too large for the concha. In such instances generally arcuate rib 11 bends and thereby urges lower lobe 16 against the ear. The pressure of lower lobe 16 against the ear as it presses between the tragus 505 and the antitragus 504 can cause discomfort. During extended wear, this generally constant pressure can become substantially painful. It can result in tissue damage that can cause further pain. Infection can even result.

It has previously been thought that lower lobe 16 was necessary to maintain an earpiece, such as contemporary earpiece 10, securely within the wearer's ear. However, as discussed herein, the present disclosure provides various embodiments in which an earpiece may be provided that lacks the lower lobe, yet remains securely within the wearer's ear even during intense physical activity.

Figure 2A:
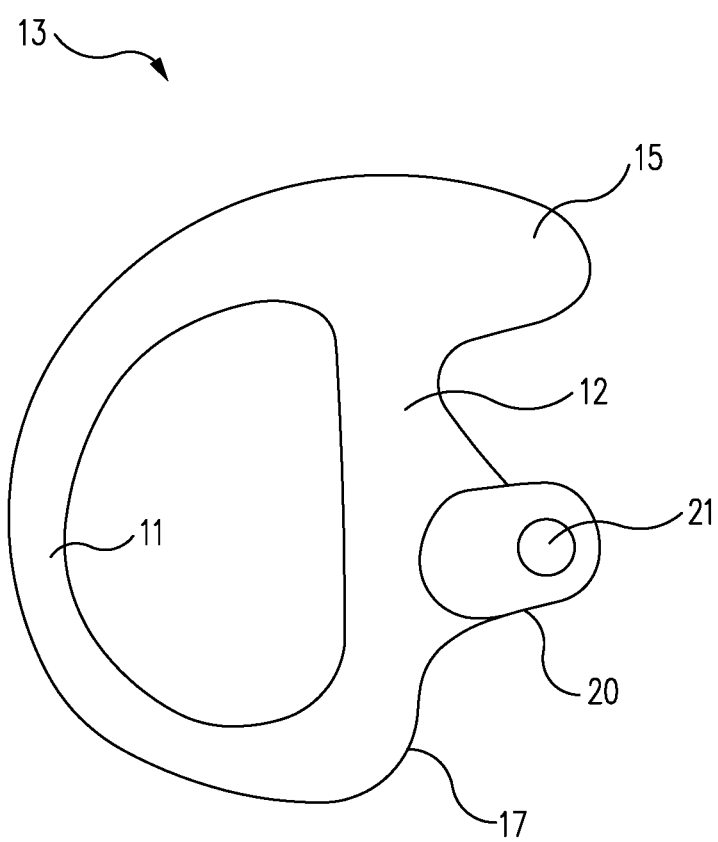
FIG. 2A is a side view of the inboard side of a left earpiece that has a smooth bend where the lower lobe of a contemporary earpiece is located and thus substantially lacks the lower lobe, according to an embodiment.
Figure 2B:
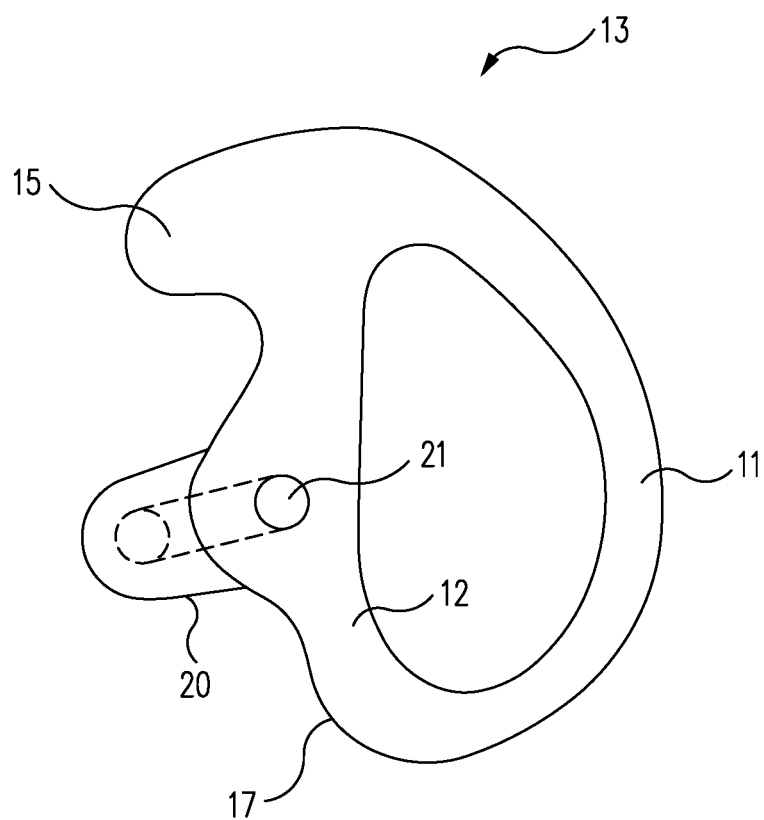
FIG. 2B is a side view of the outboard side of the left earpiece of FIG. 2A, showing the bore in dashed lines, according to an embodiment.
Figure 2C:
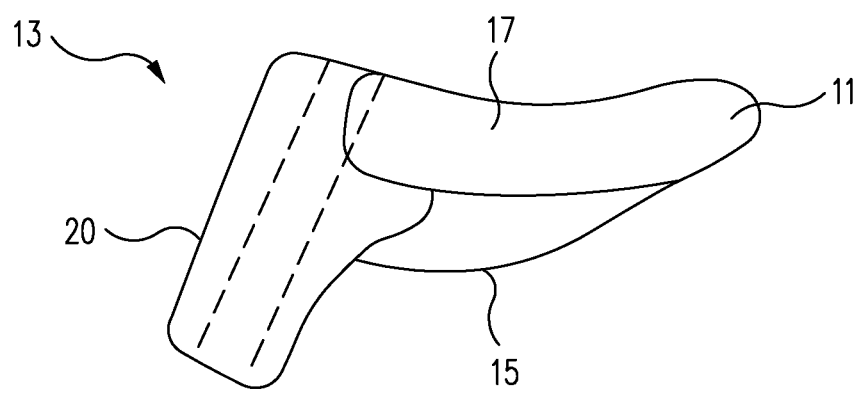
FIG. 2C is a bottom view of the left earpiece of FIG. 2A, showing the bore in dashed lines, according to an embodiment.

Referring now to FIGS. 2A-2C, according to one or more embodiments, an earpiece 13 may be provided wherein the lower lobe (such as lower lobe 16 of the contemporary earpiece 10 of FIG. 1), is omitted. Rather, instead of such a lower lobe, a smooth rounded surface 17 (e.g., a smooth bend) may be provided in earpiece 13. The smooth rounded surface 17 does not extend substantially away from the intersection of the generally arcuate rib 11 and the generally vertical rib 12 in the manner that a lower lobe does, and thus does not extend substantially into the space between the tragus 505 and the antitragus 504.

According to an embodiment, when earpiece 13 is used in an ear where the generally arcuate rib 11 is too large for the ear (does not fit within the concha without substantial deformation), the generally arcuate rib 11 merely bends or collapses without adverse affect. Since there is no lower lobe, there is consequently no pressure on the antitragus 504 and the tragus 505, no rubbing, and no cause of discomfort.

Thus, in an exemplary embodiment the earpiece 13 can comprise a generally arcuate rib 11 having upper and lower ends, a generally vertical rib 12 extending substantially between the upper and lower ends, and an upper lobe 15 formed at the upper end of the generally arcuate rib 11. A smooth rounded surface 17 can be formed at the lower end of the generally arcuate rib 11. The earpiece 13 can be configured to be generally shaped like a D. However, those skilled in the art will appreciate that other embodiments are likewise suitable. For example, either the generally vertical rib 12 or the generally arcuate rib 11 can be modified substantially or omitted.

The earpiece 13 can further comprise a protrusion 20 having a bore 21 formed therethrough. The protrusion 20 can be configured to extend at least partially into the ear canal 509. The bore can transmit sound, such as from a two-way radio, to the wearer's eardrum.

The earpiece 13 can be formed of a resilient polymer. For example, in one embodiment, the earpiece 13 can be formed of a resilient polymer having a Shore A durometer of between 35 and 45. More particularly, the earpiece 13 can be formed of a resilient polymer having a Shore A durometer of approximately 40. Alternatively, in another embodiment, the earpiece 13 can be formed of a more rigid material.

In various exemplary embodiments, the generally arcuate rib 11 can bend to accommodate a wide range of ear sizes. For example, the generally arcuate rib 11 can collapse so as to accommodate a range of ear sizes. Such collapsing of the earpiece 13 is made substantially more comfortable by the lack or partial lack of the lower lobe. That is, as the generally arcuate rib 11 collapses, there is no lower lobe or not enough lower lobe to torque, twist, bend, or otherwise move or deform in a manner that can cause discomfort.

One embodiment of the earpiece 13 can be configured to fit at least extra large sized ears. Similarly, one embodiment of the earpiece 13 can be configured to fit at least extra large sized ears and large sized ears. Moreover, a single embodiment of the earpiece 13 can be configured to fit most adult ears. For example, the earpiece 13 can be configured to fit at least 70% of ears of men between 19 and 40 years old. Bending of the generally arcuate rib 11 and lack of the lower lobe cooperate to facilitate the fitting of such a large range of sizes.

At least one embodiment comprises a portable communication system comprising a radio and also comprising earpiece 13 having a smooth rounded surface 17 instead of a lower lobe, as described above. Further, one or more embodiments can be used in applications other than security, law enforcement, and military applications. For example, one or more embodiments can be used with cellular telephones, portable music devices (such as iPods®, CD players, MP3 players, cassette players, or other types), and other mobile devices. In such applications, a speaker can be in acoustic communication with the bore 21 of the earpiece 13 via acoustic tubing or the like. Alternatively, a speaker can be attached directly to the earpiece 13, such as by mounting the speaker to the earpiece 13 or by placing the speaker inside or partially inside of the earpiece 13.

The earpiece 13 can also be used as a sound attenuating earplug, such as by configuring the protrusion 20 to seal or partially seal the ear. Alternatively, a member that seals or partially seals the ear can be added to the earpiece 13.

Since less material is used (because a portion of the earpiece 13 is reduced in size or eliminated), the earpiece 13 can be less expensive to manufacture. Since such earpieces 13 may be frequently purchased in bulk, such cost savings can be substantial. Further, since a single earpiece 13 fits a greater range of ear sizes, fewer earpieces 13 need to be inventoried by law enforcement departments and the like. Such reduction in inventory may save such agencies substantial money.

Figure 3:
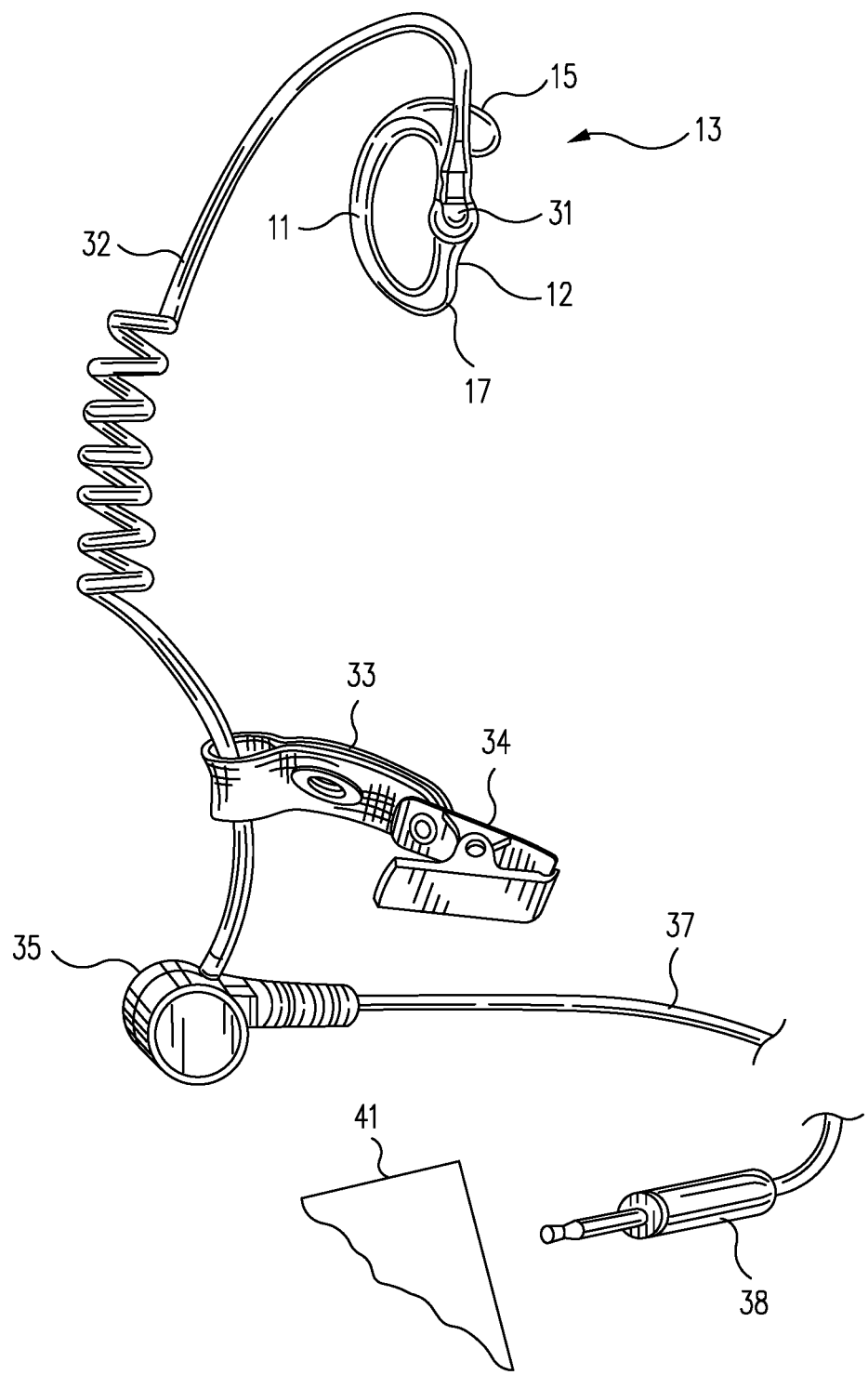
FIG. 3 is a perspective view of the left earpiece of FIGS. 2A-2C attached to acoustic tubing via a barbed fitting and having a speaker also attached to the acoustic tubing, wherein the speaker has a plug for attachment to a two-way radio, according to an embodiment.
Figure 4:
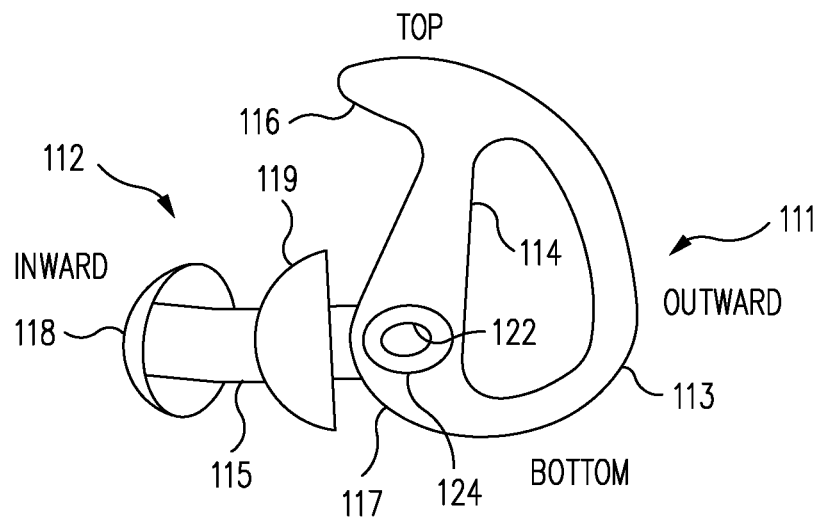
FIG. 4 is a perspective view of an earpiece having a flanged extension, according to an embodiment.

Referring now to FIG. 3, the earpiece 13 can be attached to acoustic tubing 32, such as via a barbed fitting 31. A strap 33 can be used to secure acoustic tubing 32 to a wearer's clothing, such as via a clip 34. A speaker 35 converts electrical signals received via electrical cable 37 from a two-way radio 41 into sound that is transmitted to the eardrum via acoustic tubing 32 and via bore 21 (see FIGS. 2A-2C) of the earpiece 13. A plug 38 can be used to connect electrical cable 37 to two-way radio 41.

According to various embodiments, an earpiece assembly can have a flanged extension that is suitable for use as hearing protection, is suitable for facilitating listening to a two-way radio or the like, or is suitable for providing a combination of hearing protection and such listening. One or more embodiments can comprise a solid extension so as to substantially attenuate ambient sound. Alternatively, one or more embodiments can comprise a hollow or partially hollow extension to allow at least some ambient sound or sound from a radio to pass therethrough.

According to one embodiment, an earpiece is held in place by anatomical structures of the ear and the earpiece holds the extension in place within the ear canal 509. That is, the earpiece prevents the extension from loosening or falling out of the ear canal 509. According to one embodiment, the earpiece positions a sound port at the distal end of the extension near the eardrum so that the volume of a two-way radio can be reduced. That is, the earpiece determines how far into the ear the extension extends.

Various combinations of sound attenuation and sound transmission may be provided. For example, a hollow or partially hollow extension may be configured so as to substantially attenuate some ambient sound (such as potentially harmful loud noise), while allowing some ambient sound (such as voices) to be heard. Optionally, the extension can comprise one or more openings that allow a substantial portion of ambient sound to be heard, while also allowing radio communications to be heard. Optionally, a filter may be used to selectively allow sounds to be heard.

Referring now to FIGS. 4, 5, 9, and 10, one exemplary embodiment comprises an earpiece 111 to which an extension 112 (also referred to as an insert and an ear insert) is attached. Earpiece 111 is configured to be disposed in the concha of the outer ear. Extension 112 is configured to be disposed within the ear canal 509.

In one embodiment, earpiece 111 can have a generally D shaped configuration. Earpiece 111 can comprise a generally arcuate rib 113 that has upper and lower ends. Generally arcuate rib 113 can be attached to a generally vertical rib 114 at the upper and lower ends of generally arcuate rib 113. An upper lobe 116 can be formed proximate where generally arcuate rib 113 and generally vertical rib 114 join at the top of earpiece 111. A smooth curve 117 can be formed proximate where generally arcuate rib 113 and generally vertical rib 114 join at the bottom of earpiece 111, or if necessary a lower lobe could be formed to engage the tragus 505 and antitragus 504.

Earpiece 111 is configured to be disposed and held in place within the concha of a human ear. More particularly, the crus 506 of the helix 507 and the antihelix 510 of a wearer's ear cooperate to capture upper lobe 116. The antihelix 510 and the antitragus 504 cooperate to capture generally arcuate rib 113. Thus, earpiece 111 is configured to be captured by protrusions of the concha. In this manner, earpiece 111 is held firmly in place within the concha and can therefore maintain extension 112 in a desired position within the ear canal 509.

Extension 112 can be either removably or permanently attached to earpiece 111. Extension 112 can be removably attached to earpiece 111 by friction fit, by detents, by threads, or by any other desired means. For example, extension 112 can be friction fit to earpiece 111 by sizing a proximal portion 121 (see FIG. 5) of extension 112 so as to fit tightly within an aperture 161 (also referred to as an opening or a hole) of earpiece 111 (see FIG. 9). Extension 112 can be permanently attached to earpiece 111 by adhesive bonding, ultrasonic welding, or by any other desired means. Alternatively, extension 112 can be integrally formed to earpiece 111, such as by injection molding earpiece 111 and extension 112 within a common mold cavity. Thus, earpiece 111 and extension 112 can be formed either integrally or separately.

Earpiece 111 and extension 112 can be formed of a soft, resilient material to enhance comfort during use. Both earpiece 111 and extension 112 can be formed of the same material. For example, earpiece 111 and extension 112 can be formed of a resilient polymer, such as silicon rubber. For example, in one embodiment, earpiece 111 and extension 112 can be formed of a material having a Shore A durometer of between 35 and 45, such as a Shore A durometer of approximately 40. Alternatively, in another embodiment, the earpiece 13 can be formed of a more rigid material.

In one embodiment, earpiece 111 functions as a stop to prevent extension 112 from being inserted too far into the ear. In one embodiment, earpiece 111 also prevents extension 112 from being inadvertently removed or loosened from the ear. In one embodiment, the length of extension 112 determines, at least in part, how close the tip thereof is positioned with respect to the eardrum.

Figure 5:
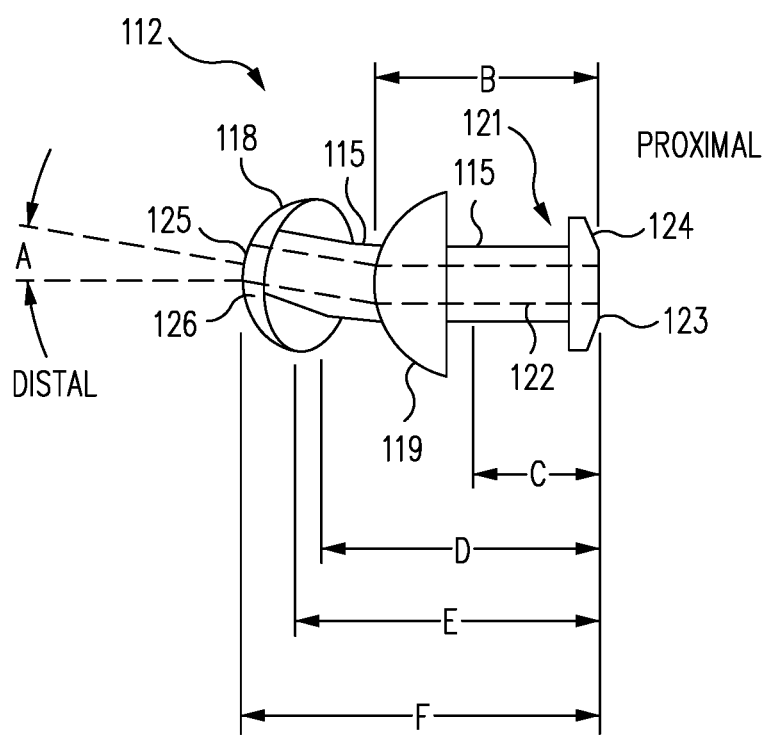
FIG. 5 is a perspective view of the extension of the earpiece of FIG. 4, wherein the extension is removed from the earpiece, according to an embodiment.

With particular reference to FIG. 5, according to one embodiment the extension 112 comprises a stem 115 and two flanges, 118 and 119 (e.g., also referred to as flanged members). Extension 112 can comprise any desired number of flanges, including no flanges at all, as discussed in further detail herein. Stem 115 can either be solid (so as to substantially block sound) or hollow (so as to substantially transmit sound). Stem 115 can also be partially hollow (so as to selectively transmit sound).

Stem 115 can bend such that it angles upwardly to conform to the upward angle of the ear canal 509. For example, in one embodiment, stem 115 can bend such that it angles upwardly at an angle, angle A, of approximately 30°. In one embodiment, the distance between the proximal end of extension 112 and the distal end of outer flange 119, dimension B, can be approximately 0.545 inch. In one embodiment, the distance between the proximal end of extension 112 and the point where a filter (such as a Hocks filter) ends, dimension C, can be approximately 0.304 inch. In one embodiment, the distance between the proximal end of extension 112 and the bend in stem 115, dimension D, can be approximately 0.680 inch. In one embodiment, the distance between the proximal end of extension 112 and a distal end of inner flange 118, dimension E, can be approximately 0.743 inch. In one embodiment, the distance between the proximal end of extension 112 and the distal end of inner flange 118, dimension F, can be approximately 0.870 inch.

In one embodiment, the diameter of stem 115 can be approximately 0.189 inch. Stem 115 can optionally have a bore 122 formed therethrough. In one embodiment, bore 122 can have a diameter of approximately 0.094 inch. In one embodiment, outer flange 119 can have a radius of approximately 0.241 inch. Similarly, in one embodiment, inner flange 118 can have a radius of approximately 0.193 inch. Thus, the radius of inner flange 118 can be substantially less than the radius of outer flange 119, so as to better accommodate the manner in which the ear canal 509 becomes narrower as it gets deeper.

The exemplary angle and dimensions discussed above provide a single extension 112 that is suitable for use with a large number of individuals. Those skilled in the art will appreciate that other dimensions are likewise suitable.

Figure 12:
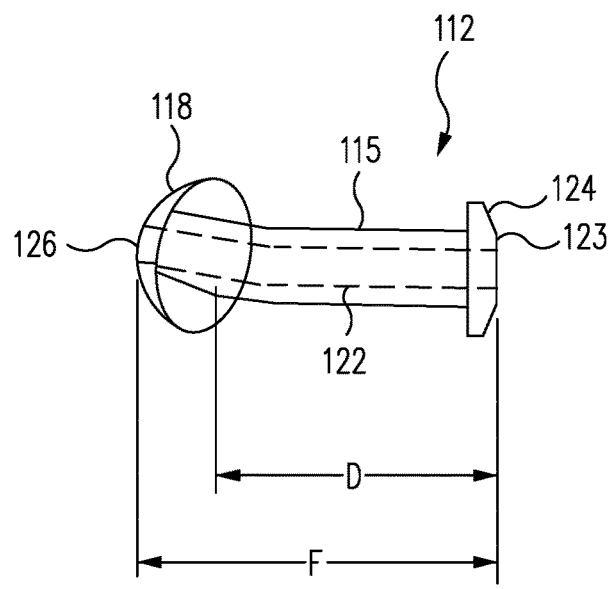
FIG. 12 is a perspective view of the extension of the earpiece of FIG. 11 wherein the extension is removed from the earpiece, according to an embodiment.

The distal end 125 of bore 122 defines a sound output port 126 (see FIGS. 5 and 12). Extension 112 is configured such that sound output port 126 is positioned proximate the wearer's eardrum. That is, extension 112 can be configured so as to position a distal end 125 thereof proximate the eardrum. In this manner, sound transmitted through bore 122 (such as sound from a two-way radio), is brought close to the eardrum such that the volume of the sound required can be substantially reduced. For example, the extension can position sound output port 126 within one, two, or three millimeters of the eardrum. In one embodiment, the extension can have a length of approximately ½ inch. In one embodiment, the extension can have a length of ⅝ inch or more.

Adjustment of the position of the distal end 125, as well as of the flanges 118 and 119, facilitates enhanced fitting of the earpiece 111. In this manner, comfort is enhanced. Because comfort is enhanced, a user is more likely to wear the earpiece 111. A better fit allows earpiece 111 to be worn for longer periods of time for both communications and hearing protection. A better fit also substantially reduces the likelihood of tissue damage to the ear caused by the earpiece 111.

A head 123 can be formed upon the proximal end of stem 115 so as to enhance friction with respect to aperture 161 of earpiece 111 and/or so as to define detents that tend to keep extension 112 attached to earpiece 111. Bevels 124 can optionally be formed upon head 123 to better facilitate insertion of head 123 through aperture 161. The head 123 can be positioned within the aperture 161 (FIGS. 9 and 10) of the earpiece 111 or can be pushed entirely therethrough and thus be position on the outward side of earpiece 111.

The extension 112 may comprise a flanged extension, having flanges 118 and 119 as shown in FIGS. 5-8 and 11-14, or may be a non-flanged extension. In one embodiment, the flanges 118 and 119 generally fill (close off) the ear canal 509 and tend to block ambient sound. Although sometimes it is desirable to block ambient sound, other times, it is desirable for the user to hear ambient sound. Thus, the flanges 118 and 119 can have one or more openings 131 formed therein, as discussed herein. Although two flanges 118 and 119 are shown, the extension 112 may comprise more or less flanges. For example, the extension 112 may comprise three, four, five, six, or more flanges, or no flanges. The flanges 118 and 119 need not be identical, but rather may vary in size, shape, orientation and/or positions of attachment to the stem 115, for example.

The extension 112 can have a bore 122 formed therethrough to facilitate the transmission of sound from a speaker (such as via acoustic tubing connected to the speaker) to the user's eardrum. Alternatively, the extension 112 can lack such a bore, so as to define an earplug, such as for attenuating ambient sound. Indeed, the bore 122 and/or openings 131 in the stem 115 and/or flanges 118 and 119 can be configured so as to selectively transmit and block desired sounds. Such selectivity can be based upon the frequency and/or intensity of the sound.

A user can wear one earpiece 111 having an extension 112 with a bore 122 and one earpiece 111 lacking a bore 122. The earpiece having an extension 112 with a bore 122 facilitates listening to a radio, while the earpiece 111 having an extension 112 without a bore 122 at least partially blocks distracting and/or potentially harmful ambient sound.

Figure 6:
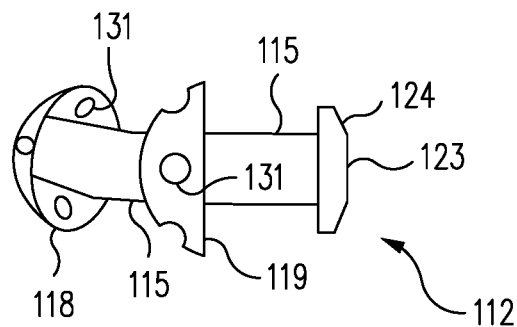
FIG. 6 is a perspective view of an alternative configuration of the extension of FIG. 5, wherein openings are formed in the flanges thereof, according to an embodiment.

Referring now to FIG. 6, flanges, 118 and 119 of extension 112 can optionally have one or more openings 131 formed therein. For example, each flange, 118 and 119, can have one, two, three, or four openings 131 formed therein. Openings 131 can be holes. Alternatively, the openings 131 can be cutouts, such as notches formed in the flanges 118 and 119. The openings 131 allow at least some ambient sound to better reach the user's eardrum.

Such openings 131 may be desirable when an embodiment is intended to facilitate listening to a two-way radio and when it is also desirable to hear ambient sound. For example, such openings 131 may be desirable in police applications where a police officer is required to hear both the two-way radio and face-to-face conversations.

Figure 7:
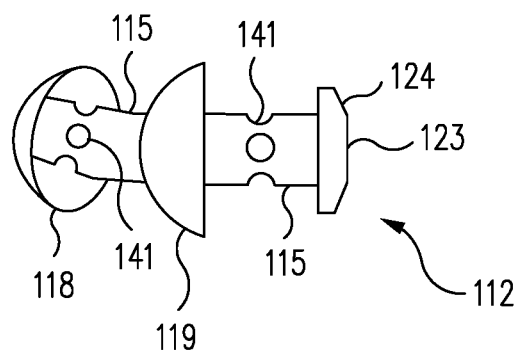
FIG. 7 is a perspective view of another alternative configuration of the extension of FIG. 5, wherein openings are formed in the stem thereof, according to an embodiment.

Referring now to FIG. 7, one or more openings 141 can be formed in stem 115, such as intermediate or proximate flanges 118 and 119. A curable polymer material suitable for use in the ear canal 509 can be injected into the tube such that it substantially fills the tube and/or at least some space between the flanges 118 and 119. That is, the injected polymer material extrudes from the openings 141 and tends to fill in the space intermediate the flanges 118 and 119. This injection may be accomplished with the extension inserted into a wearer's ear canal 509, so as to provide a custom fit. Alternatively, this injection may be performed using an artificial ear canal, such as for mass production.

Silicon rubber may be used as the extrudable material. Generally, any extrudable material suitable for use as earplugs can be used. In this fashion, attenuation of ambient sound is enhanced. Such earplugs are suitable for use in gun ranges and noisy industrial environments.

The opening at the distal end of the tube can optionally be closed to prevent leakage of the injected polymer material therefrom. A skin may be formed over the flanged extension to trap the polymer material and/or to facilitate easier insertion into the ears. Alternatively, the openings 141 can be omitted and the central bore of the tube can still be filled with polymer material to attenuate sound.

Figure 8:
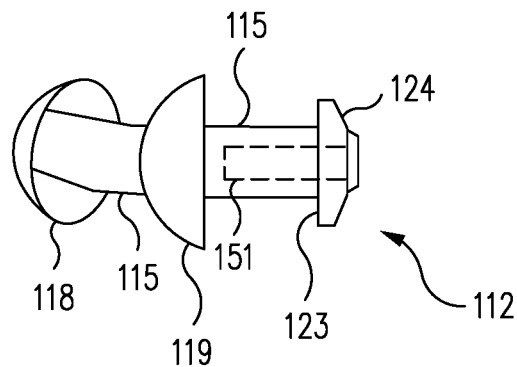
FIG. 8 is a perspective view of the extension of FIG. 5, showing a Hocks filter inserted therein, according to an embodiment.

Referring now to FIG. 8, a filter 151 can be inserted into bore 122 to selectively mitigate sound exposure. For example, a Hocks filter can be used to mitigate exposure to louder sounds, while still allowing a wearer to hear quieter sounds, such as speech.

Figure 9:
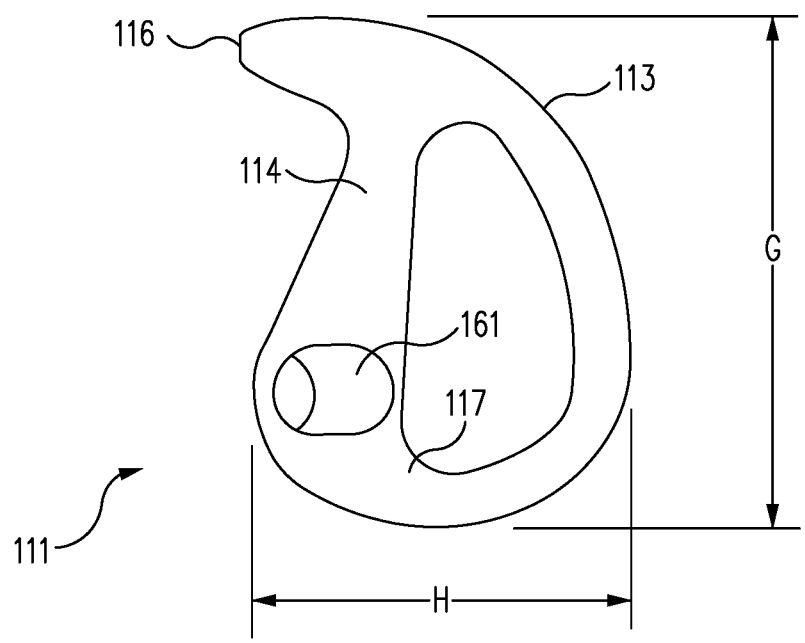
FIG. 9 is a side view of the earpiece of FIG. 4, wherein the extension is removed therefrom, according to an embodiment.
Figure 10:
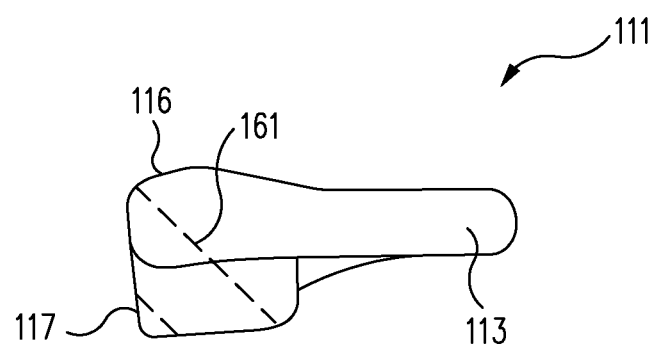
FIG. 10 is a bottom view of the earpiece of FIG. 4, showing the aperture therein with dashed lines, according to an embodiment.

Referring now to FIGS. 9 and 10, an earpiece 111 that is configured for use in the left ear is shown with the extension 112 removed therefrom. Generally arcuate rib 113 and generally vertical rib 114 generally define a D shape. When a mirror image of generally arcuate rib 113 and generally vertical rib 114 are configured for use in the right ear, a reverse (mirror image) generally D shape is similarly defined.

In one embodiment, for a medium size earpiece, the height, dimension G, can be approximately 1.087 inch and the width, dimension H, can be approximately 0.802 inch. In one embodiment, for a large size earpiece, the height, dimension G, can be approximately 1.150 inch and the width, dimension H, is approximately 0.850 inch.

In various embodiments, an earpiece 111 can optionally be used without an extension 112. The number of flanges 118 and 119, as well as the configuration of the flanges 118 and 119, can be varied to provide a desired balance of intensity of ambient sound and sound from the radio. The configuration of the flanges 118 and 119 can include the thickness thereof and the presence of openings 131 therein. This balance can depend upon the environment in which the earpiece 111/extension 112 is being used and can also depend upon the wearer's preference.

Figure 11:
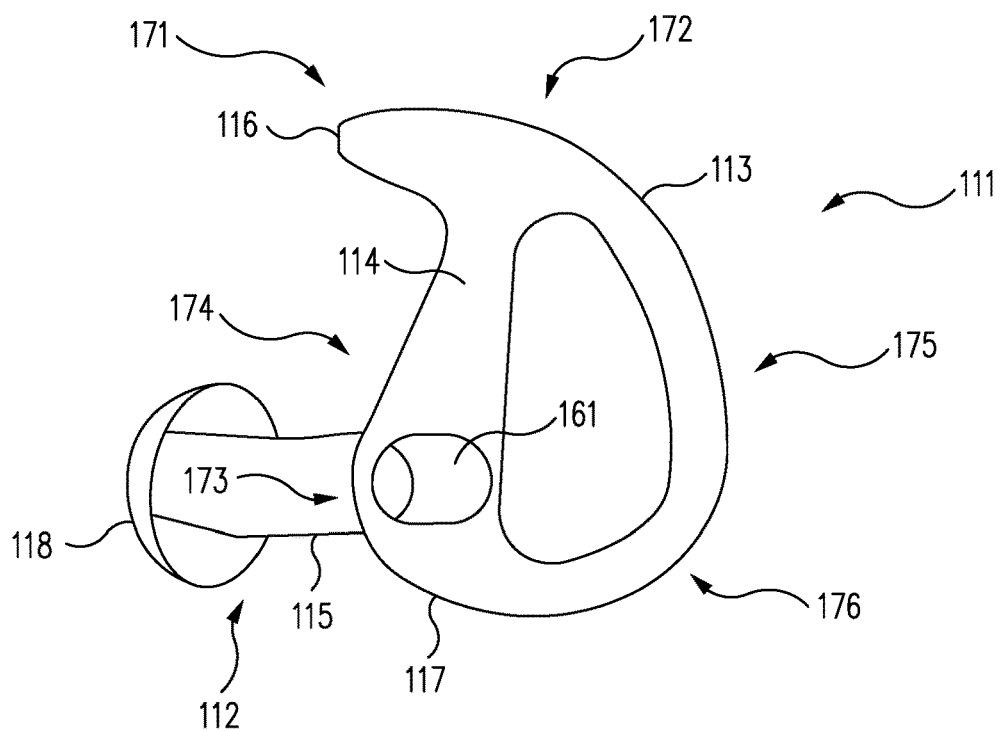
FIG. 11 is a perspective view of an earpiece having a flanged extension, according to an embodiment.

Referring now to FIGS. 11 and 12, outer flange 119 can optionally be omitted. Indeed, as mentioned above, extension 112 can comprise any desired number of flanges, including no flanges. In some instances, a single flange may perform adequately. This is particularly true when it is desirable to allow the wearer to hear ambient sound. Omitting the other flange(s) better allows ambient sound to be heard. In some applications, the primary reason for wearing the earpiece 111 may be to allow the wearer to better hear radio communications. Positioning output port 126 close to the eardrum accomplishes this goal.

Figure 13:
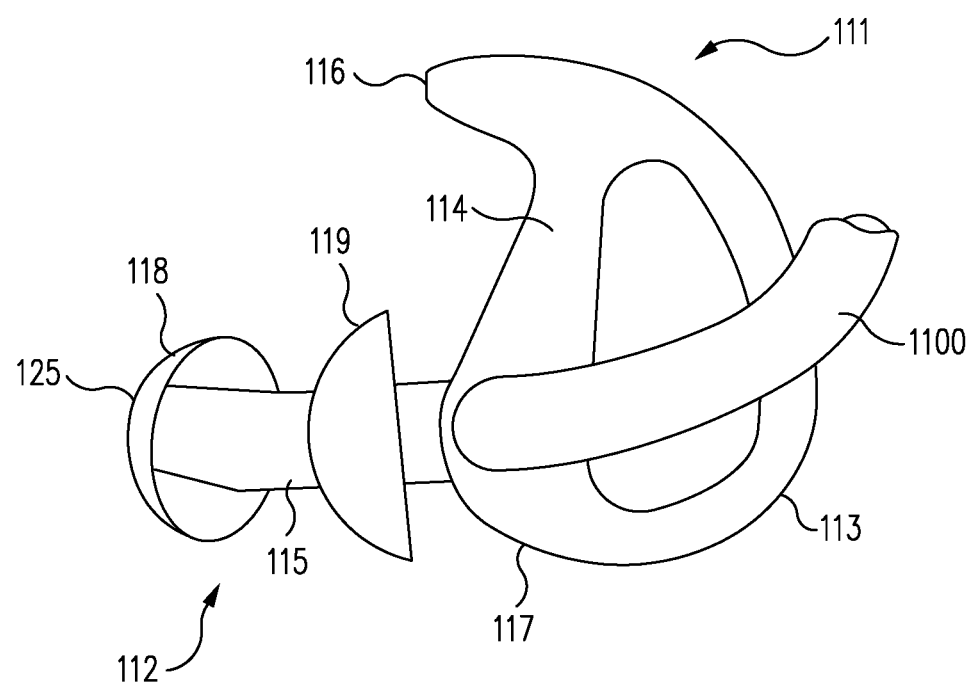
FIG. 13 is a perspective view of the earpiece of FIG. 4 having acoustic tubing attached thereto, according to an embodiment.

Referring now to FIG. 13, an acoustic tube 1100 can be attached to earpiece 111 and/or extension 112 such that a generally continuous bore is defined through which sound can travel from a speaker to the eardrum. A barbed metal or plastic fitting can be used to accomplish such attachment. Other methods of attachment, such as the use of adhesive bonding and/or ultrasonic welding, are likewise suitable.

Since the distal end 125 of extension 112 can be placed close to a wearer's eardrum, the volume of a two-way radio or other device (such as a cellular telephone, music device, or other device) can be substantially reduced. With the volume reduced, sound advantageously cannot be as easily heard by others. Thus, during covert operations, for example, the likelihood of someone other than the wearer undesirably hearing sound from a two-way radio is substantially mitigated. By reducing the sound volume, smaller, less powerful, and/or less expensive speakers can be used. Placing the sound closer to the eardrum can make it easier for the hearing impaired to hear.

Sound transmissive embodiments (such as those embodiments having a bore 122 formed through stem 115) can similarly be used with a variety of personal electronic devices that produce sound, including two-way radios, cellular telephones, music devices, personal digital assistants (PDAs), desktop computers, laptop computers, notebook computers, pocket PCs, hearing aids, and other devices.

Figure 14:
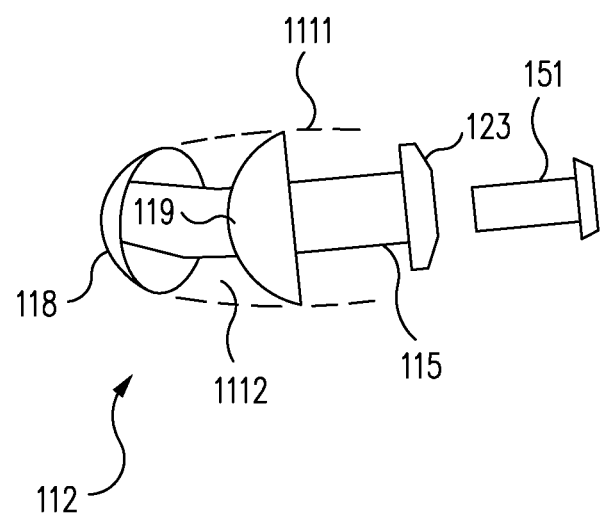
FIG. 14 is a perspective view of the extension of FIG. 8, showing the Hocks filter exploded therefrom and also showing a flexible skin (dashed lines) formed partially thereover, according to an embodiment.

Referring now to FIG. 14, according to another embodiment the extension 112 comprises one or more flanges 118 and 119 (similar to those of FIGS. 4, 5, 6, 7, 8, 11, 12, and/or 13), having a skin or covering 1111 formed thereover. Covering 1111 can be formed of a thin resilient material, such as rubber, such as that of which common balloons are formed. Optionally, foam or gel 1112 can be disposed between the covering 1111 and flanges 118 and 119. Foam or gel 1112 can comprise a biocompatible material, such as a silicon. Foam or gel 1112 can extend proximal of flange 119 if desired.

Foam or gel 1112 can be injected between covering 1111 and flanges 118 and 119 through openings 141 (see FIG. 7), as discussed herein. Such a covering 1111 can be used with extension 112 shown in FIG. 7, where an extrudable substance (which can be a foam or gel) is injected into bore 122 (see FIGS. 4 and 5) and passes through holes 141 to fill the void between the flanges 118 and 119.

Thus, according to at least one exemplary embodiment the extension 112 can comprise a tube (such as stem 115) and a skin or covering 1111 (e.g., a rubber skin in one example), wherein foam or gel 1112 or some other resilient substance is disposed between the tube and the skin or covering 1111. The tube can be formed of a flexible polymer material. However, the tube may alternatively be formed of a rigid polymer or metal material. The tube, foam or gel 1112, and skin or covering 1111 can be attached to one another via any desired combination of friction fitting, adhesive bonding, and ultrasonic welding. The extension 112 can be tapered to facilitate easy insertion into the ear canal 509 and to provide a good fit therein.

Any desired combination of flanges, foam, fiber, and fabric can be used to at least partially block the ear canal 509 and thereby mitigate the transmission of sound therethrough. For example, the flange 118 of the extension 112 of FIG. 12 could be replaced with a section of foam or gel similar to the foam or gel 1112 shown in FIG. 14.

In various embodiments, the extension 112 can be bent as shown in FIGS. 4-8 and 11-14 so as to better conform to the shape of the ear canal 509. Alternatively, extensions can be provided that are generally vertical (e.g., straight) as shown in FIGS. 15-18 further discussed herein. If an extension is generally vertical, it can be formed of a material that is bendable, so that the extension can conform, at least somewhat, to the shape of the ear canal 509 when inserted therein.

The aperture 161 (see FIG. 9) in earpiece 111 can be configured such that the extension 112 is positioned at the top of the ear canal 509, at the bottom of the ear canal 509, at one side of the ear canal 509, or is approximately centered in the ear canal 509. In one embodiment, configuring the aperture 161 such that the extension 112 is not approximately centered causes the extension 112 to be biased toward an inner surface of the ear canal 509 and can help to keep the earpiece 111 and extension 112 in the ear. In one embodiment, if the earpiece 111 and/or the flanges 118 and 119 of the extension 112 are sufficient to keep the earpiece 111 and the extension 112 in the ear, then the extension 112 can be positioned approximately in the center of the ear canal 509. Positioning the extension 112 approximately in the center of the ear canal 509 may be more comfortable for some wearers.

Any of the extensions disclosed herein that employ flanges can either be ambidextrous (formed to fit either the right or left ear), or can be dedicated to fit only one ear. Thus, the flanges can be either radially symmetric for use with either ear, or can be asymmetric such that they tend to be optimized for a particular ear (left or right). They can also be optimized in configuration so as to better fit a particular person's ear.

In certain embodiments, any of the flanges disclosed herein may be formed integrally with the stem of an associated extension. In other embodiments, the flanges may be formed separate from the stem and may be formed of a different material with respect thereto.

In various embodiments, an extension may be provided with multiple flanges to advantageous effect over implementations employing fewer flanges. For example, in one embodiment, multiple flanges may permit an earpiece to be better secured in the ear. In another embodiment, multiple flanges may mitigate ambient sound before such sound reaches a wearer's eardrum, particularly if the flanges do not have holes formed therein. In another embodiment, multiple flanges may better prevent the sound of a radio or other sound device from escaping from the ear and thus prevent such sound from being undesirably heard by others, particularly if the flanges do not have holes formed therein.

Figure 15:
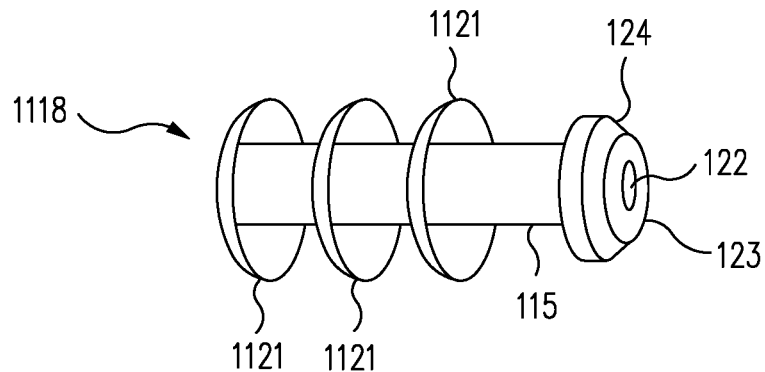
FIG. 15 is a perspective view of an extension having three flanges, according to an embodiment.

FIGS. 15-20 illustrate several extensions that may be used with the various earpieces of the present disclosure. Referring now to FIG. 15, an extension 1118 can have three flanges 1121 formed upon stem 115 thereof. As those skilled in the art will appreciate, the use of more flanges generally provides better sound reduction. The use of more flanges can also better secure the extension 1118 within the ear canal 509.

Figure 16:
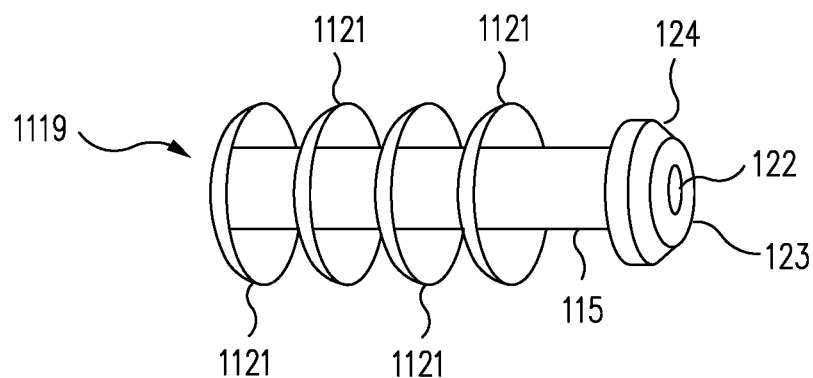
FIG. 16 is a perspective view of an extension having four flanges, according to an embodiment.

Referring now to FIG. 16, an extension 1119 can have four flanges 1121 formed upon stem 115 thereof. Indeed, the extension 1119 can have any desired number of flanges formed upon stem 115 thereof.

Figure 17:
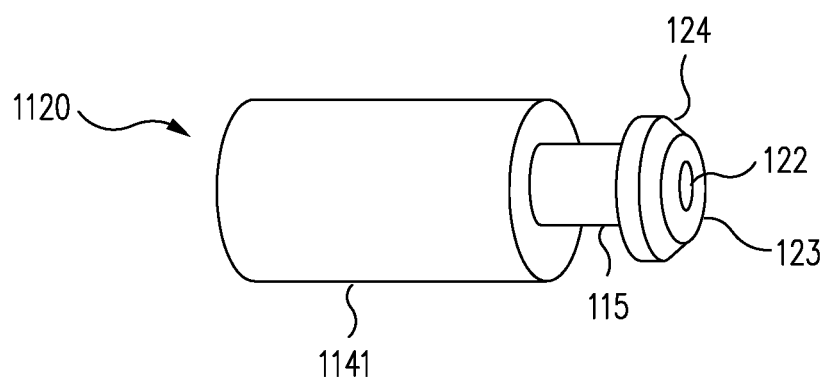
FIG. 17 is a perspective view of a foam, fiber, or fabric extension, according to an embodiment.
Figure 18:
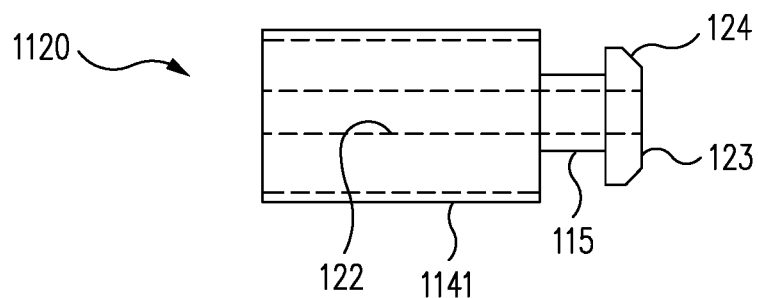
FIG. 18 is a side view of a foam, fiber, or fabric extension having a sound transmissive bore formed therethrough, according to an embodiment.
Figure 19:
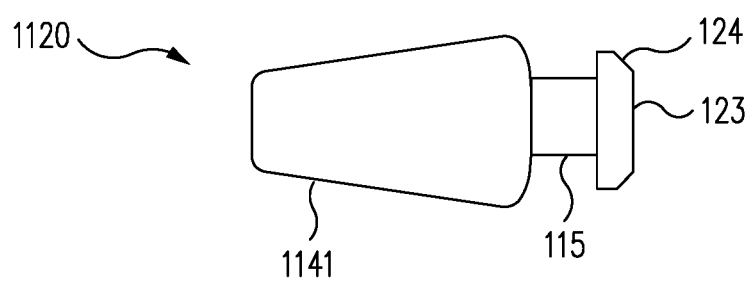
FIG. 19 is a side view of a tapered foam, fiber, or fabric extension, according to an embodiment.

Referring now to FIGS. 17-19, an extension 1120 may include a stem 115 covered with a resilient substance 1141 such as foam, fiber, or fabric. Foam, such as a polymer foam, can be used to define a portion of the extension 1120. In one embodiment, the foam is compressed before or as it enters the ear canal 509 and then expands so as to effectively block at least a portion of the ear canal 509. In a similar manner, fiber, such as cotton, can be used to define a portion of the extension. For example, cotton can cover a portion of the extension in a manner similar to the way that cotton covers the end of a cotton swab. Cotton fiber is sufficiently compressible and resilient so as to function in a manner similar to foam. Fabric, such as woven cotton, can similarly be used to cover a portion of the extension 1120. Any desired combination of foam, fiber, and fabric may be used. For example, cotton fabric can be used to cover cotton fiber.

Referring now to FIG. 19, the resilient substance 1141 can be tapered. In one embodiment, tapering the resilient substance 1141 makes it conform better to the shape of the ear canal 509. In one embodiment, tapering the resilient substance 1141 can make insertion thereof into the ear canal 509 easier.

The resilient substance 1141 of FIGS. 17-19 can be formed over stem 115, as discussed above. Alternatively, the resilient substance 1141 can be attached to head 123 or the like without being formed over a stem. For example, the resilient substance 1141 can be attached to a shorter stem that does not pass substantially therethrough. As a further example, the resilient substance 1141 can be attached directly to head 123 or the like.

Figure 20:
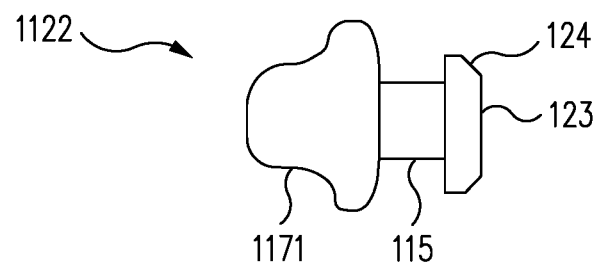
FIG. 20 is a side view of an extension that in use is not inserted substantially into the ear canal, according to an embodiment.

Referring now to FIG. 20, an extension 1122 is shown with a portion 1171 that is inserted into the ear canal 509 and can be formed such that it does not substantially enter the ear canal 509. The portion 1171 can be formed of a rigid material or of a resilient substance. It can also be formed by providing a resilient layer over a substantially rigid material. It need only enter the ear canal 509 far enough so as to be effective in mitigating the level of ambient sound reaching the eardrum.

Figure 21:
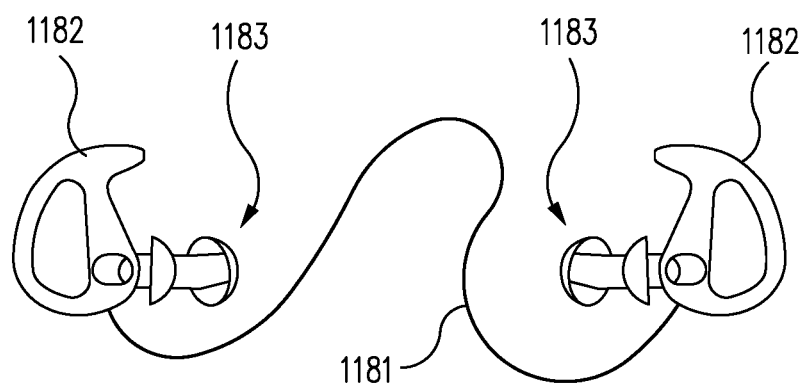
FIG. 21 is a perspective view of two earpieces with extensions having a lanyard interconnecting them, according to an embodiment.

Referring now to FIG. 21, a lanyard 1181 can be used to interconnect earpieces 1182 (each having an extension 1183) to each other and/or to any other item. For example, lanyard 1181 can be used to connect earpieces 1182 to the wearer's clothing, e.g., shirt, jacket, hat, helmet, etc. Lanyard 1181 can interconnect earpieces 1182 that are both configured as earplugs (both lack bores and are intended to mitigate sound exposure). Alternatively, one or both earpieces 1182 can be configured to transmit some sound, such as via the use of a bore for transmitting sound from a two-way radio or the like.

In various exemplary embodiments, the stem of any of the extensions set forth in the present disclosure can be attached to any of the earpieces set forth in the present disclosure in a variety of different ways that facilitate adjustment of the length of the extension within the ear canal 509 of a user. For example, the stem of the extension can be slidably attachable to the earpiece such that the length of the extension that extends inwardly (into the ear canal 509) from the earpiece can be adjusted by sliding the extension within the earpiece. One or more detents can also be formed upon the extension and/or the earpiece so as to inhibit undesirable movement of the extension with respect to the earpiece once the length of the extension has been set. The detents can comprise bumps, rings, or any other desired structures. The detents can inhibit movement of the stem of the extension through the earpiece so as to tend to cause the extension to remain in place with respect to the earpiece and thereby maintain a desired length adjustment of the extension.

Alternatively, friction can maintain a desired length adjustment of the extension with or without the use of detents. For example, the outer diameter of the stem of the extension can be sized with respect to the diameter of the opening within the earpiece through which the extension moves so as to provide the desire amount of friction and thus the desired ability of the extension to resist movement with respect to the earpiece.

The extension and/or the earpiece can have threads formed thereon such that adjustment of the length of the extension extending inwardly away from the earpiece can be adjusted by turning the extension with respect to the earpiece. Thus, the extension can threadedly engage the earpiece.

In one embodiment, it is desirable to position the distal end of the extension between approximately two and approximately four millimeters from the eardrum. In one embodiment, it may be desirable to position the distal end of the extension closer to the eardrum (such as approximately 1 millimeter therefrom) and in another embodiment it may be desirable to position the distal end of the extension farther from the eardrum.

Once the length adjustment of the extension has been performed, then the extension can be permanently attached to the earpiece such as by adhesive bonding, ultrasonic welding, or by any other desired means. In this manner, inadvertent changes to the adjustment of the extension can be mitigated. Alternatively, no such permanent attachment can be performed. In this manner, subsequent re-adjustment of the length of the extension can be performed if desired.

Figure 25:
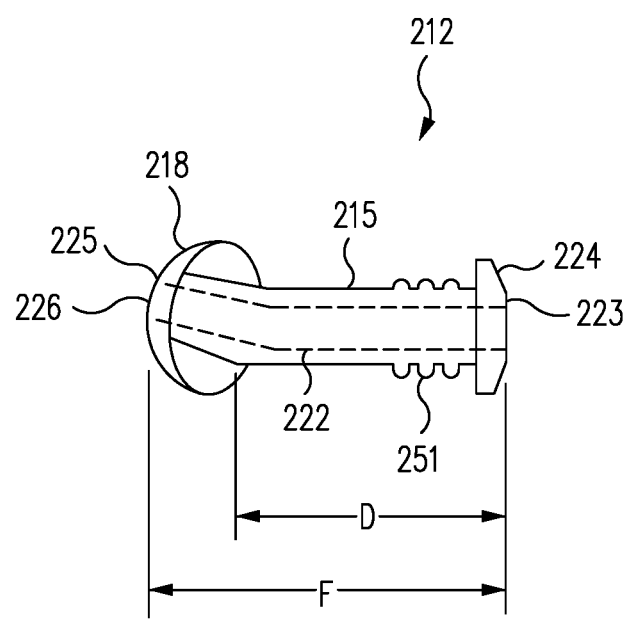
FIG. 25 is a perspective view of the extension of FIG. 11, wherein the extension is removed from the earpiece and has bumps formed upon a stem thereof, according to an embodiment.

Referring now to FIG. 5, the distal end 125 of bore 122 defines a sound output port 126 of extension 112 in FIG. 5. Extension 112 is configured such that sound output port 126 is positioned proximate the wearer's eardrum. That is, extension 112 can be configured so as to position a distal end 125 thereof proximate the eardrum. In this manner, sound transmitted through bore 122 (such as sound from a two-way radio), is brought close to the eardrum such that the volume of the sound required can be substantially reduced. The distance between the output port 126 and the eardrum can be varied. For example, the extension 112 can position sound output port 126 within one, two, or three millimeters of the eardrum. The extension 112 can have a length of approximately ½ inch. The extension can have a length of ⅝ inch or more. Referring now to FIG. 25, the distal end 225 of bore 222, sound output port 226, and extension 212 may be similarly configured.

Figure 22:
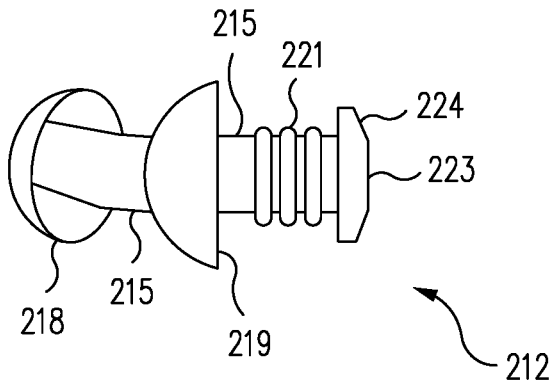
FIG. 22 is a perspective view of a configuration of the extension of FIG. 5, wherein a plurality of rings are formed upon a portion of the stem of the extension to facilitate adjustment of the length thereof that extends into a user's ear canal, according to an embodiment.

FIGS. 22-25 illustrate various embodiments of an extension 212 that may be a configuration of extension 112 used with earpiece 111. For example, extension 212 may include a stem 215, flanges 218 and 219, a head 223, bevels 224, an output port 226, and dimensions D and F similar to corresponding structures of extension 112. Referring now to FIG. 22, one or more rings 221 can be formed upon the stem 215 to define detents. The earpiece 111 can have similar rings formed in the aperture 161 thereof. The earpiece 111 can have grooves that are complimentary to rings 221 formed in the aperture 161 thereof. The grooves can thus receive rings 221 so as to retain the stem 215 in a desired position with respect to the earpiece 111.

Figure 23:
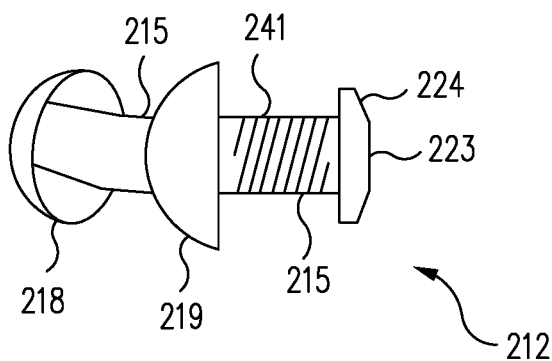
FIG. 23 is a perspective view of another configuration of the extension of FIG. 5, wherein threads are formed upon a portion of the stem of the extension to facilitate adjustment of the length thereof that extends into a user's ear canal, according to an embodiment.

Referring now to FIG. 23, the stem 215 can have threads 241 formed thereon. The threads 241 can engage complimentary threads formed within aperture 161 to facilitate adjustment of the length of stem 215 within a user's ear canal 509.

Figure 24:
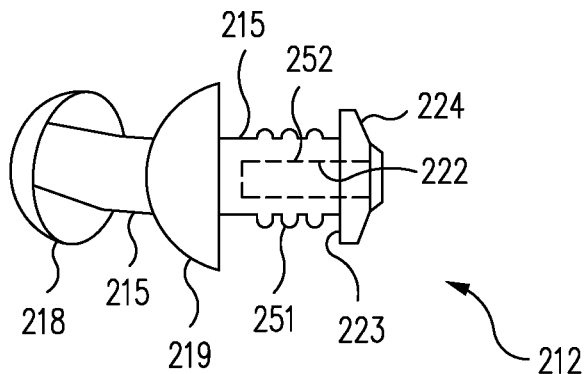
FIG. 24 is a perspective view of another configuration of the extension of FIG. 5, wherein bumps are formed upon a portion of the stem of the extension to facilitate adjustment of the length thereof that extends into a user's ear canal and also showing a Hocks filter inserted into a bore of the extension to inhibit loud noises from reaching the eardrum, according to an embodiment.

Referring now to FIG. 24, one or more bumps 251 can be formed upon the stem 215 to define detents. The earpiece 111 can have similar bumps formed in the aperture 161 thereof. The earpiece 111 can have depressions that are complimentary to bumps 251 formed in the opening thereof. The depressions can thus receive bumps 251 so as to retain the stem 215 in a desired position with respect to the earpiece 111.

A filter 252 can be inserted into bore 122 to selectively mitigate sound exposure. For example, a Hocks filter can be used to mitigate exposure to louder sounds, while still allowing a wearer to hear quieter sounds, such as speech.

Any desired combination of detents, e.g., rings, threads, and bumps, can be used on the stem 215 and/or the earpiece 111 to facilitate adjustment of the length of the stem 215 within a user's ear canal 509 and/or to help maintain the position (such as the adjusted position) of the extension 212 with respect to the earpiece 111.

Outer flange 219 (shown in FIGS. 22-24) can optionally be omitted. Indeed, extension 212 can comprise any desired number of flanges, including no flanges. In some applications, the primary reason for wearing the earpiece 111 may be to allow the wearer to better hear radio communications. In one embodiment, positioning output port 226 close to the eardrum accomplishes this goal.

According to an embodiment, an extension can have a variable fit so that the extension can be adjusted in a manner that accommodates the particular configuration of a user's ear canal 509. Thus, the extension can better seal the ear so as to inhibit the undesirable leakage of sound through the ear canal 509 and can consequently mitigate hearing damage due to such sound.

More particularly, the size of the extension can be changed by adding and/or removing attachments. By changing the size of the extension, it can be made to better seal the ear while being comfortable to wear for extended periods of time. Further, a properly sized extension is less likely to loosen or fall out.

The extension can comprise a stem that is configured to be inserted into a user's ear canal 509. One or more attachments can be configured to attach to the stem in a manner that at least partially defines a fit of the extension within an ear canal 509. Each attachment can individually vary the size, e.g., diameter, of the extension at a particular location along the length thereof so as to accommodate variations in the size, e.g., diameter, of the ear canal 509 of the user.

The attachments can have a minor cross-section that is either generally circular in configuration or is non-circular in configuration. Thus, the attachments can have a minor cross-section that is generally square, rectangular, or elliptical in configuration, for example. The attachments can have any desired minor cross-section. The minor cross-section of the extension can be defined herein as a cross-section that has a diameter of dimension C of FIGS. 31 and 32. Minor cross-sections are shown with cross-hatching in FIGS. 32 and 33.

The attachments can have a major cross-section that is either generally circular in configuration or is non-circular in configuration. The major cross-sectional configuration of the attachments can be matched to the cross-sectional configuration of the user's ear canal 509 at the locations where the attachments are to be placed when the extension is worn. Any desired combination of major cross-sections can be provided on a single extension. For example, one attachment can have a circular major cross-section and another attachment can have a non-circular major cross-section. The major cross-section of the extension can be defined herein as a cross-section that has a diameter of dimension A of FIG. 31. The major cross-section of an attachment will generally conform to the cross-section of the ear canal 509 at the location where the attachment is disposed when the extension is worn.

The stem can have one or more flanges formed thereon. The attachments can be placed on the stem proximate the flanges. For example, the attachments can be placed upon the stem such that the attachments are substantially covered by the flanges. The flanges can curve outwardly (away from the eardrum) so as to substantially cover the attachments.

Alternatively, the flanges can not extend sufficiently far from the extension so as to substantially cover the attachments. For example, the flanges can comprise bumps upon the extension or rings around the extension that do not extend substantially far therefrom and that define detents that tend to hold the attachments in a desired position.

Alternatively, the extension can have no flanges. In this instance, the attachments can be placed in any desired position upon the stem. Whether or not the extension has flanges, the attachments can fit within grooves and/or indentations in the extension and/or can be adhesively bonded in place.

Figure 26:
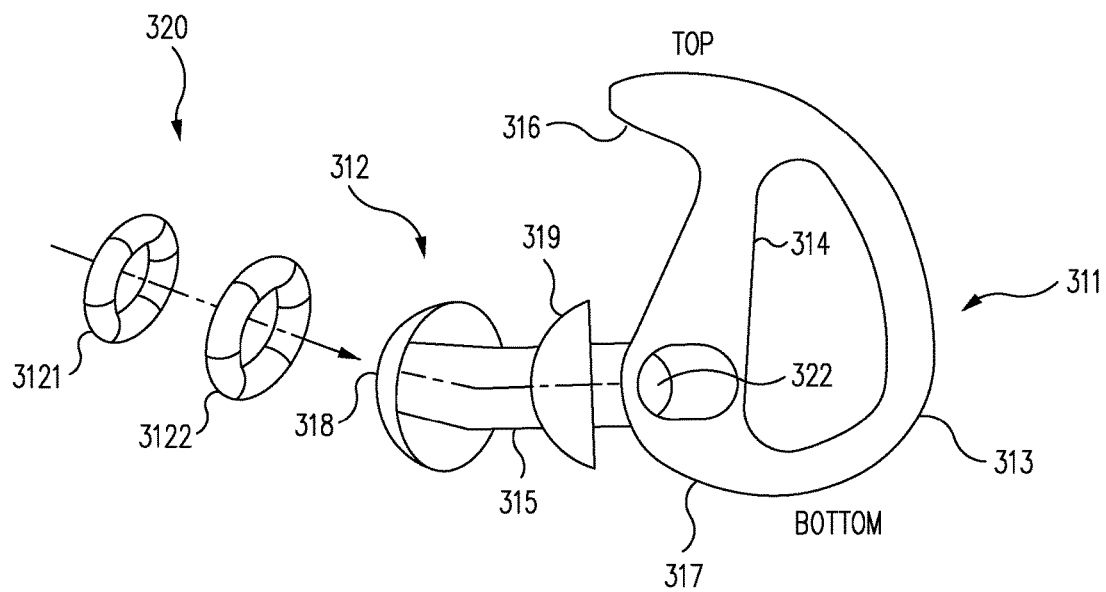
FIG. 26 is a perspective view of an earpiece attached to an extension, wherein attachments, e.g., o-rings, can be added to the extension so as to vary the fit of the extension within the ear canal according to an embodiment.
Figure 27:
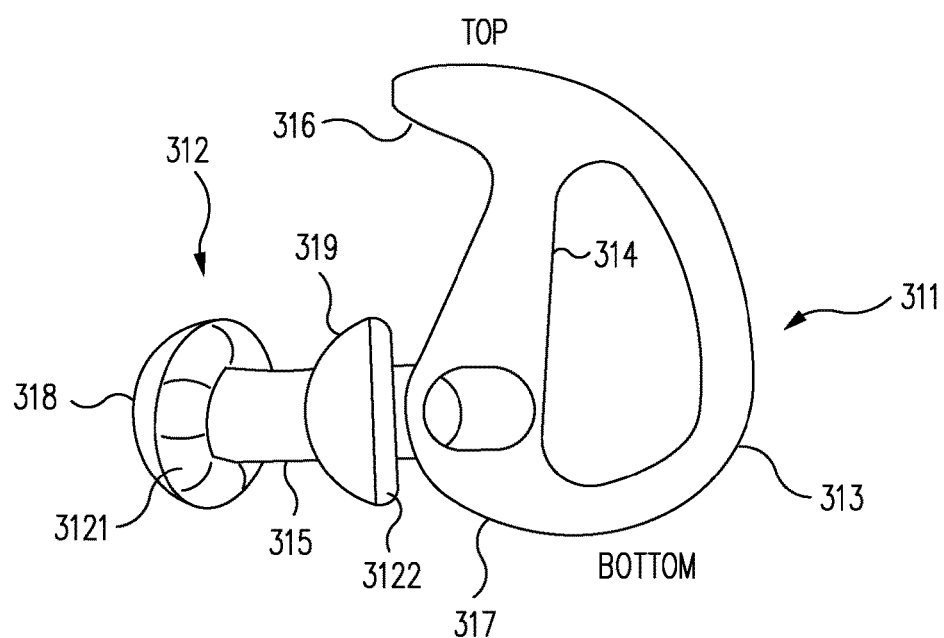
FIG. 27 is a perspective view of the earpiece, extension, and o-rings of FIG. 26, wherein the o-rings have been added to the extension and are disposed beneath flanges of the extension, according to an embodiment.

Referring now to FIGS. 26 and 27, an embodiment can comprise an earpiece 311 to which an extension 312 is attached. Earpiece 311 includes a generally arcuate rib 313, a generally vertical rib 314, an upper lobe 316, a smooth curve 317, and a bore 322 as similarly provided in earpiece 111.

Earpiece 311 is configured to be disposed in the concha of the outer ear. Extension 312 is configured to be disposed within the ear canal 509. The outer or major diameter of at least portions of the extension 312 can be varied so as to vary the fit of the extension 312 within the ear canal 509. The major diameter of the extension 312 is the major diameter of an attachment thereof and is indicated as dimension A in FIG. 31.

For example, attachments 320 can be added to the extension 312 at desired locations along the length thereof so as to vary the major diameter of the extension 312 at these locations. In this manner, a desired fit of the extension 312 to the ear canal 509 can be obtained at these locations. Often, a snug but comfortable fit is desired. The fit can be tight enough so as to substantially mitigate sound leakage around the extension 312 without causing discomfort. Such a fit tends to cause the extension 312 to maintain its desired position within the ear canal 509, with or without the use of the earpiece 311.

Thus, the extension 312 can be used either with or without the earpiece 311. When the extension 312 is used without the earpiece 311, it can extend far enough out of the ear so as to facilitate grasping and manipulation thereof. A small string or lanyard can extend from the proximal end of the extension 312 to facilitate such handling and manipulation.

The attachments 320 can be either substantially resilient or substantially rigid. For example, the attachments 320 can be formed of a resilient polymer such as rubber or silicone rubber. In one embodiment, the attachments 320 can have a Shore A durometer of between approximately 35 and approximately 45. For example, the attachments 320 can have a Shore A durometer of approximately 40.

According to an embodiment, extension 312 comprises a stem 315 and two flanges 318 and 319. Extension 312 can comprise any desired number of flanges, including no flanges at all. Stem 315 can either be solid (so as to substantially block sound) or hollow (so as to substantially transmit sound). Stem 315 can also be partially hollow (so as to selectively transmit sound).

With particular reference to FIG. 26, the attachments 320 can comprise o-rings 3121 and 3122. The o-rings 3121 and 3122 of FIG. 26 are shown separated from the extension 312 and ready for attachment thereto. The o-rings 3121 and 3122 can be attached to extension 312 by sliding the o-rings 3121 and 3122 over the inner flange 318 and/or the outer flange 319. A readily removable lubricant, such as liquid soap, can facilitate such sliding.

With particular reference to FIG. 27, the o-rings 3121 and 3122 can be disposed upon extension 312 such that the o-rings 3121 and 3122 are next to and substantially covered by the flanges 318 and 319. Thus, the o-rings 3121 and 3122 can maintain the flanges 318 and 319 in a generally fully opened or extended configuration and thereby mitigate collapse of the flanges.

As discussed above, the two o-rings 3121 and 3122 of FIG. 26 can be slid over the extension 312 so as to be positioned substantially under the flanges 318 and 319 as shown in FIGS. 26 and 27. The o-ring attachments 3121 and 3122 can have different inner diameters (dimension B of FIG. 31) so as to fit upon portions of the extension 312 having different diameters. As shown in FIG. 26, o-ring 3121 has slightly smaller inner and outer diameters than o-ring 3122. The o-rings 3121 and 3122 can have different outer diameters (dimension A of FIG. 31) so as to better fit the ear canal 509 in portions thereof having different diameters.

Figures 28, 29:
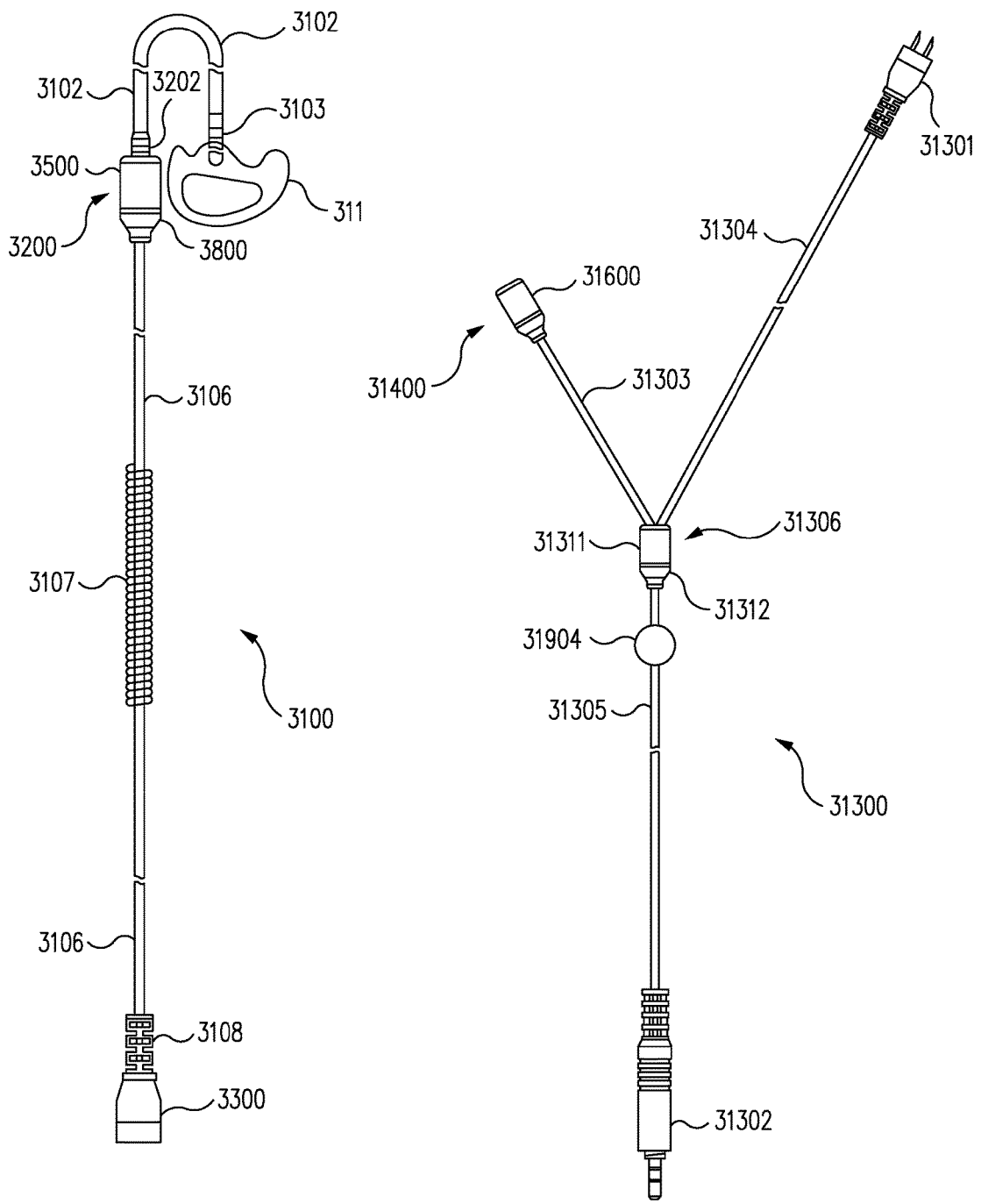
FIG. 28 is a front view of the upper portion of an example of a cable assembly, according to an embodiment.
FIG. 29 is a front view of the lower portion of an example of a cable assembly, according to an embodiment.

Referring now to FIG. 28, the extension 312 and/or earpiece 311 can be used with a cable assembly to facilitate communication, such as via a two-way radio or a cellular telephone. The extension 312 and/or earpiece 311 can similarly be used with a cable assembly to facilitate listening to music from a music device. The cable assembly can comprise an upper portion 3100, as shown in FIG. 28 and a lower portion 31300, as shown in FIG. 29. Upper portion 3100 can be connected to lower portion 31300 to form the complete cable assembly.

The upper portion 3100 can comprise an earpiece 311 that is configured to fit within the concha of a user's ear so as to transmit sound (such as incoming cellular telephone transmissions, music, or other sound) to the user's eardrum.

Earpiece 311 can be attached to acoustic tubing 3102, such as via barbed fitting 3103. Acoustic tubing 3102 can be curved so as to facilitate easy routing thereof behind the ear. Speaker 3200 can be worn directly behind the ear, behind the ear at the neck, in front of the ear, in the ear, or at any other desired location. Either acoustic tubing 3102 from speaker 3200 or electrical cable 3106 to speaker 3200 can pass by or behind the ear. Barbed fitting 3103 can be an elbow fitting.

Acoustic tubing 3102 can be attached to speaker 3200, such as via a barbed fitting 3202. Speaker 3200 can comprise upper 3500 and lower 3800 housings. A multi-conductor electrical cable 3106 can extend from speaker 3200 to a connector, such as female connector 3300 that electrically connects upper portion 3100 of the cable assembly to lower portion 31300. For example, electrical cable 3106 can comprise two conductors that facilitate operation of speaker 3200. Strain relief 3108 can be provided for electrical cable 3106 at connector 3300. Electrical cable 3106 can comprise coils 3107 that allow it to stretch as necessary to fit a particular individual.

Electrical cable 3106 can provide electrical signals to speaker 3200. Speaker 3200 can convert such electrical signals into acoustic signals representative thereof (and generally representative of speech or music such as that received from a cellular telephone, music device, or the like).

Referring now to FIG. 29, lower cable assembly 31300 can comprise a microphone 31400 that is configured to attach to the user's clothing, such as proximate the user's mouth. For example, microphone 31400 can clip to the user's lapel. A connector, such as male connector 31301, can facilitate electrical connection of lower cable assembly 31300 to upper portion of cable assembly 3100 to define a complete cable assembly, as mentioned above. The microphone 31400 can be omitted for applications that do not require it, such as listening to a music device.

A connector 31302, such as a stereo phono plug, can be used to connect lower cable assembly 31300 (and consequently the complete cable assembly) to a personal electronic device. Connector 31302, e.g., a phone plug, can plug directly into the personal electronic device.

Cable 31303 facilitates electrical connection between microphone 31400 and connector 31302. Similarly, cable 31304 facilitates electrical connection between upper portion of cable assembly 3100 and connector 31302. Cable 31303 and cable 31304 can join at Y-joint 31306 to form single cable 31305. Y-joint 31306 can comprise a housing similar in construction to the speaker housing. Cable 31303 can be omitted for use with a music device.

More particularly, an upper Y-joint housing portion 31311 and a lower Y-joint housing portion 31312 can be formed of a durable, substantially rigid material. For example, upper Y-joint housing portion 31311 and lower Y-joint housing portion 31312 can be formed of a metal or alloy, such as a metal or alloy comprised of aluminum (anodized aluminum, for example), titanium, magnesium, or steel. Alternatively, upper Y-joint housing portion 31311 and lower portion 31312 can be formed of a polymer, such as ABS, polycarbonate, or high density polyethylene. Upper portion 31311 can attach to lower portion 31312 via threads, friction fit, adhesive bonding, ultrasonic welding, or by any other desired method. A push to talk (PTT) switch 31904 can optionally be provided.

Microphone 31400 can be removably attachable to lower cable assembly 31300, such as via a connector. Alternatively, microphone 31400 can be permanently attached to 31300 lower cable assembly, such as by being an integral part thereof. Microphone 31400 can be contained within a microphone housing 31600.

Figure 30:
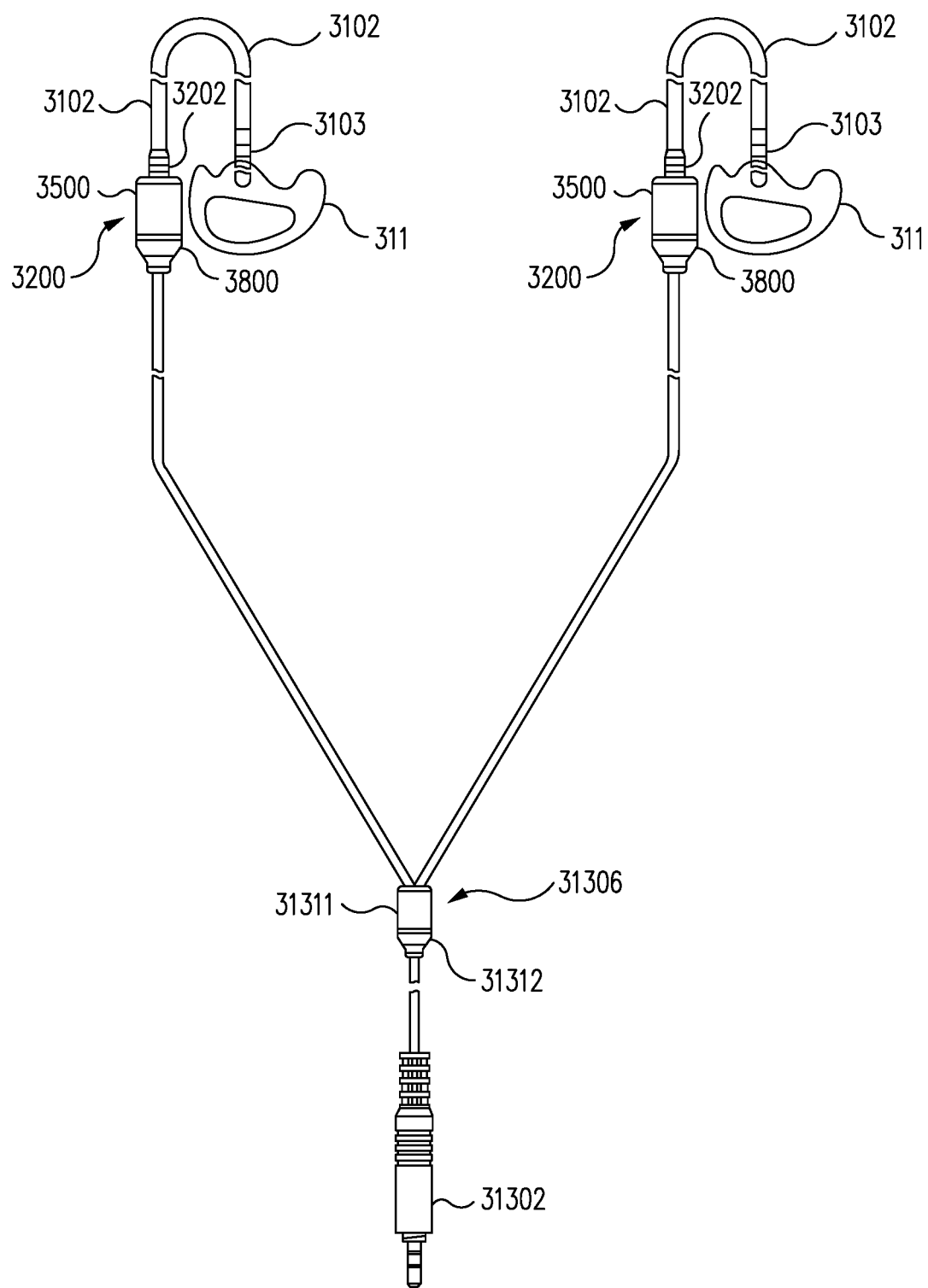
FIG. 30 is a front view of a stereo cable assembly, according to an embodiment.

Referring now to FIG. 30, Y-joint 31306 can be used to form a two speaker/two earpiece cable, such as for stereo listening to a music device. Optionally, the microphone 31400 can be included, such as by additionally having microphone cable 31303 branch off from Y-joint 31306 as well.

Instead of having two separate speakers for a stereo configuration as shown in FIG. 30, the cable assembly can alternatively have a single speaker that provides sound to both earpieces to define a monaural configuration. For example, a single speaker can be placed at Y-joint 31306 and two acoustic tubes can lead therefrom to earpieces 311.

The cable assemblies of FIGS. 28-30 are further disclosed in U.S. patent application Ser. No. 11/696,987 filed on Apr. 5, 2007 and entitled CELLULAR TELEPHONE CABLE ASSEMBLY, the entire contents of which are hereby expressly incorporated by reference. Examples of suitable earpieces are disclosed in U.S. patent application Ser. No. 11/411,314 filed on Apr. 26, 2006 and entitled EARPIECE WITH EXTENSION, the entire contents of which are hereby expressly incorporated by reference.

Figure 31:
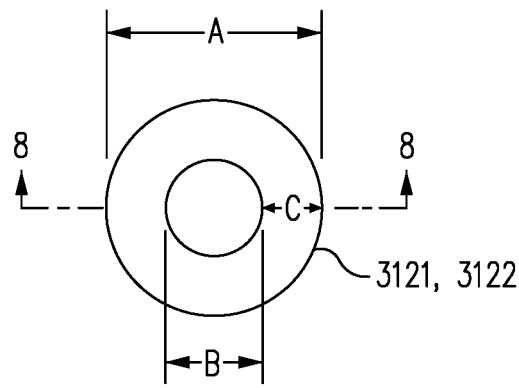
FIG. 31 is a top view of an o-ring, such as those of FIG. 26, providing dimensions thereof, according to an embodiment.
Figure 32:
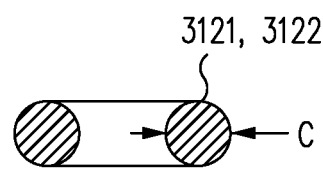
FIG. 32 is a cross-sectional side view taken along line 8-8 of FIG. 31, according to an embodiment.

Referring now to FIGS. 31 and 32, the attachments 320 can be provided in a variety of sizes, i.e., outer diameters and/or cross-sectional configurations, so as to facilitate fitting of the extension to a variety of sizes and configurations of ear canals 509. For example, an attachment can be one of o-rings 3121 and 3122. O-rings 3121 and 3122 can have an outer diameter, dimension A, that is between approximately 4 mm and approximately 12 mm. The o-rings 3121 and 3122 can have an inner diameter of between approximately 2 mm and approximately 4 mm. The o-rings 3121 and 3122 can have a minor diameter of between approximately 1 mm and approximately 6 mm.

As used herein, the term "minor diameter" can be defined as the diameter of a cross-section of the material of the attachment or o-ring, as designated by dimension C in FIGS. 31 and 32.

Figure 33:
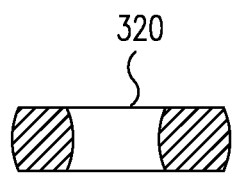
FIG. 33 is a cross-sectional side view of an attachment having a non-circular minor cross-section, according to an embodiment.

Referring now to FIG. 33, the cross-sectional configuration of the attachment 320 can alternatively be non-circular. For example, the cross-sectional configuration of the attachment can be more rectangular or square. The attachments 320 can have any desired cross-sectional configuration.

Figure 34:
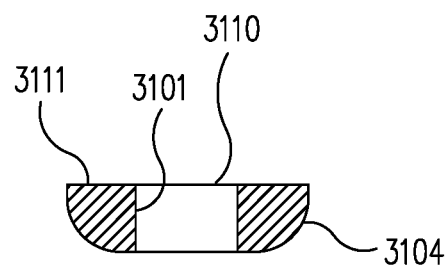
FIG. 34 is a cross-sectional side view of an attachment having two flat sides, according to an embodiment.

Referring now to FIG. 34, an attachment 3110 can have two substantially flat surfaces. For example, the surface 3101 that contacts the stem 315 and the surface 3111 that is opposite the flange 318 can be flat. The surface 3104 that contacts the flange 318 can be rounded so as to better conform to the shape of the flange 318. By making the surface 3101 that contacts the stem 315 flat, the attachment 3110 is less likely to move undesirably upon the stem 315. Making the surface 3111 opposite the flange 318 flat provides a better fit of the attachment 3110 to the extension 312.

Figure 35:
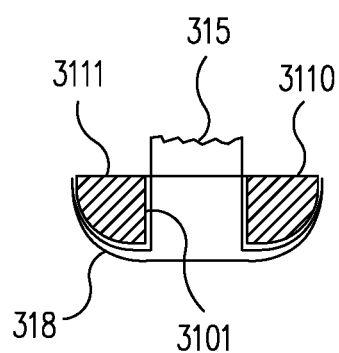
FIG. 35 is a cross-sectional side view of the attachment of FIG. 34 attached beneath the innermost flange of the extension thereof, according to an embodiment.

Referring now to FIG. 35, the attachment 3110 is shown installed upon the extension 312. Surface 3101 encircles and generally contacts stem 315. Surface 3111 is opposite flange 318.

A method of fitting an extension can comprise attaching at least one attachment to a stem. The attachments can be selected from a plurality of available attachments of various sizes, shapes, and/or material. The sizes, shapes, and/or materials can be selected so as to compliment the size and shape of the user's ear canal 509. That is, larger attachments (those having larger outer diameters) can be selected for positions upon the stem corresponding to larger (larger inner diameter) portions of the user's ear canal 509. The attachments can be selected such that when the stem is disposed within the ear canal 509, then the attachment contacts tissue of the ear canal 509 about a substantial portion of the periphery thereof.

Attachments can be selected during the fitting process by either the use of measurements or by trial and error. The ear canal 509 can be measured, either quantitatively or qualitatively, and the size of the attachment can be determined from such measurements. Either alternatively or in combination with such measurements, attachments can be tried and used or not used based upon their comfort and effectiveness.

One or more embodiments can be used to mitigate exposure to ambient sound. For example, one or more embodiments can be used alone, e.g., without an electronic device. Alternatively, one or more embodiments can be used with an electronic device such as a two-way radio, a cellular telephone, a computer, a music device, or the like. When used with an electronic device, the extension can still mitigate exposure to ambient sound.

In one embodiment, an earpiece assembly (e.g., including an earpiece and an extension in this embodiment) can further include a housing within which the speaker is disposed and via which the speaker is attached to the earpiece. The housing can be formed of a metal such as aluminum. Alternatively, the housing can be formed of a polymer such as ABS or polycarbonate. Indeed, the housing can comprise any desired combination of materials. For example, the body of the housing can comprise aluminum and the cap of the housing can comprise ABS.

According to an embodiment, the earpiece assembly can comprise a microphone either in addition to or in place of the speaker. The use of a microphone facilitates the use of the earpiece assembly in two way communications, such as via a cellular telephone or a two-way radio. A single transducer can function as both a microphone and a speaker.

The microphone and speaker can be disposed within the same housing. Alternatively, the microphone and speaker can be disposed within separate housings. The microphone can be disposed upon a boom. For example, the microphone can be disposed upon a boom that extends from the housing to a point proximate a corner of the user's mouth. The microphone can be disposed at a point approximately one half of the way between the housing and the corner of the user's mouth.

One or more cables can extend from the housing so as to effect electrical communication with the microphone and/or speaker. For example, an electrical cable containing two pairs of wires can extend from the housing to a two-way radio. One pair of wires can communicate received voice from the radio to the speaker and the other pair of wires can communicate voice from the microphone to the radio.

The speaker can comprise a balanced armature speaker. Alternatively, the speaker can be any other desired type of speaker.

According to an embodiment, the earpiece assembly can comprise an extension attached to one side of the earpiece via a friction fit and a housing having a barbed fitting attached to another side of the earpiece by inserting the barbed fitting through the earpiece and into the insert. Thus, the barbed fitting of the housing can attach the housing, earpiece, and extension to one another. Adhesive bonding, ultrasonic welding, and/or any other method can be used to enhance such attachment.

The earpiece and the extension can be integrally formed with one another. The earpiece and the extension can be formed of the same material. Similarly, the earpiece, the extension, and the housing can be integrally formed with one another. The earpiece, the extension, and the housing can be formed of the same material.

Figure 36:
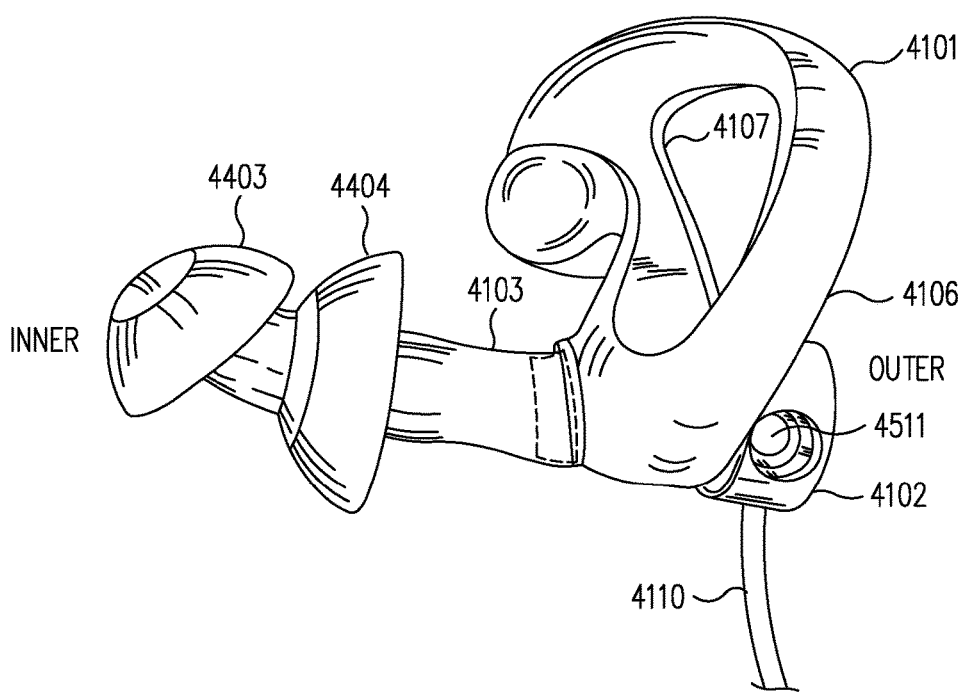
FIG. 36 is a perspective view of an earpiece assembly, according to an embodiment.
Figure 37:
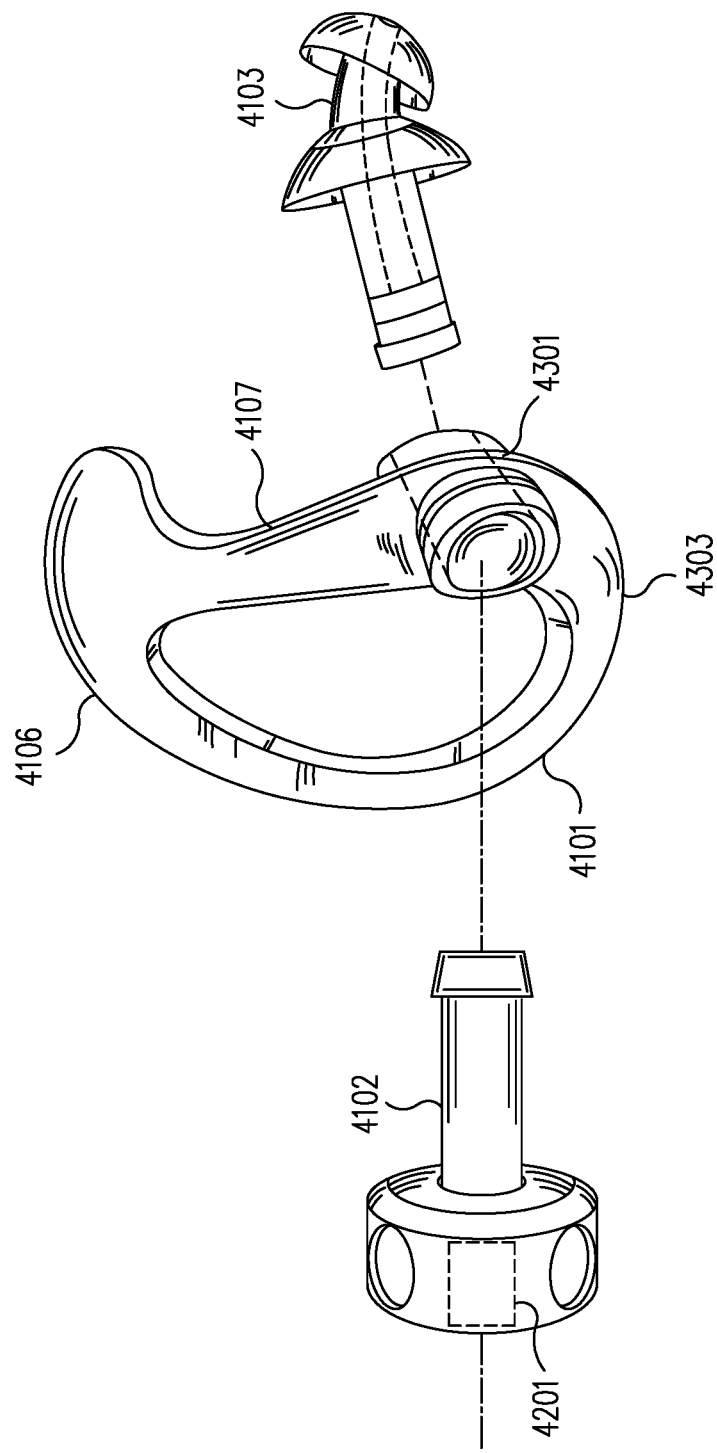
FIG. 37 is a perspective view of the earpiece assembly of FIG. 36, showing the flanged extension and housing exploded away from the earpiece and showing a microphone/speaker in dashed lines within the housing, according to an embodiment.

Referring now to FIGS. 36 and 37, an earpiece assembly may include an earpiece 4101 with a microphone/speaker 4201 (e.g., a microphone, a speaker, and/or electronic circuitry, see FIG. 37) attached thereto. The earpiece 4101 can be configured to fit within a concha of a user's ear. The microphone/speaker 4201 can be disposed within a housing 4102 and can be attached to the earpiece 4101 via the housing 4102. The housing 4102, and consequently the microphone/speaker 4201, can be disposed within the concha, outside of the concha, or partially inside and partially outside of the concha. Optionally, the housing 4102 can be omitted and the microphone/speaker 4201 can be attached more directly to the earpiece 4101.

Optionally, an extension 4103 can be attached to the earpiece 4101. The extension can be configured to extend into a user's ear canal 509. The extension 4103 can be configured so as to direct sound from the microphone/speaker 4201 through the ear canal 509 to the eardrum of a user. For example, sound from the microphone/speaker 4201 can travel through a bore (4501 of FIG. 40) of the housing 4102, through a bore (4301 of FIGS. 37 and 38) in the earpiece 4101, and through a bore (4401 of FIG. 39) in the extension 4103.

An electrical cable 4110 can extend from housing 4102. The cable 4110 can comprise a plurality of conductors for communicating electrical signals representative of sound with the microphone and/or speaker of the earpiece assembly.

Electronic circuitry of microphone/speaker 4201 can comprise an attenuator, amplifier, filter, or other sound processing circuitry. Such circuitry can comprise a microprocessor and/or digital sound processing circuitry.

Microphone/speaker 4201 can comprise a wireless microphone that receives a radio signal and converts the radio signal into sound. The radio signal can be received from a local source and/or a remote source. The radio signal can be received from a local source such as the user's own two-way radio. For example, the speaker output of the user's two-way radio can be re-modulated and transmitted to the microphone/speaker 4201 so as to define a wireless link between the two-way radio and the microphone/speaker 4201.

The radio signal can be received from a remote source such as a remotely located two-way radio (someone else's two-way radio). In this manner, someone else can communicate covertly with the user (the user does not need to carry a two-way radio).

Figure 38:
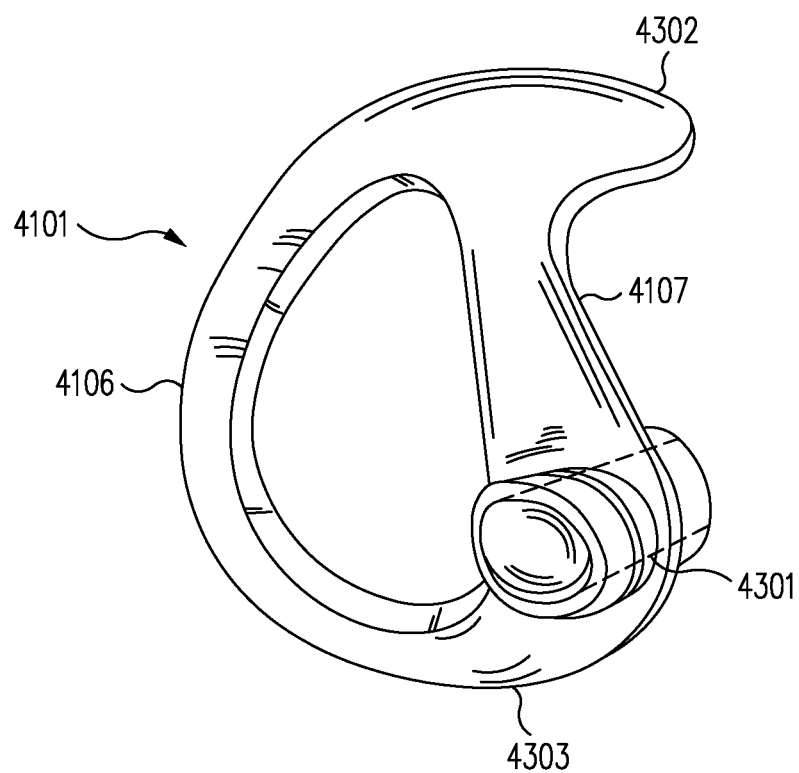
FIG. 38 is an enlarged perspective view of the earpiece of FIG. 36, according to an embodiment.

Referring now to FIG. 38, the earpiece 4101 can have a generally arcuate rib 4106 and a generally vertical rib 4107 that cooperate to hold the earpiece 4101 within the concha of a user's ear. Generally arcuate rib 4106 and generally vertical rib 4107 can be configured so as to define a general likeness of the letter D.

Bore 4301 can extend through a portion of the generally vertical rib 4107, such as proximate where the generally vertical rib 4107 joins the generally arcuate rib 4106 at the lower portion thereof. Sound can pass through bore 4301. A portion of extension 4103 and/or housing 4102 can pass through bore 4301.

The earpiece 4101 can have an upper lobe 4302 formed at the top thereof and a smooth rounded surface 4303 formed at the bottom thereof. Optionally, the earpiece 4101 can have a similar lobe (not shown) formed at the bottom thereof.

Figure 39:
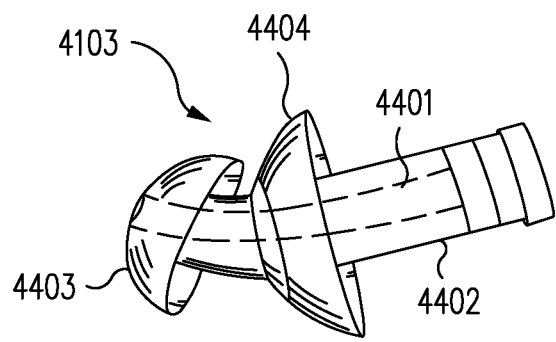
FIG. 39 is an enlarged perspective view of the extension of FIG. 36, according to an embodiment.

Referring now to FIG. 39, the extension 4103 can have a stem 4402 that has one or more flanges 4403 and 4404 formed thereon. The inner flange 4403 can be smaller than the outer flange 4404, so as to better conform to the shape of a user's ear canal 509.

Bore 4401 can facilitate the transmission of sound through the extension 4103 toward the user's eardrum. Bore 4401 can also facilitate the insertion of a tube 4502 (FIG. 40) of housing 4102 therein so as to attach the housing 4102 to the extension 4103.

Figure 40:
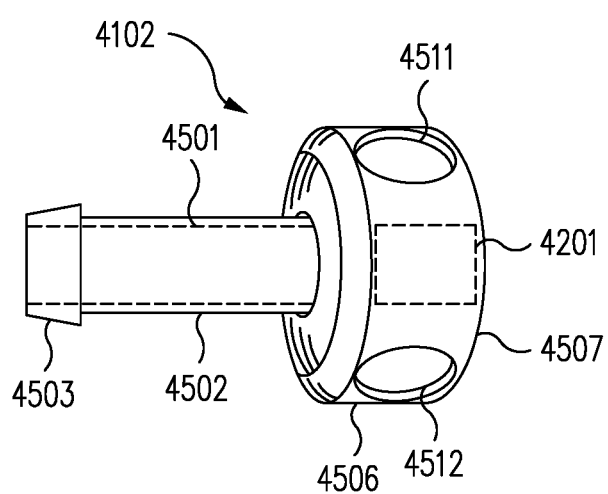
FIG. 40 is an enlarged perspective view of the housing of FIG. 36, according to an embodiment.

Referring now to FIG. 40, a housing 4102 for the microphone/speaker 4201 can comprise a body 4506, a cap 4507, and tube 4502. The microphone/speaker 4201 can be disposed within the body 4506, such as within a cavity therein. The cap 4507 can seal the microphone/speaker 4201 within the body 4506. The cap 4507 can be attached to the body 4506 by threads, adhesive bonding, welding, soldering, brazing, ultrasonic welding, friction fit, snap fit, detents, friction welding, or by any other desired method.

One or more apertures 4511 and 4512 facilitate the introduction of conductors, e.g., electrical cables, into the housing 4102 so as to provide electrical communication between the microphone/speaker 4201 and a radio or the like. Apertures 4511 and 4512 can be used to mount boom microphone 4602 (see FIG. 41).

The housing 4102 containing the microphone/speaker 4201 can be attached to the earpiece 4101 and the extension 4103 as shown in FIG. 36. Alternatively, the housing 4102 can be attached to the earpiece 4101 and the extension 4103 can be omitted. As a further alternative, the housing 4102 can be attached to the extension 4103, and the earpiece 4101 can be omitted.

The microphone/speaker 4201 can be attached to the earpiece 4101 and/or the extension 4103 without the use of a housing. For example, the microphone/speaker 4201 can be attached to or embedded within the earpiece 4101 and/or the extension 4103. The microphone/speaker 4201 can be attached to or embedded within the earpiece 4101 and the extension 4103 can be omitted. The microphone and/or speaker 4201 can be attached to or embedded within the extension 4103, and the earpiece 4101 can be omitted.

One or more barbs 4503 can be formed upon tube 4502, such as upon the inner end thereof, so as to facilitate secure attachment of housing 4102 to earpiece 4101 and/or extension 4103. The barb(s) 4503 can engage the bore 4401 of extension 4103. Other means for facilitating secure attachment of the housing 4102 to the tube 4502 can be used. For example, threads can be formed upon the tube 4502 for securely attaching the tube 4502 into the bore 4401 of extension 4103.

Figure 41:
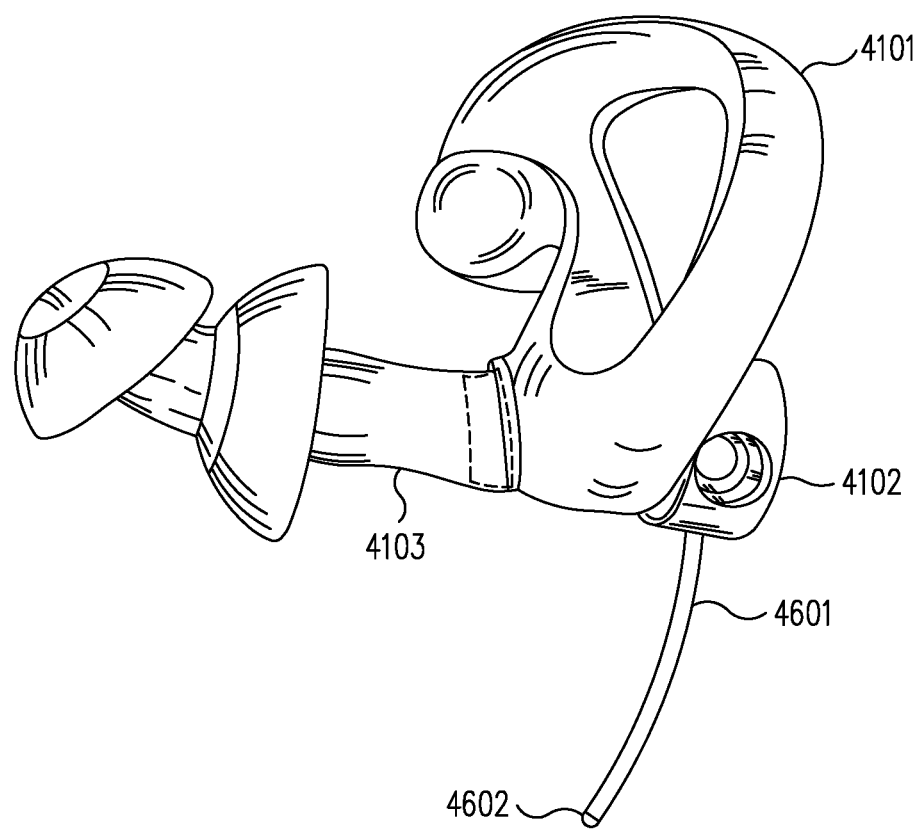
FIG. 41 is a perspective view of an earpiece assembly having a boom microphone attached to the housing thereof, according to an embodiment.

Referring now to FIG. 41, a boom microphone 4602 can be mounted to the distal end of boom 4601. The boom 4601 can be attached to housing 4102, such as via one of the apertures 4511 and 4512. The boom 4601 can be attached to housing 4102 via threads, adhesive bonding, or any other desired method. The boom 4601 can alternatively be attached to the earpiece 4101 and/or the extension 4103.

Boom microphone 4602 can be used with or instead of the microphone/speaker 4201 disposed within housing 4102. Thus, either microphone can be used alone or both microphones can be used together.

The microphone/speaker 4201 disposed within housing 4102 can be used to provide processed, e.g., amplified and/or filtered, ambient sound to the user (in a manner similar to that of a hearing aid) and the boom microphone 4602 can be used to provide voice from the user to a two-way radio or cellular telephone. The microphone/speaker 4201 disposed within housing 4102 can be used to provide voice from the user to a two-way radio or cellular telephone.

The boom 4601 can be a telescoping boom. The use of a telescoping boom readily facilitates changes in the length thereof, so as to facilitate desired placement of the boom microphone 4602. The boom 4601 can be a bendable boom. The use of a bendable boom readily facilitates changes in the position of the distal end thereof, so as to facilitate desired placement of the boom microphone 4602.

According to an embodiment, a method for assembling an earpiece assembly comprises inserting an outer end of a flanged extension into an aperture on an inner side of an earpiece and inserting a barbed fitting of a housing through an aperture on an outer side of the earpiece and into a bore of the flanged extension.

One or more embodiments eliminate the use of acoustic tubing so as to provide enhanced audio quality to the user. Elimination of acoustic tubing tends to provide a higher intensity audio signal to the user because sound is not attenuated by the acoustic tubing. Thus, the volume of the radio, cellular telephone, music device or the like can be reduced. A smaller, lower wattage speaker can be used since the speaker does not require the additional power necessary to compensate for attenuation caused by acoustic tubing.

The elimination of acoustic tubing also facilitates the construction of a smaller, lighter, more comfortable, and less conspicuous earpiece assembly. The earpiece assembly is smaller and lighter because it does not have the extra weight and bulk of the acoustic tubing.

The earpiece assembly is more comfortable because the electrical cable that passes over the ear to communicate a signal representative of sound is substantially smaller than acoustic tubing. In one embodiment, acoustic tubing can be one eighth of an inch in outer diameter. In one embodiment, an electrical cable can be one thirty-second of an inch to one sixteenth of an inch in outer diameter, or even smaller. The use of such smaller electrical cable in place of the larger acoustic tubing makes the earpiece assembly substantially less obtrusive and conspicuous.

Figure 42:
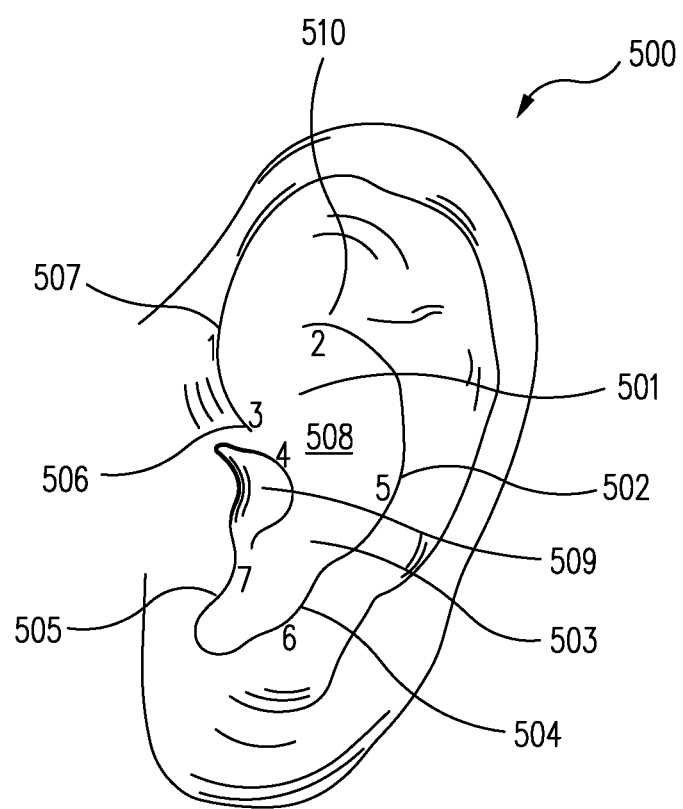
FIG. 42 shows a human ear with some anatomical structures labeled and with examples of grab points for an earpiece labeled, according to an embodiment.
Figure 43:
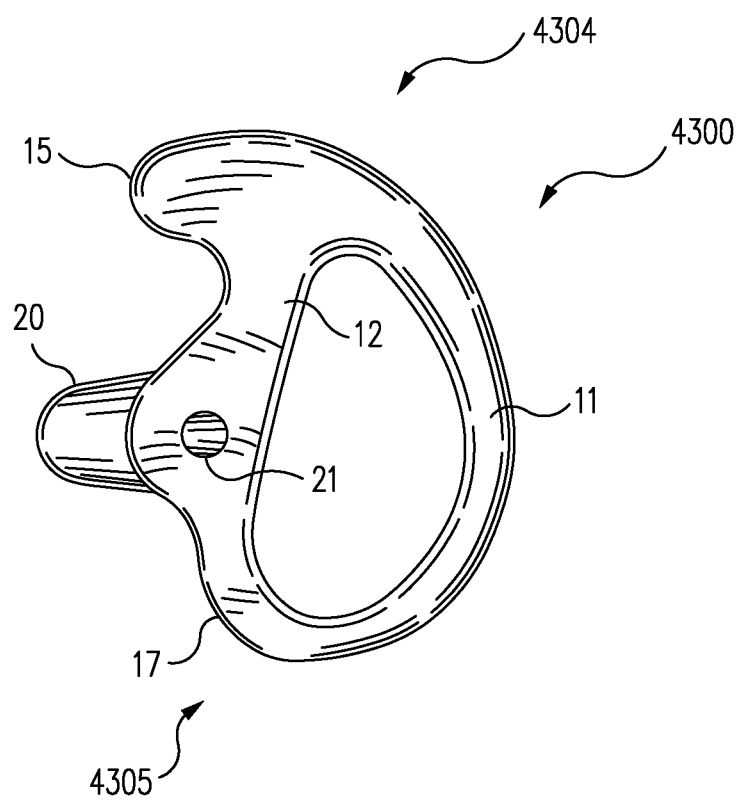
FIG. 43 is a side view of the outboard (away from the head) side of a left earpiece that lacks a lower lobe, according to an embodiment.
Figure 44:
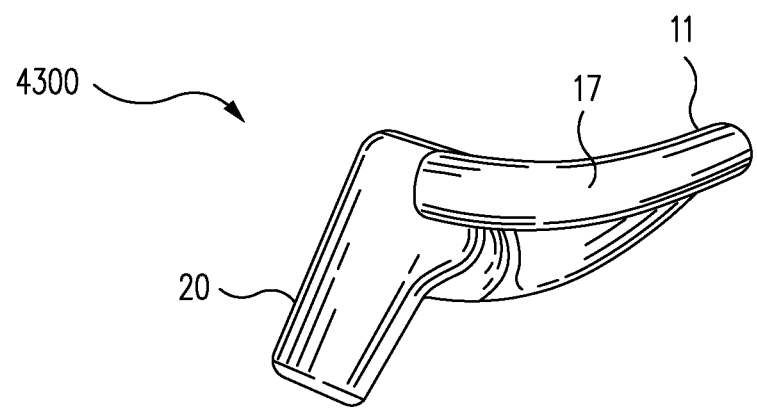
FIG. 44 is a bottom view of the left earpiece of FIG. 43, according to an embodiment.
Figure 45:
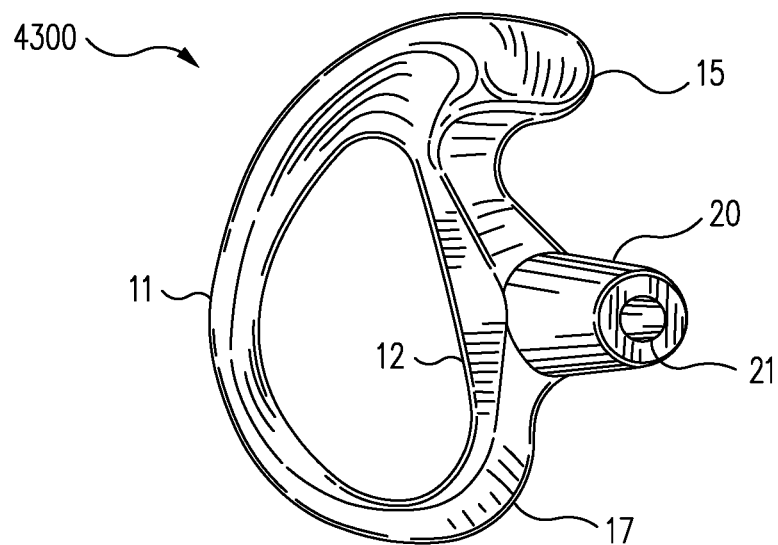
FIG. 45 is a side view of the inboard (toward from the head) side of the left earpiece of FIG. 43, according to an embodiment.
Figure 46:
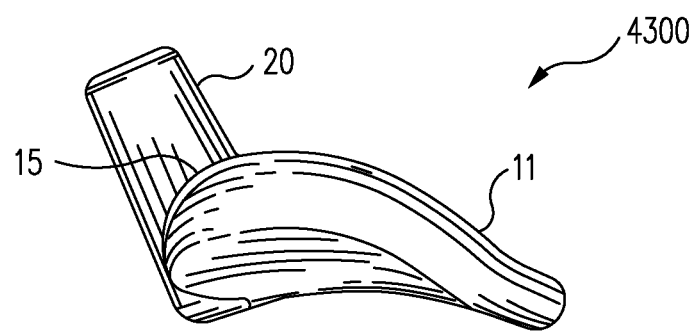
FIG. 46 is a top view of the left earpiece of FIG. 43, according to an embodiment.
Figure 47:
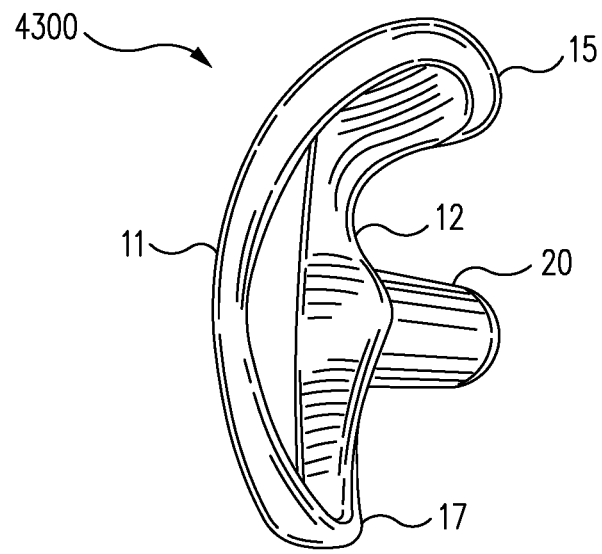
FIG. 47 is a back view of the left earpiece of FIG. 43, according to an embodiment.
Figure 48:
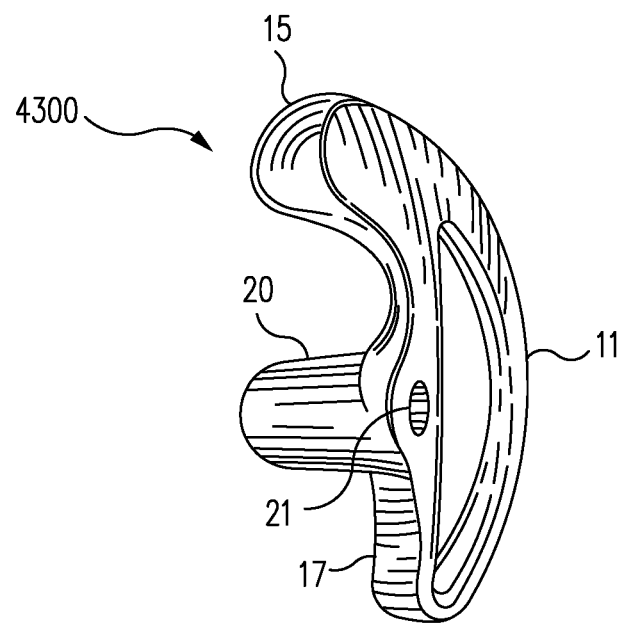
FIG. 48 is a front view of the left earpiece of FIG. 43, according to an embodiment.
Figure 49:
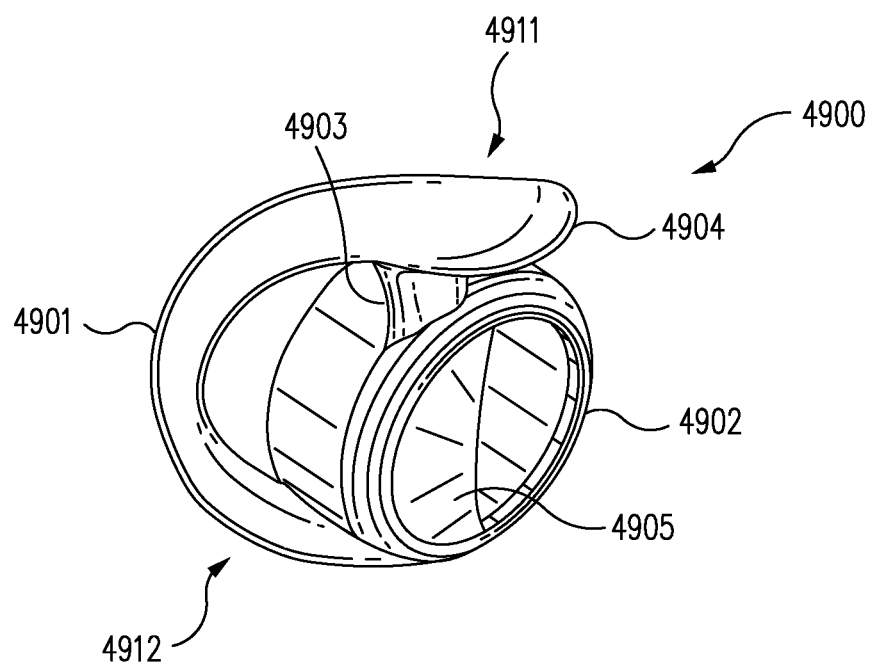
FIG. 49 is a front-left-bottom perspective view of an earpiece, according to an embodiment.
Figure 50:
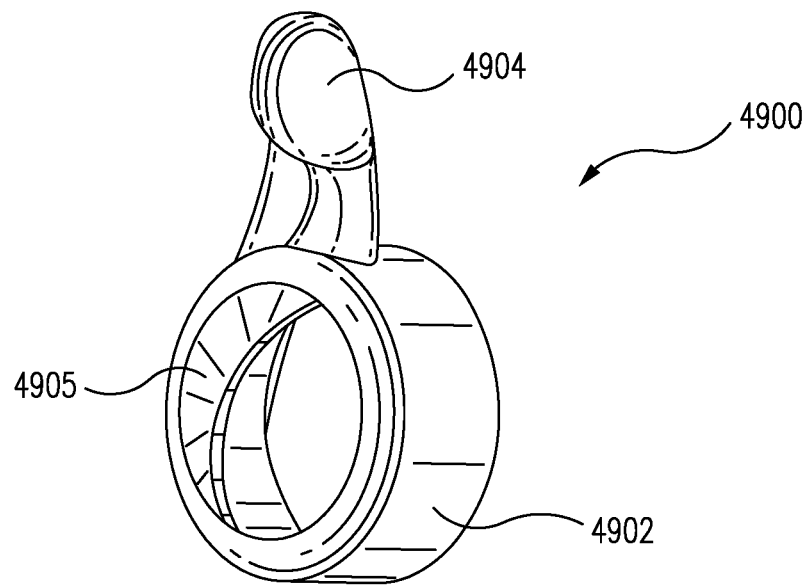
FIG. 50 is a front-left-top perspective view of the earpiece of FIG. 49, according to an embodiment.
Figure 51:
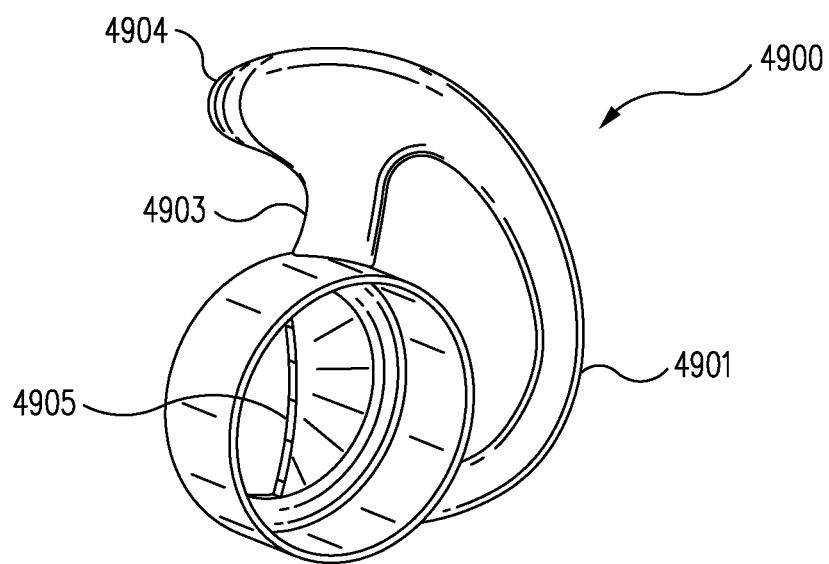
FIG. 51 is a rear-left-top perspective view of the earpiece of FIG. 49, according to an embodiment.
Figure 52:
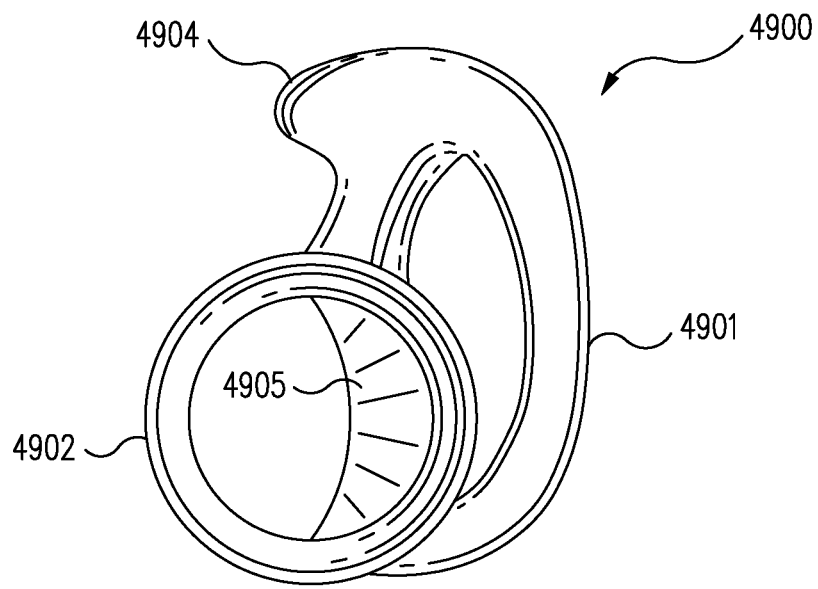
FIG. 52 is a rear plan view of the earpiece of FIG. 49, according to an embodiment.
Figure 53:
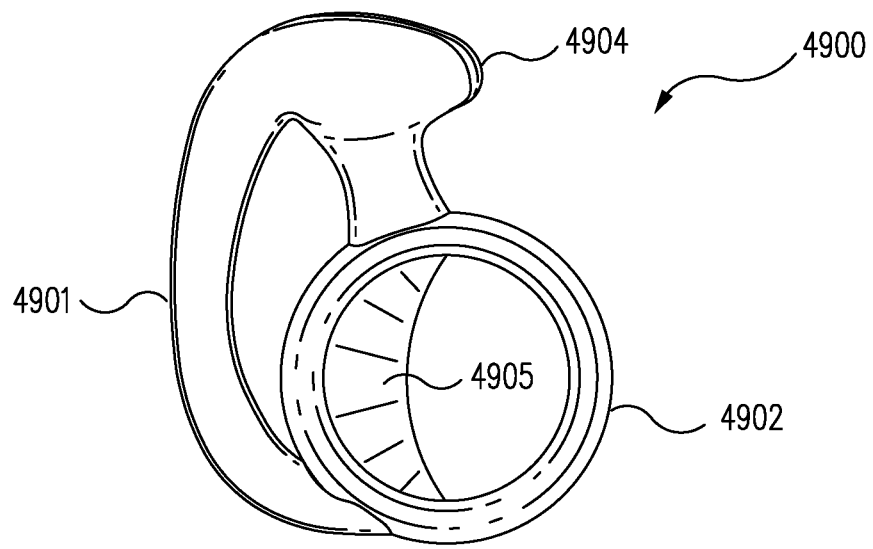
FIG. 53 is a front plan view of the earpiece of FIG. 49, according to an embodiment.
Figure 54:
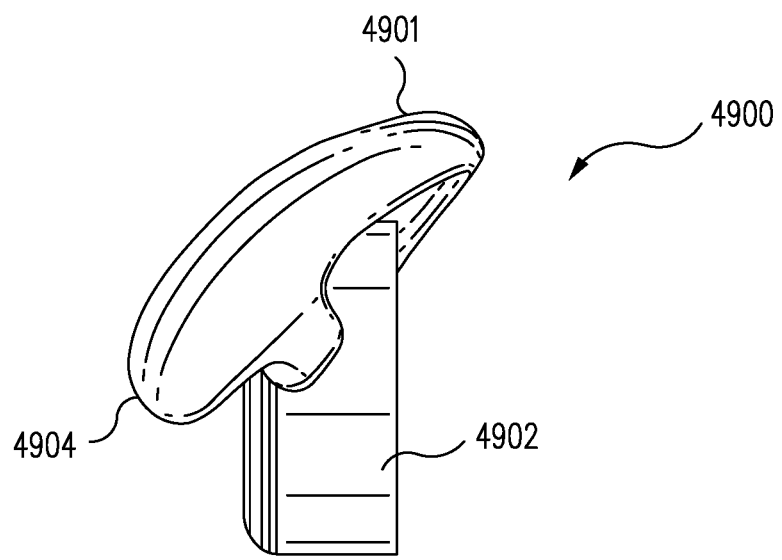
FIG. 54 is a left side elevation view of the earpiece of FIG. 49, according to an embodiment.
Figure 55:
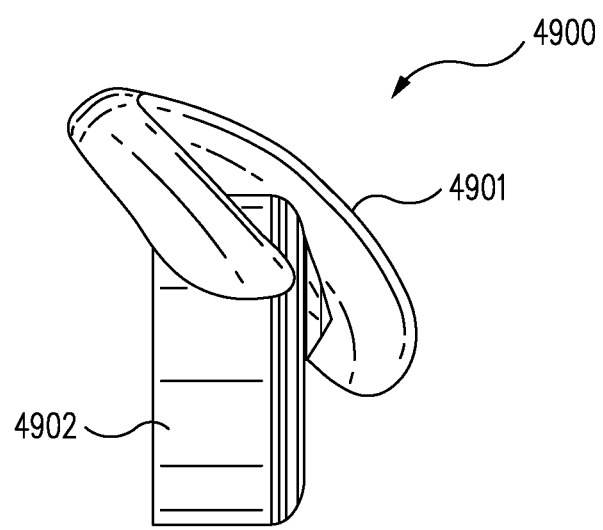
FIG. 55 is a right side elevation view of the earpiece of FIG. 49, according to an embodiment.
Figure 56:
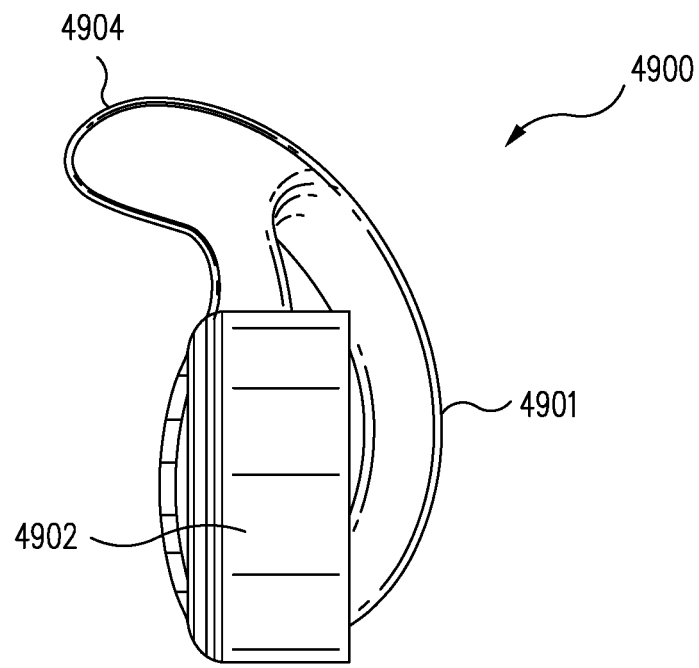
FIG. 56 is a top side elevation view of the earpiece of FIG. 49, according to an embodiment.
Figure 57:
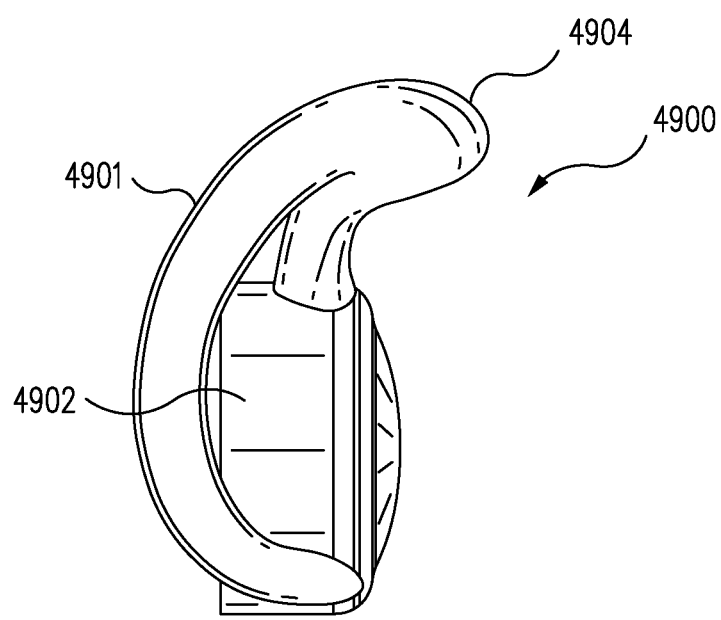
FIG. 57 is a bottom side elevation view of the earpiece of FIG. 49, according to an embodiment.
Figure 58:
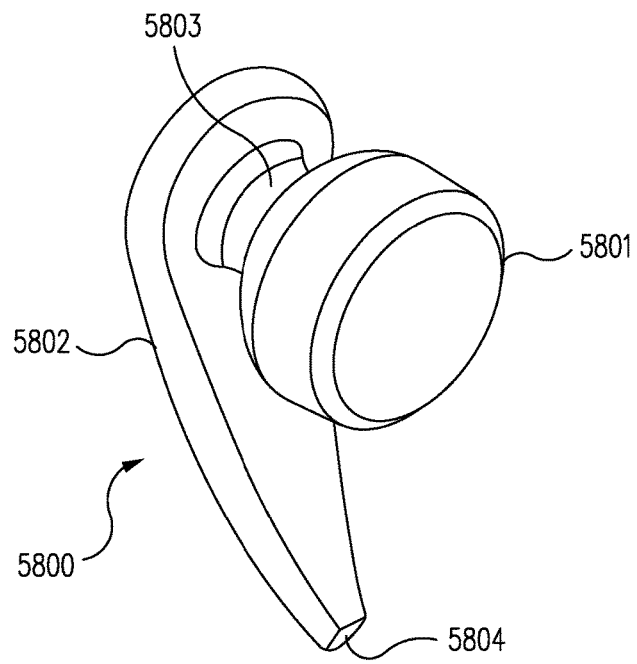
FIG. 58 is a front-left-top perspective view of an example of an attachment for the earpiece of FIG. 49, where the attachment may represent a portion of a communications cable, a wireless telecommunications device (e.g., a wireless audio headphone or a Bluetooth® headset with headphone and microphone), an audio headphone (e.g., an earbud), an earplug, or other type of device configured to mate with the earpiece, according to an embodiment.
Figure 59:
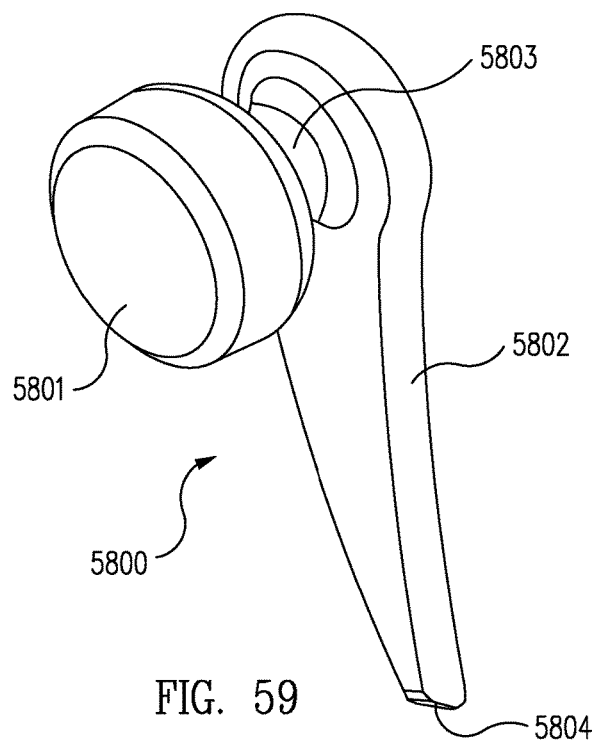
FIG. 59 is a front-right-top perspective view of the example attachment of FIG. 58, according to an embodiment.
Figure 66:
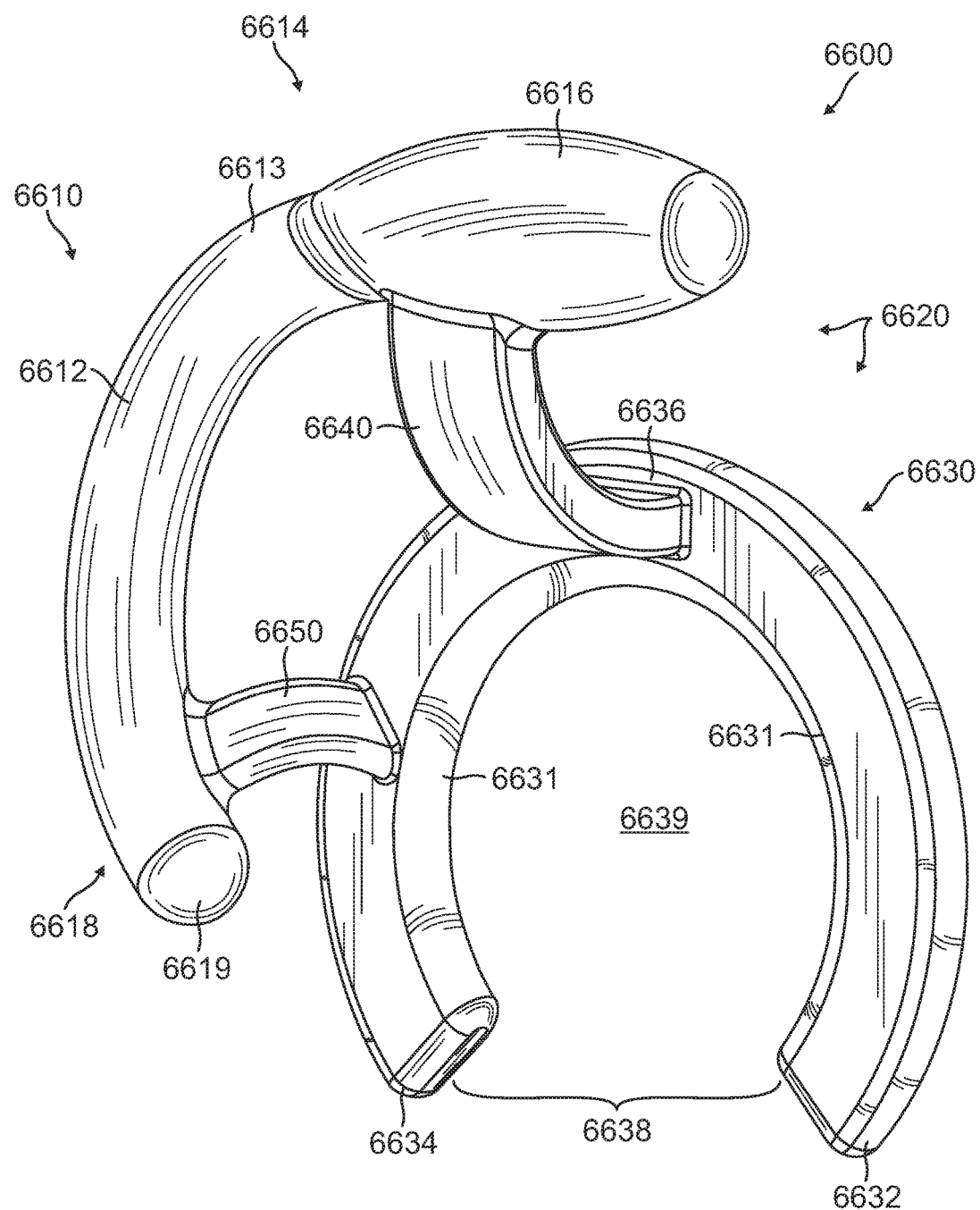
FIG. 66 is a front right perspective view of an earpiece having an attachment mount, according to an embodiment.

Referring now to FIG. 42, a left human ear or pinna 500 typically has anatomical structures such as a cymba concha 501, a concha bowl 508, a ridge 502 of the concha bowl 508, a cavum concha 503, an antitragus 504, a tragus 505, a helix 507, a crus 506 of helix 507, and an antihelix 510. The right pinna (not shown) is generally similar to the left pinna 500 and can be substantially a mirror image thereof.

According to an embodiment, examples of grab points 1-7 are provided by at least some of the various anatomical structures of the pinna 500. The grab points 1-7 and/or anatomical structures of the ear proximate the grab points 1-7 can grab or otherwise hold, capture, and/or maintain the earpiece 111 (see FIG. 11, for example) within the pinna 500, e.g., within the concha bowl 508 thereof. For example, the grab points 1-7 can define detents, grabbers, locks, fingers, tabs, or other structures or features that engage the earpiece 111 and mechanically limit undesirable movement of the earpiece 111.

Thus, the grab points 1-7 can tend to resist movement of the earpiece 111. More particularly, the grab points 1-7 can tend to resist movement of the earpiece 111 that would result in separation of the earpiece 111 from the pinna 500. The grab points 1-7 can capture the earpiece 111 substantially within the concha bowl 508. The grab points 1-7 can tend to resist other movement of the earpiece 111. For example, the grab points can tend to resist translational or rotational movement of the earpiece 111 that would move the earpiece 111 away from a desired position substantially within the concha bowl 508. The earpiece 111 can be configured to complement a portion of the pinna 500, so as to facilitate the use of the grab points 1-7. For example, the earpiece 111 can be substantially a mirror image of one or more portions of the pinna 500.

According to an embodiment, a first grab point 1 can be at a forward and uppermost end of the cymba concha 501. A front, top portion 171 (see FIG. 11) of the earpiece 111 can be disposed underneath the ridge of the cymba concha 501 and behind the helix 507 just above the crus 506 of helix 507.

According to an embodiment, a second grab point 2 can be located where a top rim 172 (see FIG. 11) of the earpiece 111 fits snugly under or puts pressure against a top part of the ridge 502 of the concha bowl 508. According to an embodiment, a third grab point 3 can be the underneath lower portion 173 (see FIG. 11) of the earpiece 111 when the earpiece 111 is placed within the concha bowl 508. The lower portion 173 of the earpiece 111 can be captured beneath the crus 506 of helix 507. According to an embodiment, a middle front part 174 (FIG. 11) of the earpiece 111 can go over the crus 506 of helix 507 and slightly into the ear canal 509 to define a fourth grab point 4 on top of and underneath the crus 506 of helix 507. According to an embodiment, a fifth grab point 5 can extend from where a top part of the cavum concha 503 splits into the narrow flexible ring that forms itself to the backside of the concha bowl 508. The fifth grab point 5 can grab the back side 175 (see FIG. 11) of the earpiece 111.

According to an embodiment, a sixth grab point 6 can be defined at the bottom of the pinna 500. The sixth grab point 6 can grab the earpiece 111 at the flare 176 (FIG. 11) of the earpiece 111. The flare 176 can continue around to the underside of the antitragus 504 and the rim of the outer portion of the ear canal 509.

According to an embodiment, a seventh grab point 7 can be defined. The seventh grab point can be defined by the underside of the tragus 505. The seventh grab point 7 can grab the lower portion 173 of the earpiece 111. According to some embodiments, a structure such as the top of the protrusion 20 (see FIGS. 2A-C) and/or a structure such as the top of the extension 112 or 212, or stem 115, 215, or 4402, can contact the ear proximate grab point 4 and/or a structure such as the bottom of the protrusion 20 and/or a structure such as the bottom of the extension 112 or 212, or stem 115, 215, or 4402, can contact the ear proximate grab point 7.

According to various embodiments, additional grab points can be provided. For example, an eighth grab point (not shown) and a ninth grab point (not shown) can be provided within the ear canal 509 by using an ergonomically shaped extension (such as extension 112 or 212) or stem (such as stem 115, 215, or 4402). By use of the term ergonomic, it can be meant that the extension or stem substantially conforms to the direction of a first bend of the ear canal 509. Thus, the extension or stem can slide into the ear canal 509 more easily and can tend to center itself into the central portion of the ear canal 509. The extension or stem can apply pressure to the bottom of the ear canal 509 or to all of the ear canal 509 so as to seal the ear canal 509 and thus provide sound attenuation.

According to an embodiment, the extension or stem can be short and have no flanges. The extension or stem can push up against the top part of the ear canal 509 to form yet another grab point. The ergonomic aspects of the extension or stem can keep an opening (such as from which sound is directed toward the ear drum) formed in the extension or stem generally centered within the ear canal 509. Thus, the extension or stem can be configured such that the distal end of the extension or stem does not undesirably abut a wall of the ear canal 509 in the manner that a straight earplug does.

In another embodiment, a further grab point may be provided by the tragus 505 and the antitragus 504. In this regard, in an embodiment where an earpiece (e.g., earpiece 10 of FIG. 1) is provided with a lower lobe (e.g., lower lobe 16 shown in FIG. 1), such a lower lobe may be positioned between the tragus 505 and the antitragus 504 which may press against the lower lobe to assist in holding the earpiece in place and resist movement thereof.

The configuration and size of the anatomical structures and features of the human ear can vary substantially from one individual to another. Not all of the described grab points will necessarily limit the motion of the earpiece 111 in every instance. In some ears, only a portion of the grab points will limit the motion of the earpiece 111. Other anatomical structures or features of the ear can function as grab points. Thus, the discussion and illustration of grab points is by way of example only, and not by way of limitation.

There is a common problem associated with the use of contemporary earplugs, whereby the earplugs can be pushed further and further into the ear canal 509. Over time, as the earplugs are worn, the ear becomes desensitized to the presence of the earplugs. Because of this desensitization, a user can tend to push the contemporary earplugs further into the ear canal 509 with each subsequent use. Of course, it is not desirable to push the earplugs further and further into the ear canal 509. When pushed in too far, an earplug can cause substantial discomfort and damage to the eardrum.

According to an embodiment, the earpiece 111 keeps the extension 112 from being pushed past the second turn of the ear canal 509. A contemporary earplug (which lacks the earpiece 111) can be undesirably pushed past the second turn of the ear canal 509 after the ear canal 509 has become desensitized to the earplug, as discussed above.

Further, there are situations in which a person wearing earplugs is subjected to rapid compression. For example, the person can be descending while scuba diving, flying, or skydiving. In such situations, contemporary earplugs can be undesirably pushed further into the ear canal 509, potentially to the point of contacting and/or damaging the eardrum.

According to various embodiments, the Hocks filter 151 (see FIG. 8) and/or the bore 122 (see FIG. 5) allow air to pass through the earpiece 111 and/or the extension 112. When air passes through the earpiece 111 and/or the extension 112, pressure within the ear canal 509 can tend to equalize with respect to pressure outside of the ear canal 509. Thus, the extension 112 can be inhibited from being pushed further into the ear canal 509 by such increasing external pressure. The earpiece 111 also inhibits the extension 112 from being pushed further into the ear canal 509 by such increasing pressure, for example. According to an embodiment, the earpiece 111 can be configured such that at least one grab point of an ear tends to hold the earpiece 111 within the ear. More particularly, the earpiece 111 can be configured such that the grab points are defined by anatomical structures as discussed.

Referring now to FIGS. 43-48, various views of an earpiece 4300 are shown, according to an embodiment. As with the embodiment of FIGS. 2A-C, the lower lobe (such as lower lobe 16 of the earpiece 10 of FIG. 1), is omitted. Rather, instead of such a lower lobe, a smooth rounded surface 17 is provided.

The generally arcuate rib 11 can have an upper end 4304 and a lower end 4305. A generally vertical rib 12 can extend substantially between the upper end 4304 and the lower end 4305, and an upper lobe 15 can be formed at the upper end of the generally arcuate rib 11. A smooth bend 17 can be formed at the lower end of the generally arcuate rib 11. The earpiece can be configured to be generally shaped like a D. However, those skilled in the art will appreciate that other embodiments are likewise suitable. For example, either the generally vertical rib 12 or the generally arcuate rib 11 can be modified substantially or omitted.

Similar to the embodiment of FIGS. 2A-C, the earpiece 4300 can further comprise a protrusion 20 having a bore 21 formed therethrough. The protrusion 20 can be configured to extend at least partially into the ear canal 509. The bore 21 can transmit sound, such as from a two-way radio, to the wearer's eardrum. Alternatively, the bore 21 can be occluded or omitted so as to facilitate hearing protection.

FIGS. 49-65 show an earpiece 4900 and/or attachment 5800 (also referred to as an arm), according to various embodiments. FIGS. 49-57 show the earpiece 4900 without the attachment 5800. FIGS. 58-62 show the attachment 5800 without the earpiece 4900. FIG. 63-65 show the assembled earpiece 4900 and attachment 5800.

Referring now to FIGS. 49-57 and 63-65, an earpiece 4900 can comprise a generally arcuate rib 4901. Earpiece 4900 includes an upper lobe 4904. An upper end 4911 of the generally arcuate rib 4901 can be connected to a lower end 4912 of the generally arcuate rib 4901 via a generally vertical rib 4903 and/or annulus 4902. The annulus 4902 can have a cover 4905. The cover 4905 can be either partial, as shown, or can be substantially complete such that the cover substantially closes the annulus 4902. The cover 4905 can be formed on the inboard (toward the head) side of the annulus 4902 and/or on the outboard (away from the head) side of the annulus 4902. The annulus 4902 can be approximately centered with respect to the outer opening of the ear canal 509.

Referring now to FIGS. 58-65, an attachment 5800 can be configured to mate with the earpiece 4900. For example, the attachment 5800 can have a generally cylindrical protrusion 5801 that is configured to be received within the annulus 4902 such that the attachment 5800 can rotate with respect to the earpiece 4900. The protrusion 5801 can define a male member and the annulus 4902 can define a female member.

The attachment 5800 can have a speaker. For example, the protrusion 5801 can either be a speaker and/or can contain a speaker. The attachment 5800 can have an extension 5802. The extension 5802 can be connected to the protrusion 5801 via a neck 5803, for example. The extension 5802 can be oriented, e.g., rotated, to extend generally downwardly from the earpiece 4900. The extension 5802 can have a microphone 5804 disposed proximate the distal end thereof.

The extension 5802 can be a portion of a communications cable, a wireless telecommunications device (e.g., a wireless audio headphone or a Bluetooth® headset with headphone and microphone), an audio headphone (e.g., an earbud), an earplug, or other type of device configured to mate with the earpiece.

The terms "stem," "protrusion," "extension," "insert," "ear insert," and the like can refer to a structure that protrudes from the earpiece and that can be configured to extend into the ear canal 509.

Additional embodiments are also contemplated. In some embodiments, an earpiece may be provided with an attachment mount to selectively attach and detach an audio device thereto. For example, FIGS. 66-73 illustrate several views of an earpiece 6600 having an attachment mount 6620 according to various embodiments.

As shown, earpiece 6600 includes an arcuate rib 6610 and attachment mount 6620. Arcuate rib 6610 includes a main body 6612 having an upper end 6614 and a lower end 6618. Upper end 6614 includes an upper lobe 6616, while lower end 6618 does not include a lower lobe but rather exhibits a smooth rounded surface 6619. Arcuate rib 6610 may selectively engage with various features of a user's (e.g., wearer's) ear as further discussed herein.

Attachment mount 6620 includes a snap clip 6630 attached to arcuate rib 6610 by structural members 6640 and 6650. In some embodiments, two structural members 6640 and 6650 may be provided which attach to upper end 6614 and lower end 6618, respectively, of arcuate rib 6610. In this regard, structural member 6640 attaches an upper center region 6636 of snap clip 6630 to upper end 6614 of arcuate rib 6610 to suspend snap clip 6630 therefrom. Structural member 6650 attaches a portion of snap clip 6630 (e.g., a leg 6634 in some embodiments) to lower end 6618 of arcuate rib 6610 to limit lateral movement of snap clip 6630 relative to arcuate rib 6610 while snap clip 6630 is also suspended through structural member 6640.

Other embodiments are also contemplated. For example, an additional structural member may be provided in some embodiments to attach a middle portion of main body 6612 (e.g., between upper end 6614 and lower end 6618) to snap clip 6630 if desired.

In some embodiments, snap clip 6630 may be implemented as a snap ring having a generally circular shape (e.g. a "C" shape) defined by legs 6632 and 6634 joined at center region 6636 that is attached to structural member 6640. In some embodiments, ends of legs 6632 and 6634 may be separated by a gap 6638 configured to receive an audio device. In other embodiments, the ends of legs 6632 and 6634 may contact each other and may be pulled apart by a user to form gap 6638 when desired to attach an audio device.

Figure 74:
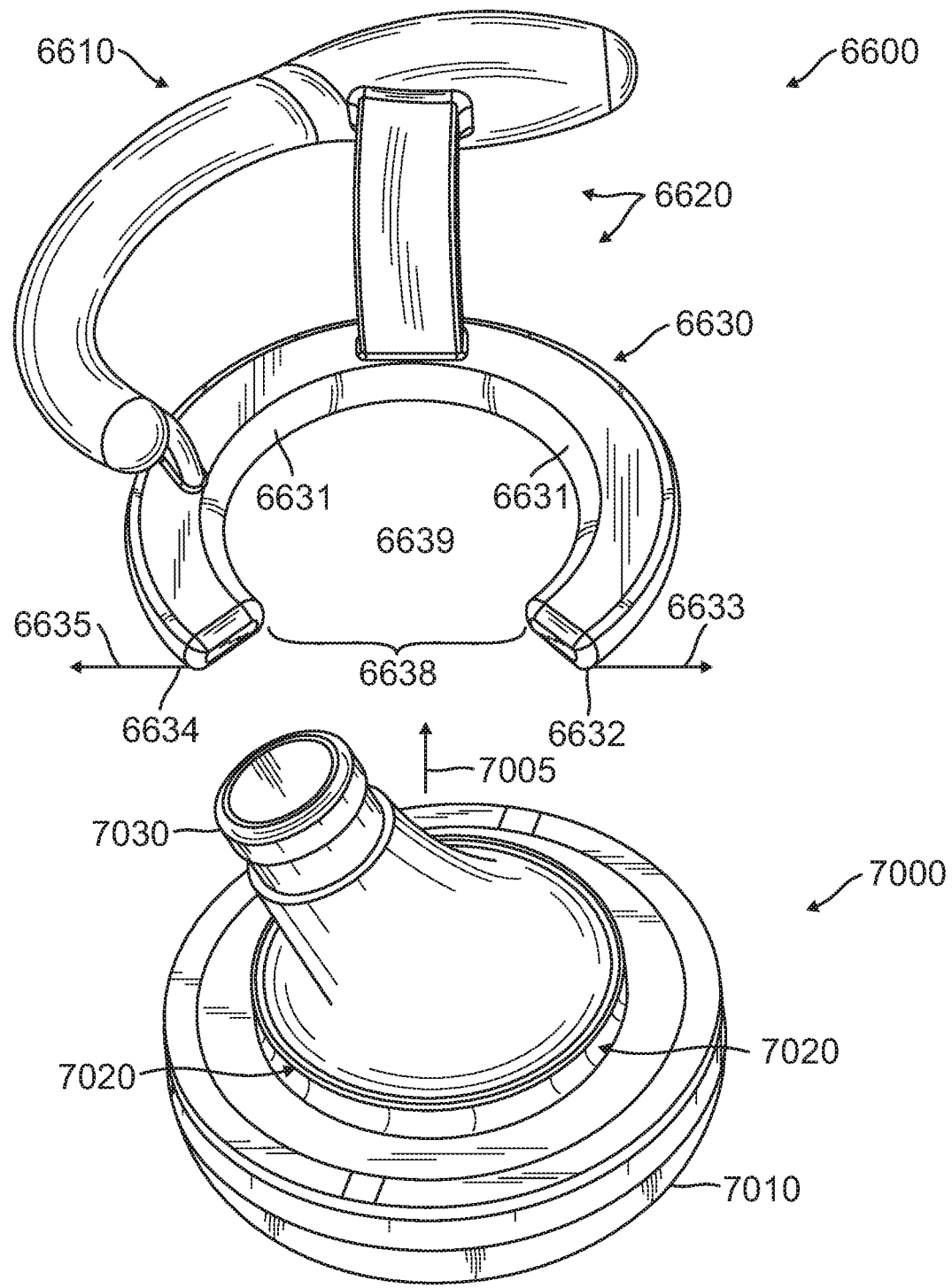
FIG. 74 is a lower right perspective view of the earpiece of FIG. 66 and an example audio device separated from each other, according to an embodiment.
Figure 75:
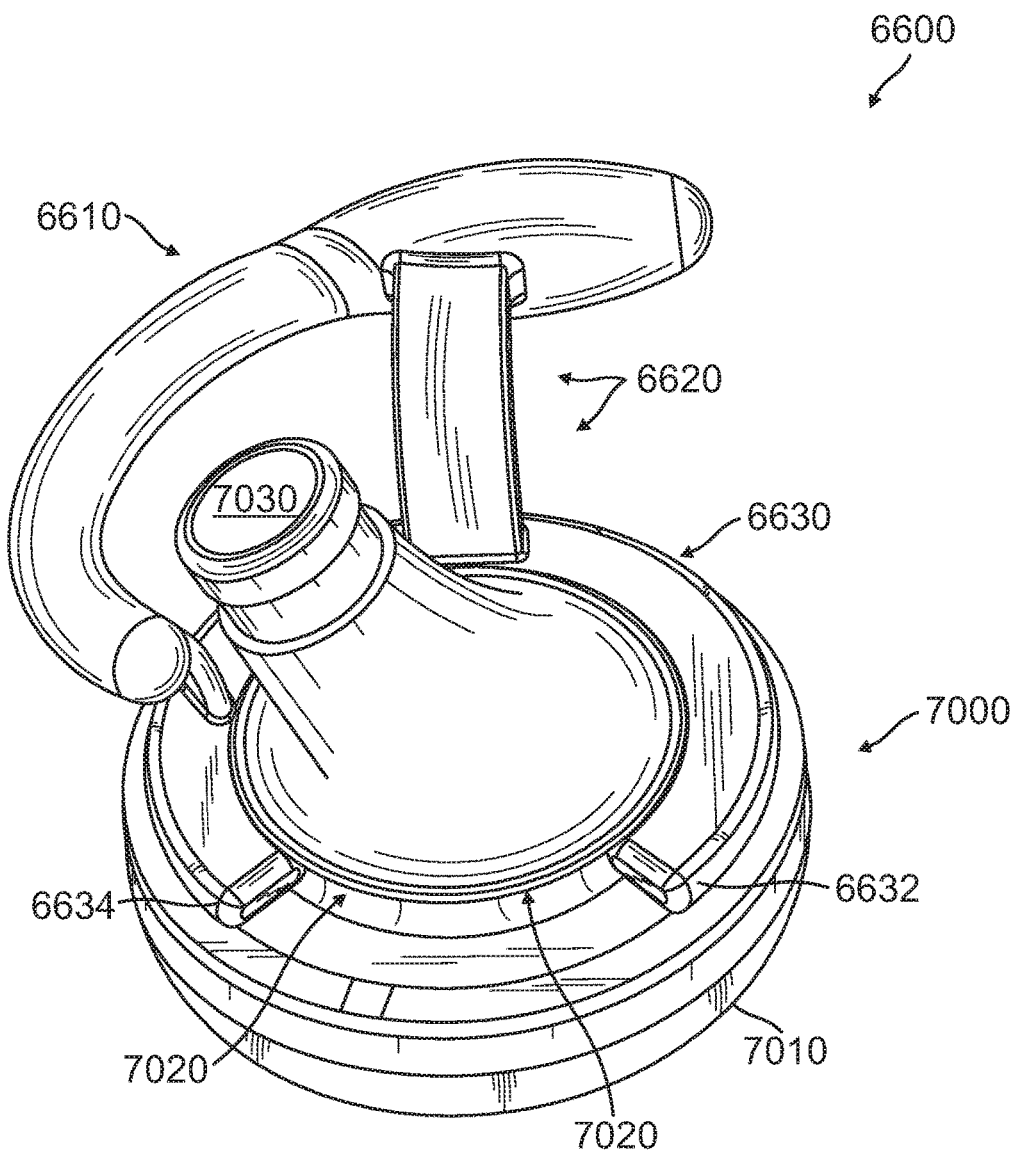
FIG. 75 is a lower right perspective view of the earpiece of FIG. 66 and the example audio device of FIG. 74 engaged with each other, according to an embodiment.
Figure 76:
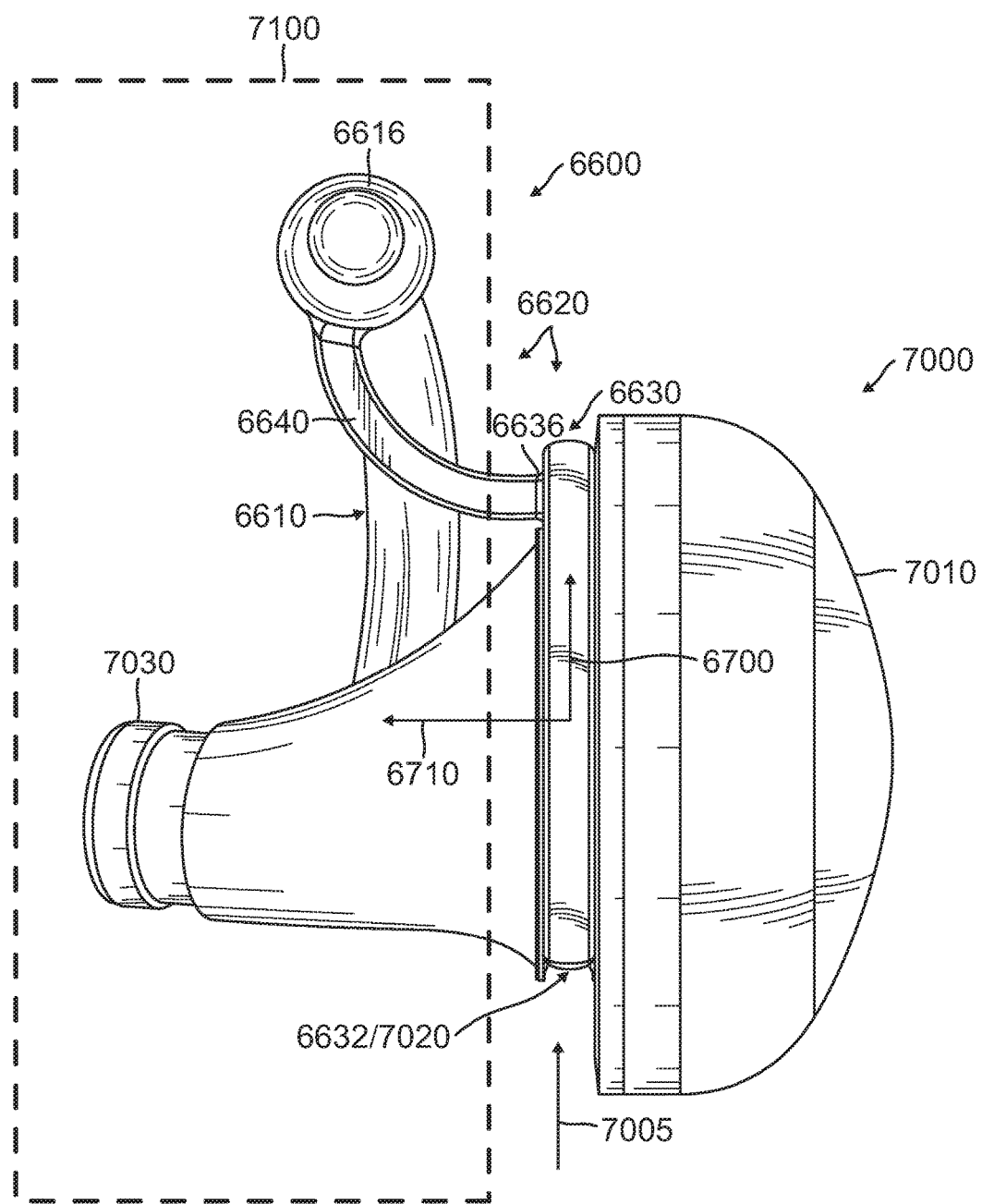
FIG. 76 is a front side elevational view of the earpiece of FIG. 66 and the example audio device of FIG. 74 engaged with each other, according to an embodiment.

FIG. 74 illustrates earpiece 6600 and an example audio device 7000 separated from each other and FIGS. 75-76 illustrate several views of earpiece 6600 engaged with audio device 7000, according to various embodiments. Audio device 7000 may be implemented as any desired type of audio device including, for example, an audio headphone, an earplug, a wireless telecommunications device, or any other desired type of device configured to attach to earpiece 6600.

In the particular illustrated embodiments, audio device 7000 includes a main body 7010 having a groove 7020 and an extension 7030. Groove 7020 is implemented as a complementary feature configured to engage with interior surfaces 6631 of legs 6632 and 6634 of snap clip 6630. Extension 7030 is configured to contact a user's ear. For example, in some embodiments, extension 7030 may be configured to be inserted into a user's ear canal to transmit or block sound.

As shown in FIGS. 74-75, snap clip 6630 may receive audio device 7000 through gap 6638 and engage with one or more complementary features (e.g., groove 7020) of audio device 7000 to secure audio device within an interior space 6639 defined by snap clip 6630. As audio device 7000 is pushed in the direction of arrow 7005 into gap 6638, the ends of legs 6632 and 6634 adjacent to gap 6638 may bend outwardly from each other in the directions of arrows 6633 and 6635, respectively (e.g., being forced apart by audio device 7000 pushing against them in response to user pressure and/or forced apart by direct user manipulation) to permit audio device 7000 to pass therebetween. In addition, a complementary feature of audio device 7000, such as groove 7010, may engage with legs 6632 and 6634 (e.g., interior surfaces 6631 and/or other portions of legs 6632 and 6634) as audio device 7000 passes through gap 6638.

As audio device 7000 enters interior space 6639, legs 6632 and 6634 return to their original position and further engage groove 7010 as shown in FIGS. 75-76. As a result, audio device 7000 may be engaged with the attachment mount 6620 of earpiece 6600 and will thus be secured to the earpiece 6600.

In FIG. 76, the region 7100 generally corresponds to the location of a user's ear while arcuate rib 6610 is engaged therewith. In this regard, snap clip 6630 secures audio device 7000 relative to the user's ear 7100 and physically positions main body 7010 of audio device 7000 laterally away from the user's ear 7100 while also permitting extension 7030 to protrude into the user's ear canal.

Audio device 7000 may be disengaged from snap clip 6630 by a user pulling audio device 7000 in the opposite direction of arrow 7005 while the ends of legs 6632 and 6634 again bend outwardly from each other in the directions of arrows 6633 and 6635 to permit audio device 7000 to pass through gap 6638 and disengage from attachment mount 6620.

Arcuate rib 6610 and attachment mount 6620 may be implemented with appropriate materials to support convenient adjustment of earpiece 6600 while still maintaining secure attachment to audio device 7000. For example, in some embodiments, arcuate rib 6610 and structural members 6640 and 6650 of attachment mount 6620 may be implemented with a flexible, pliable material, such as silicone. Meanwhile, snap clip 6630 may be implemented with a lightweight base material (e.g., a thermoplastic material) that provides rigidity for engagement with audio device 7000, but is still sufficiently flexible to permit legs 6632 and 6634 to receive and pass audio device 7000 through gap 6638.

Snap clip 6630 may be further encapsulated by an overmold material (e.g., silicone) similar to or the same as the material used to implement arcuate rib 6610. Thus, in some embodiments, earpiece 6600 may be implemented as a single integrated molded unit with the material used to form arcuate rib 6610 and structural members 6640 and 6650 also used to provide the overmold that encapsulates snap clip 6630. As a result, the entirety of earpiece 6600 may exhibit soft surfaces that are comfortable when in contact with a user, are reusable, and may be conveniently cleaned (e.g., by warm water or otherwise). In addition, the use of thermoplastic material for the base of snap clip 6630 provides sufficient structural support for securing audio device 7000 thereto.

In addition to attaching snap clip 6630 to arcuate rib 6610, structural members 6640 and 6650 are also configured to permit snap clip 6630 to move relative to arcuate rib 6610. In particular, by implementing structural members 6640 and 6650 with a flexible, pliable material, such as silicone, they may bend as appropriate to permit snap clip 6630 to translate and/or rotate relative to arcuate rib 6610.

Figure 67:
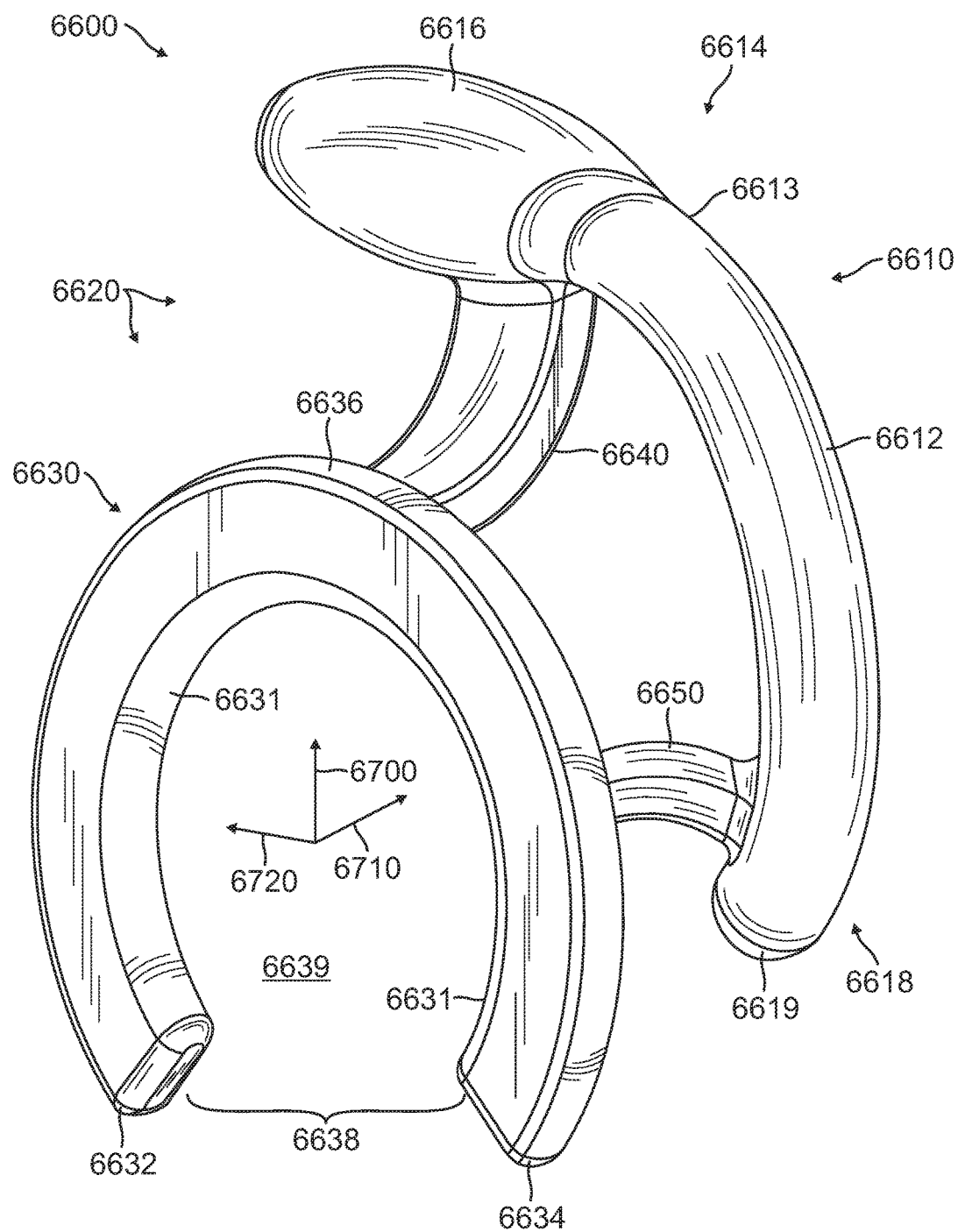
FIG. 67 is a rear left perspective view of the earpiece of FIG. 66, according to an embodiment.
Figure 68:
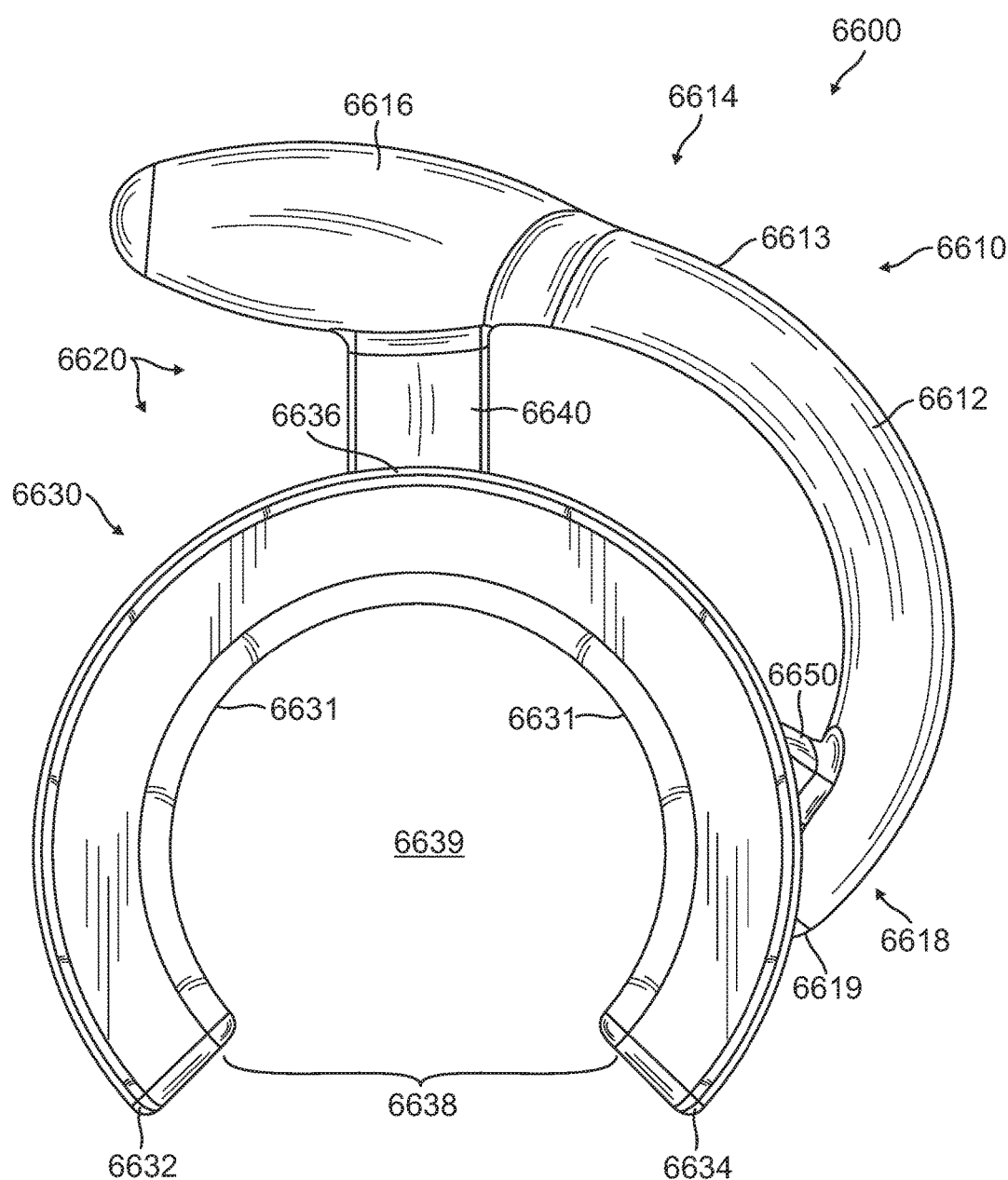
FIG. 68 is a left side elevational view of the earpiece of FIG. 66, according to an embodiment.

For example, as shown in FIGS. 67 and 76, by permitting structural members 6640 and 6650 to bend, snap clip 6630 may translate along any of axes 6700, 6710, and/or 6720. In addition, this bending also permits snap clip 6630 to rotate relative to arcuate rib 6610 about any of axes 6700, 6710, and/or 6720. Thus, by implementing structural members 6640 and 6650 with flexible material, snap clip 6630 may exhibit up to six degrees of freedom relative to arcuate rib 6610 (e.g., up and down along axis 6700, left and right along axis 6710, forward and backward along axis 6720, rotating (e.g., yawing) about axis 6700, tilting (e.g., pitching) forward and backward about axis 6710, and pivoting (e.g., rolling) side to side about axis 6720).

These degrees of freedom permit an audio device 7000 held by snap clip 6630 to be conveniently positioned relative to a user's ear. For example, for audio device 7000 having extension 7030 that is intended to be inserted into a user's ear canal, the ability to move snap clip 6630 relative to arcuate rib 6610 permits arcuate rib 6610 to be conveniently engaged with a user's ear while still permitting audio device 7000 to be repositioned to effectively engage extension 7030 with the user's ear canal. For example, as will be appreciated from FIG. 76, the implementation of structural members 6640 and 6650 permits snap clip 6630 and audio device 7000 to be moved independently of arcuate rib 6610 within the limits of the bending and flexing afforded by structural members 6640 and 6650.

As a result, the position of extension 7030 may be adjusted relative to a user's ear canal as snap clip 6630 is translated and/or rotated relative to arcuate rib 6610. It will be appreciated that such features permit earpiece 6600 and audio device 7000 to be used with a wide range of different user ear sizes, while still maintaining a comfortable fit and proper alignment. Moreover, the overall size of earpiece 6600 may be adjusted in various embodiments to permit additional ranges of user ear sizes (e.g., in small, medium, and large implementations).

In addition, structural members 6640 and 6650 may cooperate together to provide appropriate limitations on the movement of snap clip 6030 relative to arcuate rib 6610. For example, by attaching structural members 6640 and 6650 to different locations of snap clip 6030, the movement of snap clip 6030 can be appropriately restrained. In this regard, structural member 6640 provides an anchor point to prevent snap clip 6030 from moving too far away from arcuate rib 6610 or twisting about structural member 6650. Similarly, structural member 6650 provides another anchor point to prevent snap clip 6030 from moving too far away from arcuate rib 6610 or twisting about structural member 6640.

As discussed, arcuate rib 6610 may selectively engage with various features of a user's ear. In particular, arcuate rib 6610 may selectively engage with a user's ear in accordance any of the techniques discussed herein with regard to various upper lobes, arcuate ribs, and grab points, as appropriate. For example, in some embodiments, upper lobe 6616 may be captured by (e.g., engaged with) the crus 506 of the helix 507 and the antihelix 510 of a user's ear, and arcuate rib 6610 may be captured by the antihelix 510 and the antitragus 504 of the user's ear (e.g., see FIG. 42).

Similarly, a front, top portion of earpiece 6600 (e.g., generally corresponding to upper end 6614) can be disposed underneath the ridge of the cymba concha 501 and behind the helix 507 just above the crus 506 of helix 507 (e.g., corresponding to grab point 1 in FIG. 42).

A top rim 6613 of earpiece 6600 (e.g., corresponding to a portion of the main body 6612 of arcuate rib 6610 proximate upper end 6614) may fit snugly under or put pressure against a top part of the ridge 502 of the concha bowl 508 (e.g., corresponding to grab point 2 in FIG. 42).

A back side of earpiece 6600 (e.g., corresponding to a portion of the main body 6612 of arcuate rib 6610 between upper end 6614 and lower end 6618) may be captured by a portion of the user's ear where a top part of the cavum concha 503 splits into the narrow flexible ring that forms itself to the backside of the concha bowl 508 (e.g., corresponding to grab point 5 in FIG. 42).

A lower portion of earpiece 6600 (e.g., generally corresponding to lower end 6618) may be captured by the underside of the antitragus 504 (e.g., corresponding to grab point 6 in FIG. 42).

Figure 69:
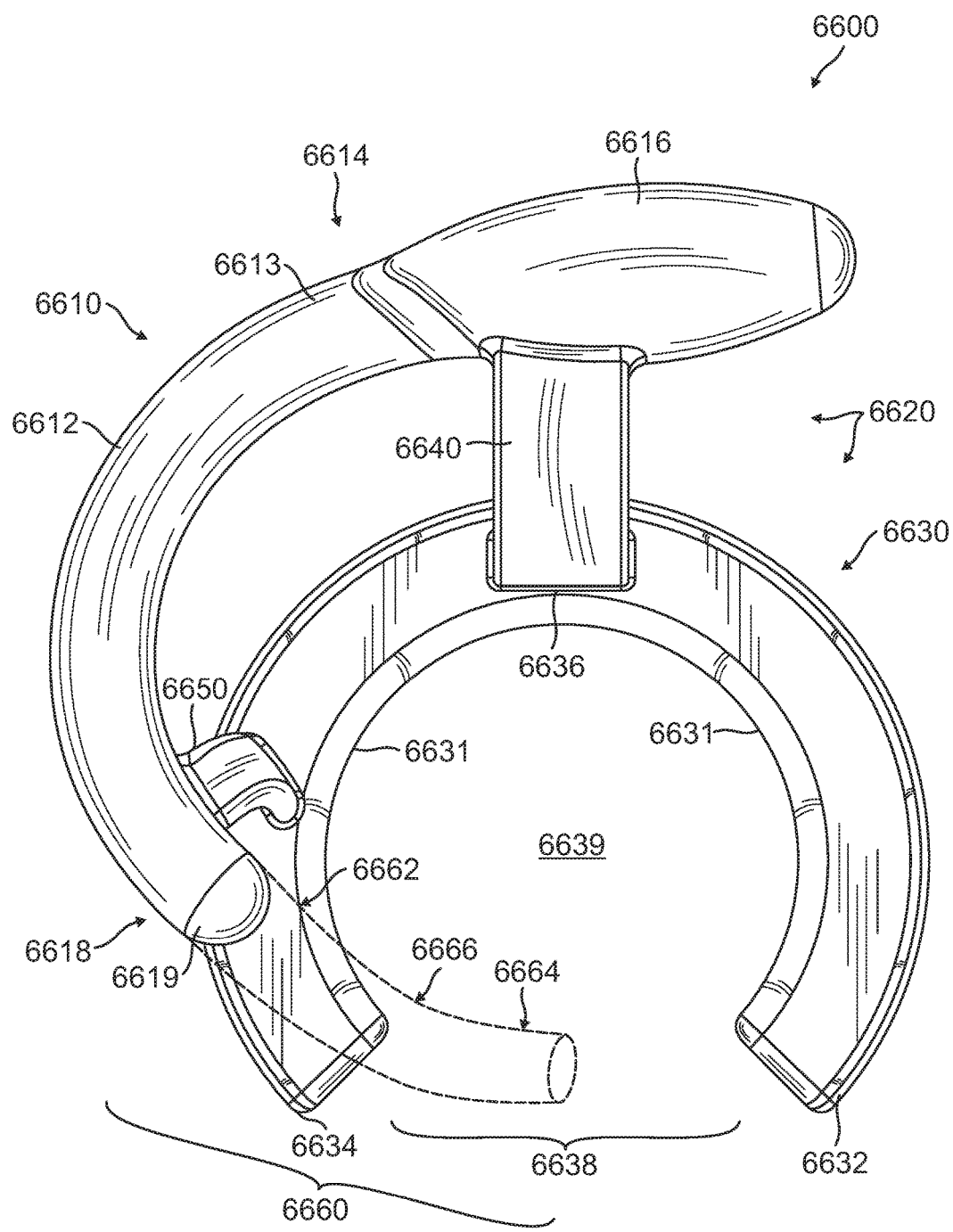
FIG. 69 is a right side elevational view of the earpiece of FIG. 66, according to an embodiment.
Figure 70:
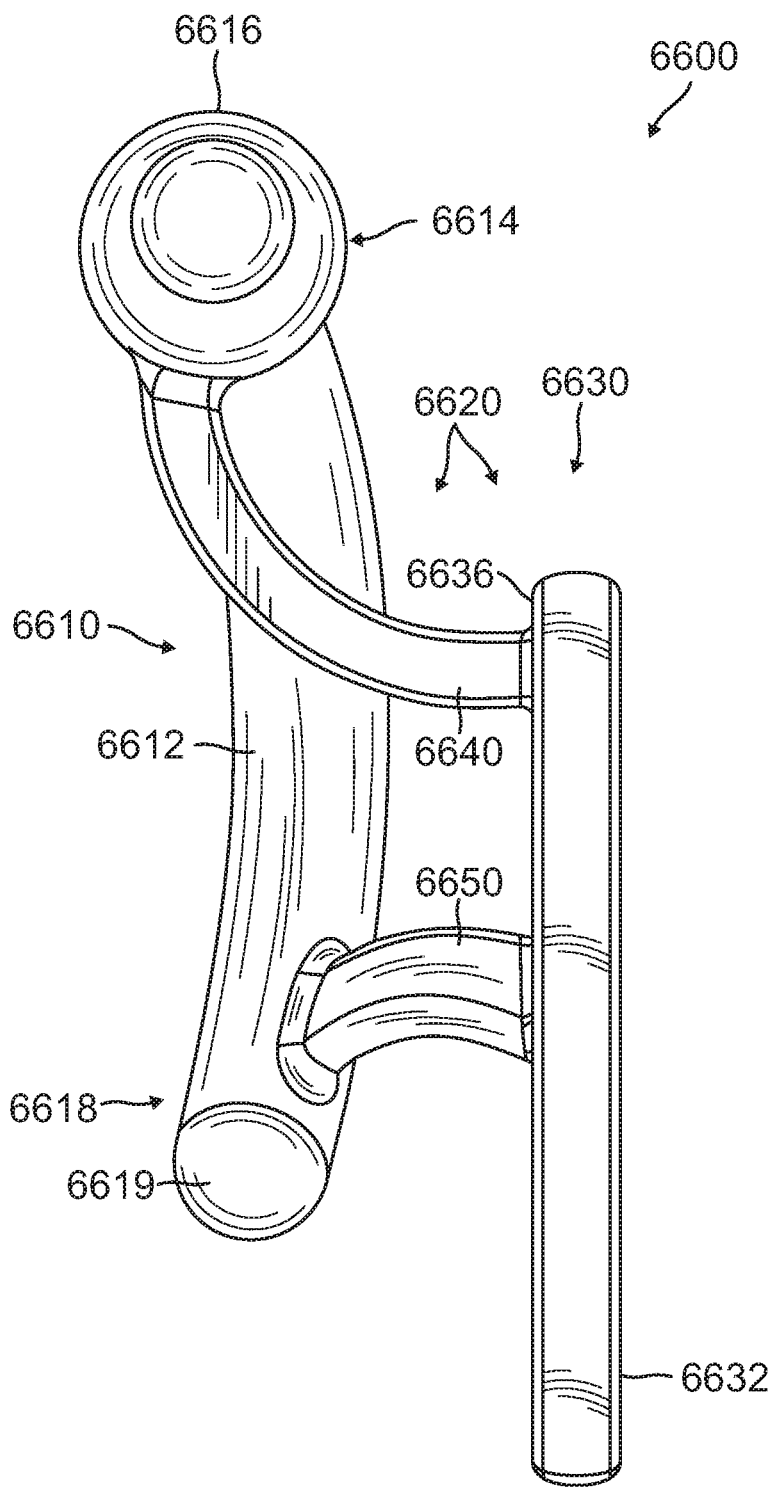
FIG. 70 is a front side elevational view of the earpiece of FIG. 66, according to an embodiment.
Figure 71:
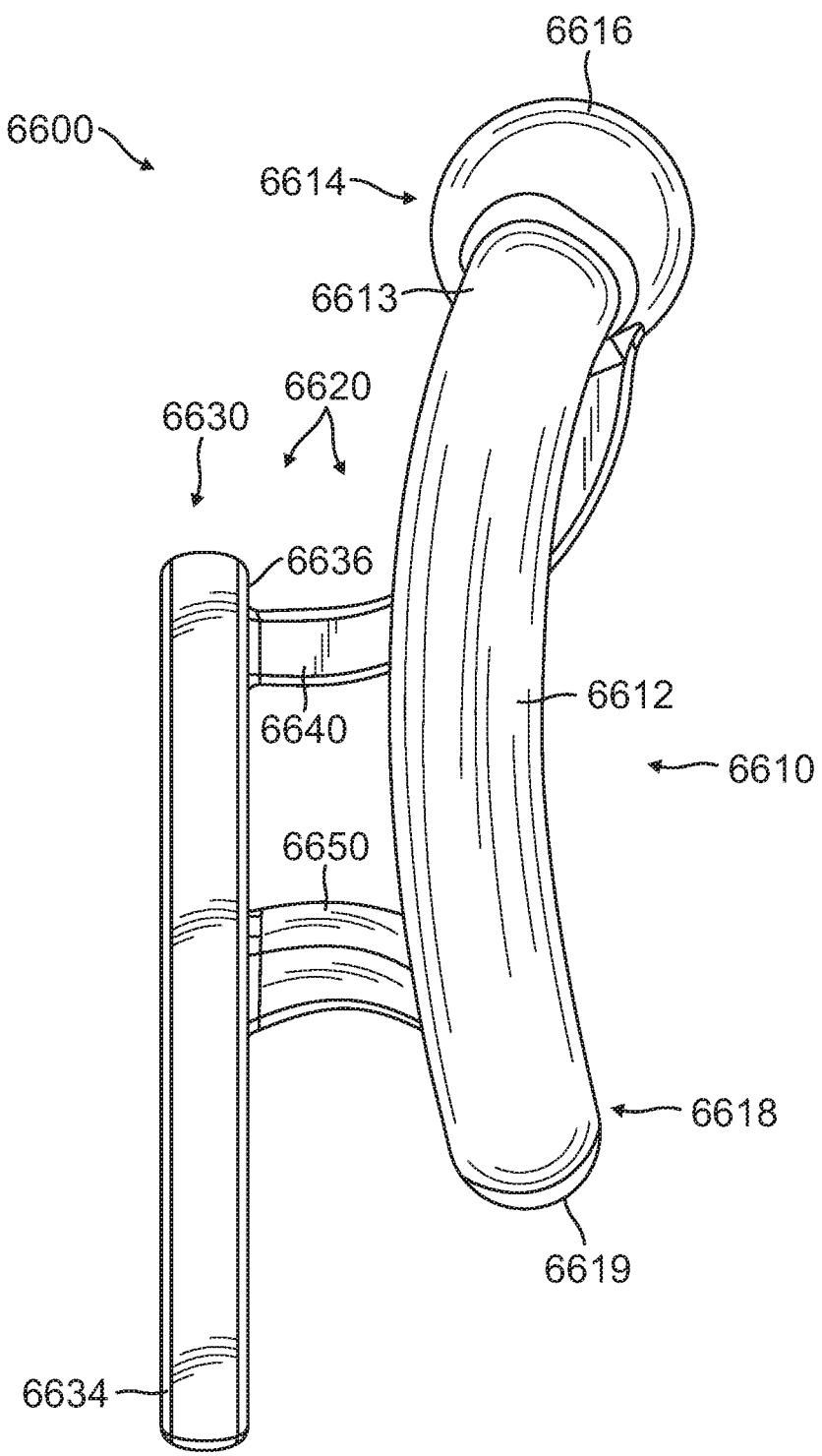
FIG. 71 is a rear side elevational view of the earpiece of FIG. 66, according to an embodiment.
Figure 72:
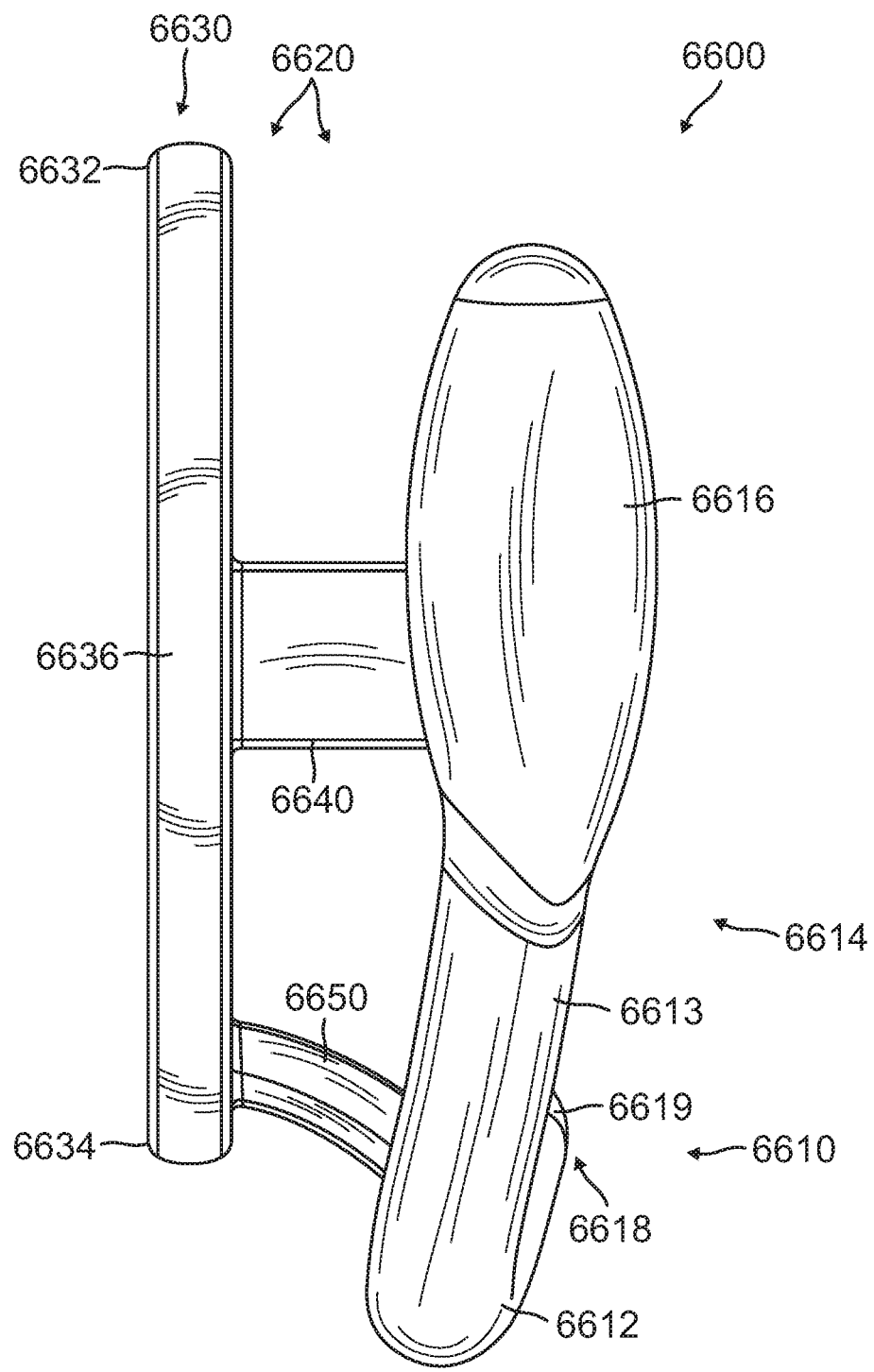
FIG. 72 is a top plan view of the earpiece of FIG. 66, according to an embodiment.
Figure 73:
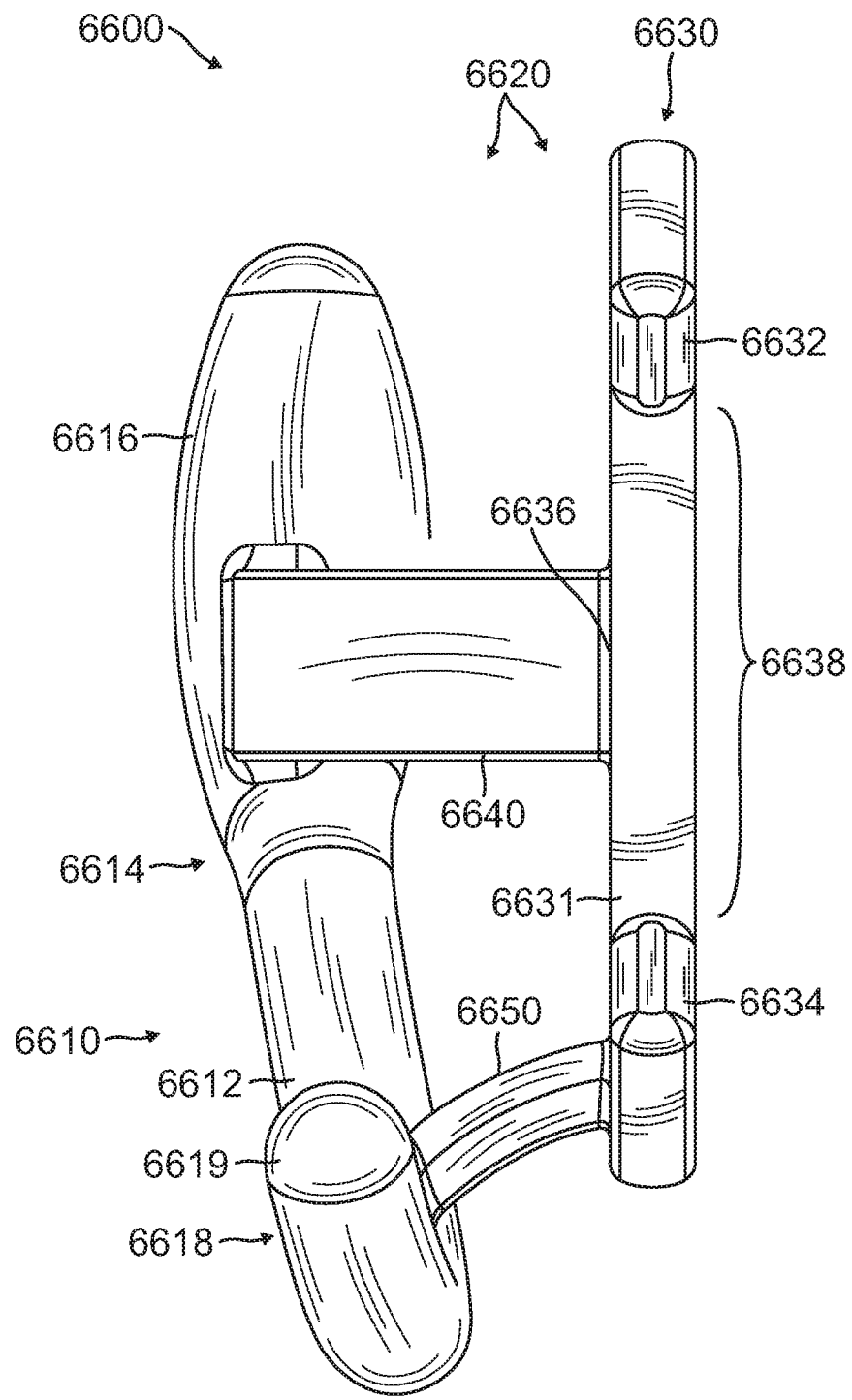
FIG. 73 is a bottom plan view of the earpiece of FIG. 66, according to an embodiment.

As illustrated in FIG. 69, in some embodiments, lower end 6618 of arcuate rib 6610 may include an extended portion 6660 including, for example, first and second sections 6662 and 6664. As shown, extended portion 6660 may exhibit a taper from first section 6662 and continuing through second section 6664. In addition, a bend 6666 is provided between first and second sections 6662 and 6664, while second section 6664 exhibits an overall reduced width in comparison with first section 6662.

In some embodiments, extended portion 6660 can effectively provide further ways to engage earpiece 6600 with a user's ear. For example, in some embodiments, extended portion 6660 may be captured by the underside of the antitragus 504 (e.g., to further engage with grab point 6 in FIG. 42). Also, in some embodiments, extended portion 6660 may extend sufficiently engage the underside of the tragus (e.g., corresponding to grab point 7 in FIG. 42). In either case, the bend 6666 and taper of extended portion 6660 may permit first and second sections 662 and 6664 to further conform with features of the user's ear for some implementations.

In addition, when earpiece 6600 is attached to an audio device (e.g., audio device 7000 further discussed with regard to FIGS. 74-76), the audio device 7000 itself may provide additional grab points when implemented with an appropriate extension 7030 (e.g., corresponding to grab points 9 and 10 previously discussed).

In view of the present disclosure, it will be appreciated that earpiece 6600 can be used to conveniently attach audio device 7000 and position audio device 7000 relative to the user's ear in a manner that provides accurate fit and sufficient user comfort for a variety of different user ear configurations and various audio devices 7000.

One or more embodiments of the present invention provide an earpiece that is more comfortable, less costly, easier to inventory, and more effective with respect to contemporary earpieces.

Although described herein as being for use in human ears, one or more embodiments can also be used in non-human ears. For example, an embodiment can be configured for canine ears, so as to mitigate noise exposure and or facilitate communication with police or military dogs. As those skilled in the art will appreciate, such dogs are commonly exposed to noisy environments, such as those environments sometimes encountered in police work and on the battlefield. Further, it is frequently desirable to communicate with such dogs. Their ability to respond to radio commands has been established.

Although both communications and hearing protection embodiments are disclosed, it is worthwhile to appreciate that both embodiments can possess attributes of one another and that the distinction between the embodiments is not always clear. For example, communication embodiments can have features and functions of hearing protection. Communication embodiments can substantially mitigate exposure to ambient sound. Features discussed herein in conjunction with one embodiment may be used in the other embodiment.

In view of the foregoing, embodiments provide sound protection and/or communications facilitation in a manner that is comfortable, unobtrusive (and thus suitable for covert use), and effective. The earpiece is less likely to loosen or fall out as compared to contemporary earpieces or earplugs.

Embodiments described above illustrate but do not limit the invention. Thus, it should also be understood that numerous modifications and variations are possible in accordance with the principles of the present invention. Accordingly, the scope of the invention is defined only by the following claims.

What is claimed is:

1. An earpiece comprising:
    an arcuate rib having a lobe disposed on an upper end thereof and configured to engage with a crus of a helix and an antihelix of a user's ear; and
    a mount extending from the arcuate rib and comprising a snap clip configured to engage and position an audio device in contact with the user's ear.

2. The earpiece of claim 1, wherein the mount comprises first and second structural members connected between the arcuate rib and the snap clip.

3. The earpiece of claim 2, wherein the first structural member is connected between the lobe and an upper end of the snap clip to suspend the snap clip from the lobe.

4. The earpiece of claim 3, wherein the snap clip is a snap ring comprising first and second arcuate legs extending from the first structural member.

5. The earpiece of claim 2, wherein the second structural member is attached between the arcuate rib and a leg of the snap clip to limit movement of the snap clip relative to the user's ear.

6. The earpiece of claim 2, wherein the first and second structural members extend from the arcuate rib to laterally displace the snap clip relative to the user's ear.

7. The earpiece of claim 1, wherein the arcuate rib and the mount comprise a single integrally formed component/unit.

8. The earpiece of claim 7, wherein the snap clip comprises a thermoplastic base encapsulated by a silicone overmold.

9. The earpiece of claim 1, wherein the snap clip is configured to bend to selectively engage and disengage with a complementary groove in the audio device in response to force applied by the user.

10. The earpiece of claim 1, further comprising the audio device, wherein the audio device is an audio headphone or an earplug.

11. A method comprising:
    engaging an earpiece with an audio device, wherein the earpiece comprises:
    an arcuate rib having a lobe disposed on an upper end thereof, and
    a mount extending from the arcuate rib and comprising a snap clip configured to engage the audio device;
    engaging the lobe of the arcuate rib with a crus of a helix and an antihelix of a user's ear; and
    positioning, by the mount, the audio device in contact with the user's ear.

12. The method of claim 11, wherein the mount comprises first and second structural members connected between the arcuate rib and the snap clip.

13. The method of claim 12, wherein the first structural member is connected between the lobe and an upper end of the snap clip, the method further comprising suspending the snap clip from the lobe by the first structural member.

14. The method of claim 13, wherein the snap clip is a snap ring comprising first and second arcuate legs extending from the first structural member.

15. The method of claim 12, wherein the second structural member is attached between the arcuate rib and a leg of the snap clip, the method further comprising limiting, by the second structural member, movement of the snap clip relative to the user's ear.

16. The method of claim 12, wherein the first and second structural members extend from the arcuate rib, wherein the positioning comprises laterally displacing, by the first and second structural members, the snap clip relative to the user's ear.

17. The method of claim 11, wherein the arcuate rib and the mount comprise a single integrally formed component/unit.

18. The method of claim 17, wherein the snap clip comprises a thermoplastic base encapsulated by a silicone overmold.

19. The method of claim 11, wherein the engaging comprises bending the snap clip to receive the audio device in a complementary groove of the audio device in response to force applied by the user.

20. The method of claim 11, wherein the audio device is an audio headphone or an earplug.

* * * * *